United States Patent
Tokuyasu et al.

(10) Patent No.: US 9,541,437 B2
(45) Date of Patent: Jan. 10, 2017

(54) THERMAL FLOW METER WITH A CIRCUIT PACKAGE HAVING AN AIR FLOW MEASUREMENT CIRCUIT FOR MEASURING AN AIR FLOW

(71) Applicant: Hitachi Automotive Systems, Ltd., Hitachinaka-shi, Ibaraki (JP)

(72) Inventors: Noboru Tokuyasu, Hitachinaka (JP); Shinobu Tashiro, Hitachinaka (JP); Keiji Hanzawa, Hitachinaka (JP); Tsutomu Kono, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 182 days.

(21) Appl. No.: 14/407,152

(22) PCT Filed: May 29, 2013

(86) PCT No.: PCT/JP2013/064823
§ 371 (c)(1),
(2) Date: Dec. 11, 2014

(87) PCT Pub. No.: WO2013/187226
PCT Pub. Date: Dec. 19, 2013

(65) Prior Publication Data
US 2015/0160058 A1 Jun. 11, 2015

(30) Foreign Application Priority Data
Jun. 15, 2012 (JP) .................................. 2012-135308

(51) Int. Cl.
*G01F 1/68* (2006.01)
*G01F 5/00* (2006.01)
(Continued)

(52) U.S. Cl.
CPC ................ *G01F 5/00* (2013.01); *G01F 1/684* (2013.01); *G01F 1/6842* (2013.01);
(Continued)

(58) Field of Classification Search
CPC ............ F02D 41/187; F02D 2200/0414; F02D 2041/283; F02D 41/2474; G01P 5/12; G01F 1/6845; G01F 15/04; G01F 1/696; G01F 1/698; G01F 15/006; G01F 1/6842; G01F 15/02; G01F 5/00; G01F 1/6965; G01F 1/699; G01F 15/043; G01F 1/684; G01F 1/383; G01F 1/34; G01F 1/692; G01F 1/69; F02M 35/021
(Continued)

(56) References Cited

U.S. PATENT DOCUMENTS 5,744,713 A 4/1998 Wienand et al.
6,708,561 B2 * 3/2004 Zurek .................. G01F 1/6842
73/202.5
(Continued)

FOREIGN PATENT DOCUMENTS

JP 2006-3260 A 1/2006
JP 2008-209243 A 9/2008
(Continued)

OTHER PUBLICATIONS

Japanese Office Action dated Feb. 10, 2015 (one (1) page).
International Search Report dated Jul. 30, 2013 with English translation (three (3) pages).

Primary Examiner — Lisa Caputo
Assistant Examiner — Brandi Hopkins
(74) Attorney, Agent, or Firm — Crowell & Moring LLP

(57) ABSTRACT

A thermal flow meter has a bypass passage for taking in and flowing measurement target gas flowing in a main passage, a circuit package having an air flow measurement circuit for
(Continued)

measuring an air flow by carrying out heat transfer in relation to the measurement target gas flowing in the bypass passage, and a temperature detecting portion. A case is provided with an external terminal outputting electric signals indicating the air flow and the temperature of the measurement target gas and supports the circuit package. Resin contains the air flow measurement circuit and the temperature detecting portion. The temperature detecting portion has a protrusion which protrudes out of a circuit package main body, and the protrusion is formed into a shape which is thicker in its root than in its leading end portion and its neck portion is narrower little by little toward the leading end.

14 Claims, 23 Drawing Sheets

(51) Int. Cl.

| | | |
|---|---|---|
| *G01F 1/684* | (2006.01) | |
| *G01F 1/696* | (2006.01) | |
| *G01F 1/698* | (2006.01) | |
| *G01F 1/699* | (2006.01) | |
| *G01F 15/00* | (2006.01) | |
| *G01F 15/02* | (2006.01) | |
| *G01F 15/04* | (2006.01) | |
| *G01F 15/14* | (2006.01) | |
| *G01F 15/18* | (2006.01) | |
| *F02D 41/14* | (2006.01) | |
| *F02D 41/18* | (2006.01) | |

(52) U.S. Cl.
CPC ........... *G01F 1/6845* (2013.01); *G01F 1/696* (2013.01); *G01F 1/698* (2013.01); *G01F 1/699* (2013.01); *G01F 1/6965* (2013.01); *G01F 15/006* (2013.01); *G01F 15/02* (2013.01); *G01F 15/04* (2013.01); *G01F 15/043* (2013.01); *G01F 15/14* (2013.01); *G01F 15/185* (2013.01); *F02D 41/1454* (2013.01); *F02D 41/182* (2013.01); *F02D 2200/0414* (2013.01)

(58) Field of Classification Search
USPC .......... 73/202.5, 118.2, 204.22, 204.15, 756, 73/861.47, 114.34, 114.32, 204.11
See application file for complete search history.

(56) References Cited

U.S. PATENT DOCUMENTS

| | | | |
|---|---|---|---|
| 6,826,955 B2* | 12/2004 | Zurek | ........................ G01F 5/00 73/202.5 |
| 2005/0279919 A1 | 12/2005 | Tanaka et al. | |
| 2011/0088464 A1* | 4/2011 | Ariyoshi | ............... G01F 1/6842 73/204.27 |
| 2012/0048005 A1 | 3/2012 | Renninger et al. | |
| 2012/0055245 A1 | 3/2012 | Doi et al. | |

FOREIGN PATENT DOCUMENTS

| | | |
|---|---|---|
| JP | 2012-503172 A | 2/2012 |
| JP | 2012-52975 A | 3/2012 |

* cited by examiner

FIG. 4
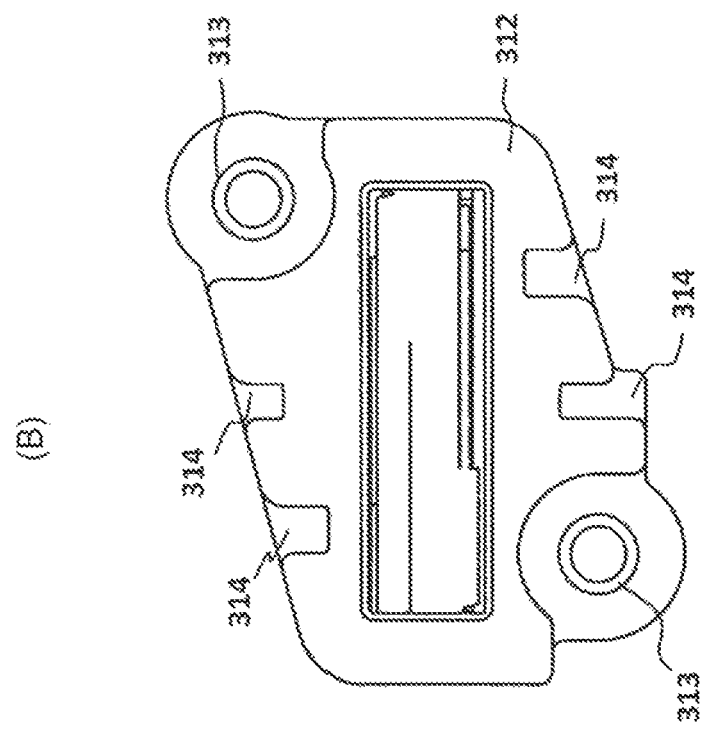
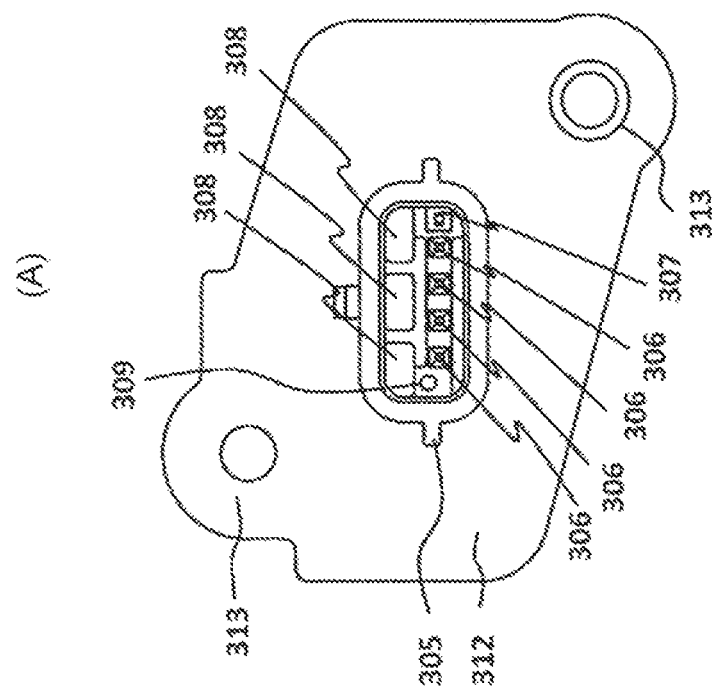

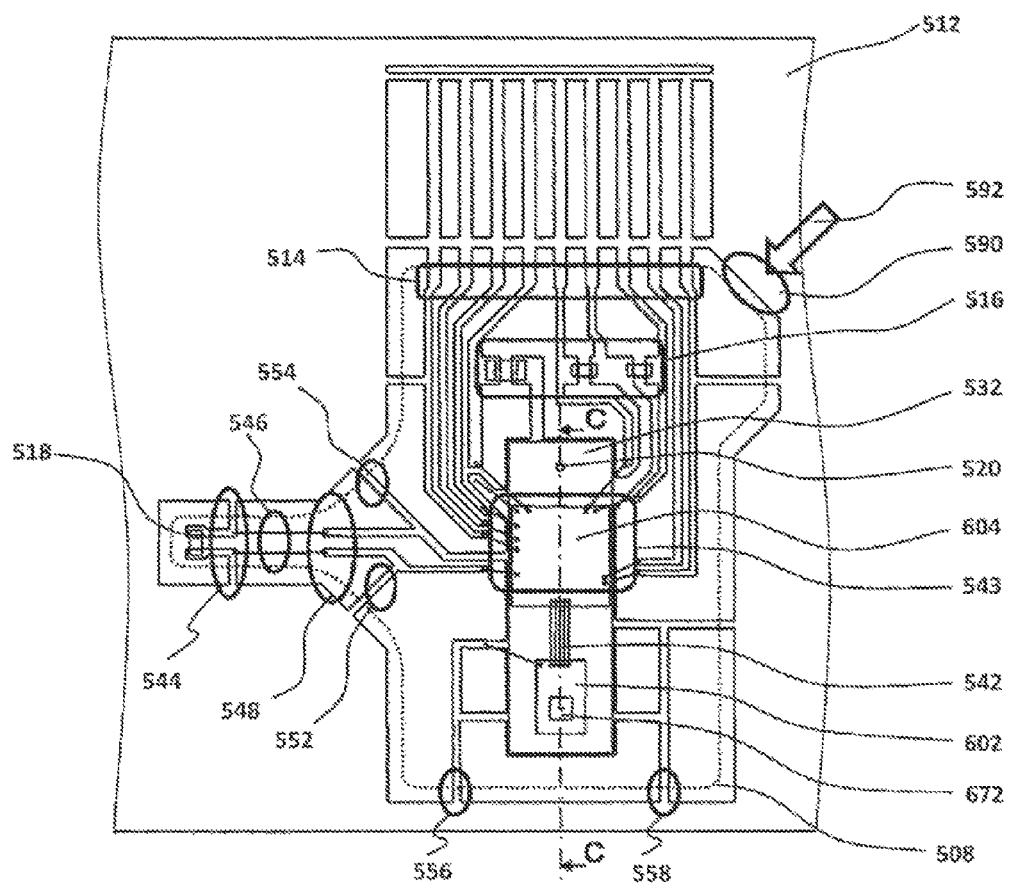

FIG. 22
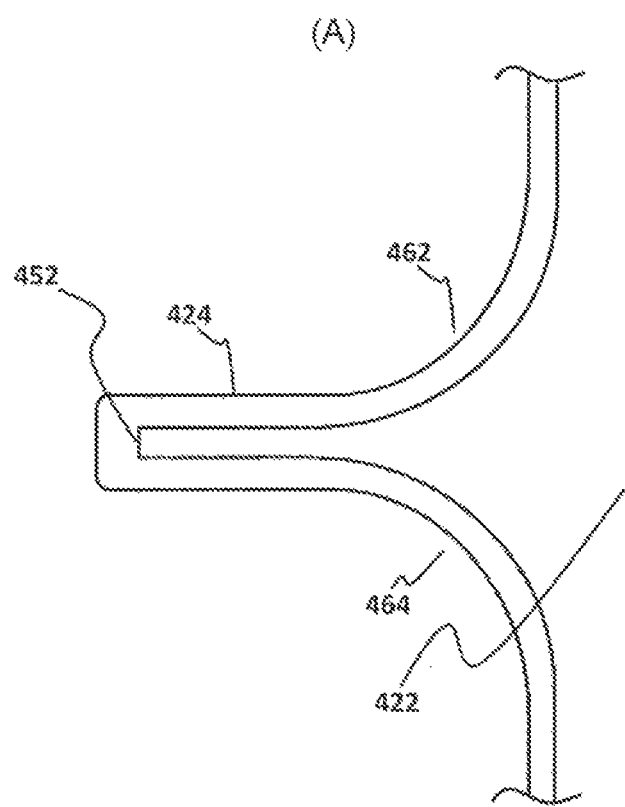
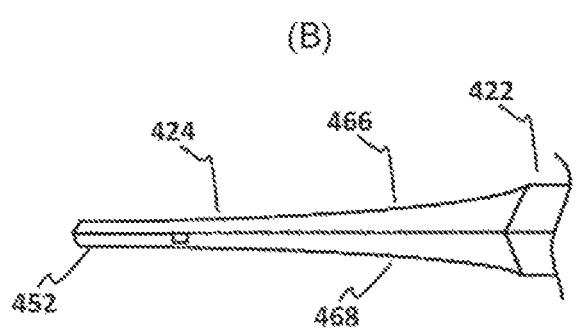

THERMAL FLOW METER WITH A CIRCUIT PACKAGE HAVING AN AIR FLOW MEASUREMENT CIRCUIT FOR MEASURING AN AIR FLOW

TECHNICAL FIELD

The present invention relates to a thermal flow meter.

BACKGROUND ART

In the case that an air flow of gas and a temperature of the gas are measured, and a measured value of the measured air flow and a measured value of the temperature are used as parameters for control, there have been conventionally provided separately a flow meter which measures the air flow of the gas and a measurement device which measures the temperature of the gas. However, in the light of a handling convenience, there is thought a flow meter which is provided with a function of measuring the temperature of the gas in the flow meter which measures the air flow of the gas. The technique mentioned above is disclosed, for example, JP 2008-209243 A. The technique is structured such that a sensor measuring the temperature of the gas is attached to a thermal flow meter which measures the air flow of the gas, and has a function of measuring an amount of intake are supplied to an internal combustion engine and an intake air temperature.

CITATION LIST

Patent Literature

PTL 1: JP 2008-209243 A

SUMMARY OF INVENTION

Technical Problem

A device measuring parameters for control, for example, a thermal flow meter and an intake air temperature sensor desirably has a high reliability. For example, in a control of an internal combustion engine for a vehicle, it is desirable to respond to a request about a fuel consumption save of the vehicle, and respond to a request about an exhaust gas purification, a high reliability is desired in air flow measurement of the intake air and measurement of the intake air temperature. In the technique disclosed in PTL 1, elements carrying out respective measurements are arranged independently within measurement target gas, and the respective elements are electrically connected independently within the measurement target gas. In the structure mentioned above, there is several problems for maintaining the high reliability.

An object of the present invention is to provide a thermal flow meter which has a high reliability and has a gas temperature detecting portion.

Solution to Problem

In order to solve the problem mentioned above, a thermal flow meter according to the present invention has a bypass passage for taking in and flowing measurement target gas flowing in a main passage, a circuit package having an air flow measurement circuit for measuring an air flow by carrying out heat transfer in relation to the measurement target gas flowing in the bypass passage, and a temperature detecting portion which senses a temperature of the measurement target gas, and a case which is provided with an external terminal outputting an electric signal indicating the air flow and an electric signal indicating the temperature of the measurement target gas and supports the circuit package, the circuit package is structured such that the air flow measurement circuit and the temperature detecting portion are contained by resin, the temperature detecting portion has a protrusion which protrudes out of a circuit package main body, the protrusion is formed into a shape which is thicker in its root than in its leading end portion and its neck portion is narrower little by little toward the leading end.

Advantageous Effects of Invention

According to the present invention, it is possible to obtain the thermal flow meter which has a high reliability and has the gas temperature detecting portion.

BRIEF DESCRIPTION OF DRAWINGS

FIGS. 2(A) and 2(B) are diagrams illustrating an appearance of the thermal flow meter, in which FIG. 2(A) is a left side view, and FIG. 2(B) is a front view.

FIGS. 3(A) and 3(B) are diagrams illustrating an appearance of the thermal flow meter, in which FIG. 3(A) is a right side view, and FIG. 3(B) is a rear view.

FIGS. 4(A) and 4(B) are diagrams illustrating an appearance of the thermal flow meter, in which FIG. 4(A) is a plan view, and FIG. 4(B) is a bottom view.

FIGS. 5(A) and 5(B) are diagrams illustrating a housing of the thermal flow meter, in which FIG. 5(A) is a left side view of the housing, and FIG. 5(B) is a front view of the housing.

FIGS. 6(A) and 6(B) are diagrams illustrating a housing of the thermal flow meter, in which FIG. 6(A) is a right side view of the housing, and FIG. 6(B) is a rear view of the housing.

FIGS. 8(A) to 8(C) are diagrams illustrating an appearance of a front cover, in which FIG. 8(A) is a left side view, FIG. 8(B) is a front view, and FIG. 8(C) is a plan view.

FIGS. 9(A) to 9(C) are diagrams illustrating an appearance of a rear cover 304, in which FIG. 9(A) is a left side view, FIG. 9(B) is a front view, and FIG. 9(C) is a plan view.

FIGS. 11(A) to 11(C) are exterior views illustrating a circuit package, in which FIG. 11(A) is a left side view, FIG. 11(B) is a front view, and FIG. 11(C) is a rear view.

FIG. 12 is a diagram illustrating a state that circuit components are mounted on a frame of the circuit package.

FIG. 13 is an explanatory diagram illustrating a diaphragm and a link channel that connects an opening and a gap inside the diaphragm.

FIG. 15(A) is a front elevational view of the circuit package and FIG. 15(B) is a back elevational view.

FIG. 21(A) is a left side elevational view, FIG. 21(B) is a front elevational view, and FIG. 21(C) is a bottom elevational view.

FIGS. 22(A) and 22(B) are partially enlarged view of a protrusion, FIG. 22(A) is a front elevational view and FIG. 22(B) is a plan view.

FIG. 24(A) is a left side elevational view, FIG. 24(B) is a front elevational view and FIG. 24(C) is a back elevational view.

DESCRIPTION OF EMBODIMENTS

Figure 1:
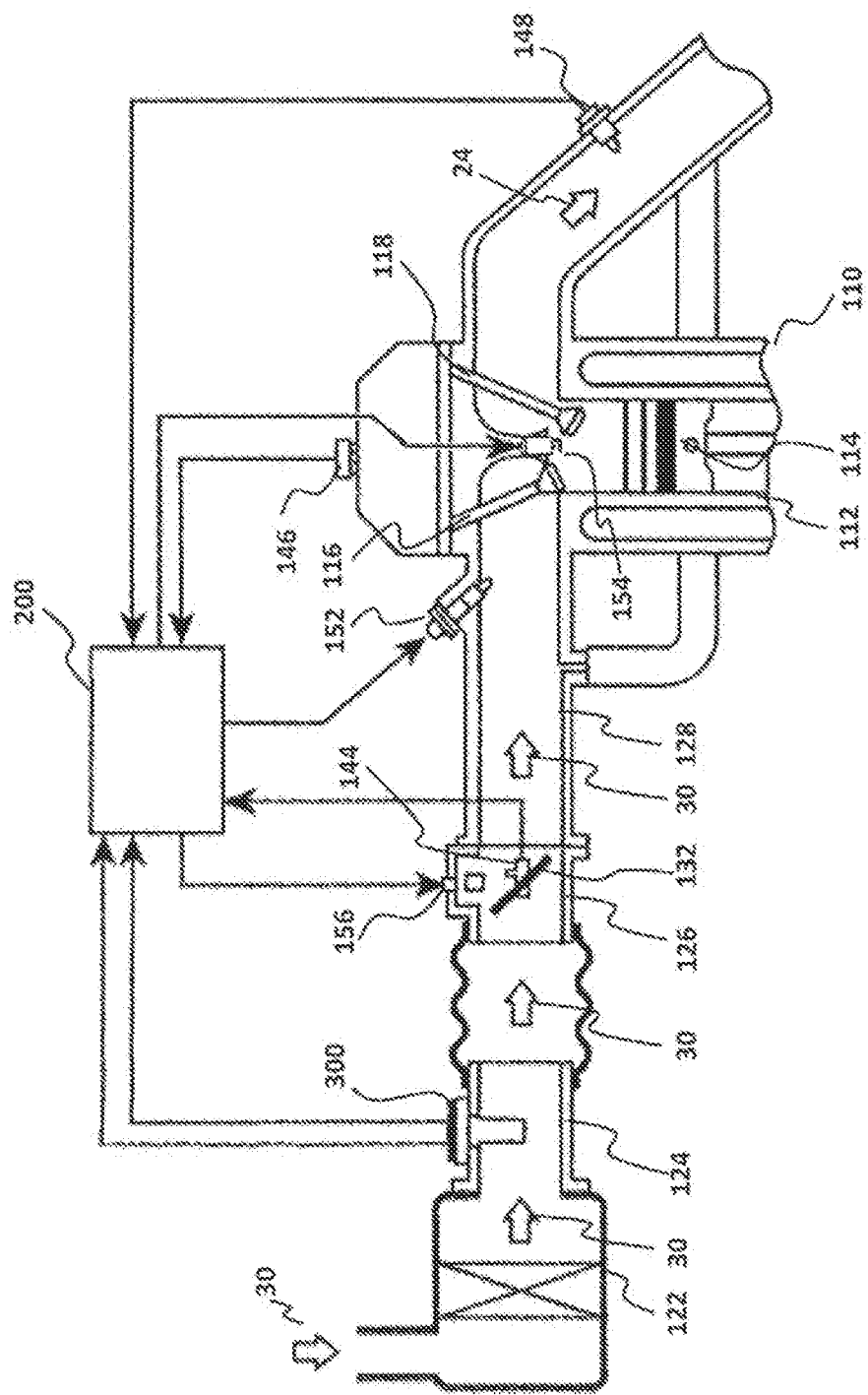
FIG. 1 is a system diagram illustrating an internal combustion engine control system where a thermal flow meter according to an embodiment of the invention is used.

Examples for embodying the invention described below (hereinafter, referred to as embodiments) solves various problems desired as a practical product. In particular, the embodiments solve various problems for use in a measurement device for measuring an intake air amount of a vehicle and exhibit various effects. One of various problems addressed by the following embodiments is described in the "Problems to Be Solved by the Invention" described above, and one of various effects obtained by the following embodiments is described in the "Effects of the Invention." Various problems solved by the following embodiments and various effects obtained the following embodiments will be further described in the "Description of Embodiments." Therefore, it would be appreciated that the following embodiments also include other effects or problems obtained or addressed by the embodiments than those described in "Problems to Be Solved by the Invention" or "Effects of the Invention."

In the following embodiments, like reference numerals denote like elements even when they are inserted in different drawings, and they have the same functional effects. The components that have been described in previous paragraphs may not be described by denoting reference numerals and signs in the drawings.

1. Internal Combustion Engine Control System Having Thermal Flow Meter According to One Embodiment of the Invention FIG. 1 is a system diagram illustrating an electronic fuel injection type internal combustion engine control system having a thermal flow meter according to one embodiment of the invention. Based on the operation of an internal combustion engine 110 having an engine cylinder 112 and an engine piston 114, an intake air as a measurement target gas 30 is inhaled from an air cleaner 122 and is guided to a combustion chamber of the engine cylinder 112 through a main passage 124 including, for example, an intake body, a throttle body 126, and an intake manifold 128. A flow rate of the measurement target gas 30 as an intake air guided to the combustion chamber is measured by a thermal flow meter 300 according to the invention. A fuel is supplied from a fuel injection valve 152 based on the measured flow rate and is mixed with the measurement target gas 30 as an intake air, so that the mixed gas is guided to the combustion chamber. It is noted that, in this embodiment, the fuel injection valve 152 is provided in an intake port of the internal combustion engine, and the fuel injected to the intake port is mixed with the measurement target gas 30 as an intake air to form a mixed gas, so that the mixed gas is guided to the combustion chamber through an inlet valve 116 to generate mechanical energy by burning.

In recent years, in many vehicles, a direct fuel injection method having excellent effects in exhaust gas purification or fuel efficiency improvement is employed, in which a fuel injection valve 152 is installed in a cylinder head of the internal combustion engine, and fuel is directly injected into each combustion chamber from the fuel injection valve 152. The thermal flow meter 300 may be similarly used in a type in which fuel is directly injected into each combustion chamber as well as a type in which fuel is injected into the intake port of the internal combustion engine of FIG. 1. A method of measuring control parameters, including a method of using the thermal flow meter 300, and a method of controlling the internal combustion engine, including a fuel supply amount or an ignition timing, are similar in basic concept between both types. A representative example of both types, a type in which fuel is injected into the intake port is illustrated in FIG. 1.

The fuel and the air guided to the combustion chamber have a fuel/air mixed state and are explosively combusted by spark ignition of the ignition plug 154 to generate mechanical energy. The gas after combustion is guided to an exhaust pipe from the exhaust valve 118 and is discharged to the outside of the vehicle from the exhaust pipe as an exhaust gas 24. The flow rate of the measurement target gas 30 as an intake air guided to the combustion chamber is controlled by the throttle valve 132 of which opening level changes in response to manipulation of an accelerator pedal. The fuel supply amount is controlled based on the flow rate of the intake air guided to the combustion chamber, and a driver controls an opening level of the throttle valve 132, so that the flow rate of the intake air guided to the combustion chamber is controlled. As a result, it is possible to control mechanical energy generated by the internal combustion engine.

1.1 Overview of Control of Internal Combustion Engine Control System

The flow rate and the temperature of the measurement target gas 30 as an intake air that is received from the air cleaner 122 and flows through the main passage 124 are measured by the thermal flow meter 300, and an electric signal representing the flow rate and the temperature of the intake air is input to the control device 200 from the thermal flow meter 300. In addition, an output of the throttle angle sensor 144 that measures an opening level of the throttle valve 132 is input to the control device 200, and an output of a rotation angle sensor 146 is input to the control device 200 to measure a position or a condition of the engine piston 114, the inlet valve 116, or the exhaust valve 118 of the internal combustion engine and a rotational speed of the internal combustion engine. In order to measure a mixed ratio state between the fuel amount and the air amount from the condition of exhaust gas 24, an output of an oxygen sensor 148 is input to the control device 200.

The control device 200 computes a fuel injection amount or an ignition timing based on a flow rate of the intake air as an output of the thermal flow meter 300 and a rotational speed of the internal combustion engine measured from an output of the rotation angle sensor 146. Based on the computation result of them, a fuel amount supplied from the fuel injection valve 152 and an ignition timing for igniting the ignition plug 154 are controlled. In practice, the fuel supply amount or the ignition timing is further accurately controlled based on a change of the intake temperature or the throttle angle measured by the thermal flow meter 300, a change of the engine rotation speed, and an air-fuel ratio state measured by the oxygen sensor 148. In the idle driving state of the internal combustion engine, the control device 200 further controls the air amount bypassing the throttle valve 132 using an idle air control valve 156 and controls a rotation speed of the internal combustion engine under the idle driving state.

1.2 Improvement of Measurement Precision of Thermal Flow Meter Having Temperature Sensing Function of Intake Air and Mounting Environment A fuel supply amount and an ignition timing corresponding to main control amounts of the internal combustion engine are both computed by using the output of the thermal flow meter 300 as a main parameter. Further, calibration of the control parameter is carried out on the basis of the temperature of the intake air as occasion demands. Improvement of the measurement precision, suppression of deterioration with age and improvement of reliability in the thermal flow meter 300 are important for improvement of a vehicle control precision and securement of reliability. Particularly, in recent years, a request about a fuel consumption save of the vehicle is very high, and a request about an exhaust gas purification is further very high. In order to respond to these requests, it is extremely important to improve the measurement precision of the air flow of the measurement target gas 30 which is the intake air measured by the thermal flow meter 300. Further, it is also important that the thermal flow meter 300 maintains the high reliability.

A vehicle having the thermal flow meter 300 is used under an environment where a temperature change is significant or a coarse weather such as a storm or snow. When a vehicle travels a snowy road, it travels through a road on which an anti-freezing agent is sprayed. It is preferable that the thermal flow meter 300 be designed considering a countermeasure for the temperature change or a countermeasure for dust or pollutants under such a use environment. Furthermore, the thermal flow meter 300 is installed under an environment where the internal combustion engine is subjected to vibration. It is also desired to maintain high reliability for vibration.

The thermal flow meter 300 is installed in the intake pipe influenced by heat from the internal combustion engine. For this reason, the heat generated from the internal combustion engine is transferred to the thermal flow meter 300 via the intake pipe which is a main passage 124. Since the thermal flow meter 300 measures the flow rate of the measurement target gas by transferring heat with the measurement target gas, it is important to suppress influence of the heat from the outside as much as possible.

The thermal flow meter 300 mounted on a vehicle solves the problems described in "Problems to Be Solved by the Invention" and provides the effects described in "Effects of the Invention" as described below. In addition, as described below, it solves various problems demanded as a product and provides various effects considering various problems described above. Specific problems or effects solved or provided by the thermal flow meter 300 will be described in the following description of embodiments.

2. Structure of Thermal Flow Meter 300

2.1 Outer Appearance Structure of Thermal Flow Meter 300

FIGS. 2(A), 2(B), 3(A), 3(B), 4(A), and 4(B) are views showing an outer appearance of the thermal flow meter 300, FIG. 2(A) is a left side elevational view of the thermal flow meter 300, FIG. 2(B) is a front elevational view, FIG. 3(A) is a right side elevational view, FIG. 3(B) is a back elevational view, FIG. 4(A) is a plan view, and FIG. 4(B) is a bottom elevational view. The thermal flow meter 300 has a case 301, and the case 301 is provided with a housing 302, a front cover 303 and a rear cover 304. The housing 302 is provided with a flange 312 for fixing the thermal flow meter 300 to an intake body which is the main passage 124, an external connector 305 which has an external terminal 306 for electrically connecting to an external equipment, and a measuring portion 310 for measuring the air flow. An inner portion of the measuring portion 310 is provided with a bypass passage trench for forming a bypass passage, and the inner portion of the measuring portion 310 is further provided with a circuit package 400 having an air flow sensing portion 602 (refer to FIG. 19) for measuring an air flow of the measurement target gas 30 flowing in the main passage 124, and a temperature detecting portion 452 for measuring a temperature of the measurement target gas 30 flowing in the main passage 124.

2.2 Effects Based on Exterior Structure of Thermal Flow Meter 300

Since the inlet port 350 of the thermal flow meter 300 is provided in the leading end side of the measuring portion 310 extending toward the center direction of the main passage 124 from the flange 312, the gas in the vicinity of the center portion distant from the inner wall surface instead of the vicinity of the inner wall surface of the main passage 124 may be input to the bypass passage. For this reason, the thermal flow meter 300 can measure a flow rate or a temperature of the air distant from the inner wall surface of the main passage 124 of the thermal flow meter 300, so that it is possible to suppress a decrease of the measurement accuracy caused by influence of heat and the like. In the vicinity of the inner wall surface of the main passage 124, the thermal flow meter 300 is easily influenced by the temperature of the main passage 124, so that the temperature of the measurement target gas 30 has a different condition from an original temperature of the gas and exhibits a condition different from an average condition of the main gas inside the main passage 124. In particular, if the main passage 124 serves as an intake body of the engine, it may be influenced by the heat from the engine and remains in a high temperature. For this reason, the gas in the vicinity of the inner wall surface of the main passage 124 has a temperature higher than the original temperature of the main passage 124 in many cases, so that this degrades the measurement accuracy.

In the vicinity of the inner wall surface of the main passage 124, a fluid resistance increases, and a flow velocity decreases, compared to an average flow velocity in the main passage 124. For this reason, if the gas in the vicinity of the inner wall surface of the main passage 124 is input to the bypass passage as the measurement target gas 30, a decrease of the flow velocity against the average flow velocity in the main passage 124 may generate a measurement error. In the thermal flow meter 300 illustrated in FIGS. 2(A), 2(B), 3(A), 3(B), and 4(A) to 4(C), since the inlet port 350 is provided in the leading end of the thin and long measuring portion 310 extending to the center of the main passage 124 from the flange 312, it is possible to reduce a measurement error relating to a decrease of the flow velocity in the vicinity of the inner wall surface. In the thermal flow meter 300 illustrated in FIGS. 2(A), 2(B), 3(A), 3(B), and 4(A) to 4(C), in addition to the inlet port 350 provided in the leading end of the measuring portion 310 extending to the center of the main passage 124 from the flange 312, an outlet port of the bypass passage is also provided in the leading end of the measuring portion 310. Therefore, it is possible to further reduce the measurement error.

The measuring portion 310 of the thermal flow meter 300 has a shape extending from the flange 312 to the center direction of the main passage 124, and its leading end is provided with the inlet port 350 for inputting a part of the measurement target gas 30 such as an intake air to the bypass passage and the outlet port 352 for returning the measurement target gas 30 from the bypass passage to the main passage 124. While the measuring portion 310 has a shape extending along an axis directed to the center from the outer wall of the main passage 124, its width has a narrow shape as illustrated in FIGS. 2(A) and 3(A). That is, the measuring portion 310 of the thermal flow meter 300 has a front surface having an approximately rectangular shape and a side surface having a thin width. As a result, the thermal flow meter 300 can have a bypass passage having a sufficient length, and it is possible to suppress a fluid resistance to a small value for the measurement target gas 30. For this reason, using the thermal flow meter 300, it is possible to suppress the fluid resistance to a small value and measure the flow rate of the measurement target gas 30 with high accuracy.

2.3 Structures and Effects of Upstream-Side Side Surface and Downstream-Side Side Surface of Measuring Portion 310

An upstream-side protrusion 317 and a downstream-side protrusion 318 are provided in the upstream-side side surface and the downstream-side side surface, respectively, of the measuring portion 310 included in the thermal flow meter 300. The upstream-side protrusion 317 and the downstream-side protrusion 318 have a shape narrowed along the leading end to the base, so that it is possible to reduce a fluid resistance of the measurement target gas 30 as an intake air flowing through the main passage 124. The upstream-side protrusion 317 is provided between the thermal insulation 315 and the inlet port 343. The upstream-side protrusion 317 has a large cross section and receives a large heat conduction from the flange 312 or the thermal insulation 315. However, the upstream-side protrusion 317 is cut near the inlet port 343, and a length of the temperature detecting portion 452 from the temperature detecting portion 452 of the upstream-side protrusion 317 increases due to the hollow of the upstream-side outer wall of the housing 302 as described below. For this reason, the heat conduction is suppressed from the thermal insulation 315 to the support portion of the temperature detecting portion 452.

Further, a terminal connector 320 mentioned later and a gap including the terminal connector 320 are formed between the flange 312 or the thermal insulation 315 and the temperature detecting portion 452. As a result, a distance between the flange 312 or the thermal insulation 315 and the temperature detecting portion 452 is long, a front cover 303 and a rear cover 304 are provided in the long portion, and the portion acts as a cooling surface. Therefore, it is possible to reduce influence which the temperature of the wall surface of the main passage 124 applies to the temperature detecting portion 452. Further, since the distance between the flange 312 or the thermal insulation 315 and the temperature detecting portion 452 is long, it is possible to move the intake portion of the measurement target gas 30 guided to the bypass passage close to the center of the main passage 124. It is possible to inhibit the measurement precision about the wall surface of the main passage 124 from being lowered.

As illustrated in FIG. 2(B) or 3(B), both side surfaces of the measuring portion 310 inserted into the main passage 124 have a very narrow shape, and a leading end of the downstream-side protrusion 318 or the upstream-side protrusion 317 has a narrow shape relative to the base where the air resistance is reduced. For this reason, it is possible to suppress an increase of the fluid resistance caused by insertion of the thermal flow meter 300 into the main passage 124. Furthermore, in the portion where the downstream-side protrusion 318 or the upstream-side protrusion 317 is provided, the upstream-side protrusion 317 or the downstream-side protrusion 318 protrudes toward both sides relative to both side portions of the front cover 303 or the rear cover 304. Since the upstream-side protrusion 317 or the downstream-side protrusion 318 is formed of a resin molding, they are easily formed in a shape having an insignificant air resistance. Meanwhile, the front cover 303 or the rear cover 304 is shaped to have a wide cooling surface. For this reason, the thermal flow meter 300 has a reduced air resistance and can be easily cooled by the measurement target air flowing through the main passage 124.

2.4 Structure and Effects of Flange 312

The flange 312 is provided with a plurality of hollows 314 on its lower surface which is a portion facing the main passage 124, so as to reduce a heat transfer surface with the main passage 124 and make it difficult for the thermal flow meter 300 to receive influence of the heat. The screw hole 313 of the flange 312 is provided to fix the thermal flow meter 300 to the main passage 124, and a space is formed between a surface facing the main passage 124 around each screw hole 313 and the main passage 124 such that the surface facing the main passage 124 around the screw hole 313 recedes from the main passage 124. As a result, the flange 312 has a structure capable of reducing heat transfer from the main passage 124 to the thermal flow meter 300 and preventing degradation of the measurement accuracy caused by heat. Furthermore, in addition to the heat conduction reduction effect, the hollow 314 can reduce influence of contraction of the resin of the flange 312 during the formation of the housing 302.

The thermal insulation 315 is provided in the measuring portion 310 side of the flange 312. The measuring portion 310 of the thermal flow meter 300 is inserted into the inside from an installation hole provided in the main passage 124 so that the thermal insulation 315 faces the inner surface of the installation hole of the main passage 124. The main passage 124 serves as, for example, an intake body, and is maintained at a high temperature in many cases. Conversely, it is conceived that the main passage 124 is maintained at a significantly low temperature when the operation is activated in a cold district. If such a high or low temperature condition of the main passage 124 affects the temperature detecting portion 452 or the measurement of the flow rate described below, the measurement accuracy is degraded. For this reason, a plurality of hollows 316 are provided side by side in the thermal insulation 315 adjacent to the hole inner surface of the main passage 124, and a width of the thermal insulation 315 adjacent to the hole inner surface between the neighboring hollows 316 is significantly thin, which is equal to or smaller than ⅓ of the width of the fluid flow direction of the hollow 316. As a result, it is possible to reduce influence of temperature. In addition, a portion of the thermal insulation 315 becomes thick. During a resin molding of the housing 302, when the resin is cooled from a high temperature to a low temperature and is solidified, volumetric shrinkage occurs so that a deformation is generated as a stress occurs. By forming the hollow 316 in the thermal insulation 315, it is possible to more uniformize the volumetric shrinkage and reduce stress concentration.

The measuring portion 310 of the thermal flow meter 300 is inserted into the inside from the installation hole provided in the main passage 124 and is fixed to the main passage 124 using the flange 312 of the thermal flow meter 300 with screws. The thermal flow meter 300 is preferably fixed to the installation hole provided in the main passage 124 with a predetermined positional relationship. The hollow 314 provided in the flange 312 may be used to determine a positional relationship between the main passage 124 and the thermal flow meter 300. By forming the convex portion in the main passage 124, it is possible to provide an insertion relationship between the convex portion and the hollow 314 and fix the thermal flow meter 300 to the main passage 124 in an accurate position.

2.5 Structures and Effects of External Connector 305 and Flange 312

FIG. 4(A) is a plan view illustrating the thermal flow meter 300. Four external terminals 306 and a calibration terminal 307 are provided inside the external connector 305. The external terminals 306 include terminals for outputting the flow rate and the temperature as a measurement result of the thermal flow meter 300 and a power terminal for supplying DC power for operating the thermal flow meter 300. The calibration terminal 307 is used to measures the produced thermal flow meter 300 to obtain a calibration value of each thermal flow meter 300 and store the calibration value in an internal memory of the thermal flow meter 300. In the subsequent measurement operation of the thermal flow meter 300, the calibration data representing the calibration value stored in the memory is used, and the calibration terminal 307 is not used. Therefore, in order to prevent the calibration terminal 307 from hindering connection between the external terminals 306 and other external devices, the calibration terminal 307 has a shape different from that of the external terminal 306. In this embodiment, since the calibration terminal 307 is shorter than the external terminal 306, the calibration terminal 307 does not hinder connection even when the connection terminal connected to the external terminal 306 for connection to external devices is inserted into the external connector 305. In addition, since a plurality of hollows 308 are provided along the external terminal 306 inside the external connector 305, the hollows 308 reduce stress concentration caused by shrinkage of resin when the resin as a material of the flange 312 is cooled and solidified.

Since the calibration terminal 307 is provided in addition to the external terminal 306 used during the measurement operation of the thermal flow meter 300, it is possible to measure characteristics of each thermal flow meter 300 before shipping to obtain a variation of the product and store a calibration value for reducing the variation in the internal memory of the thermal flow meter 300. The calibration terminal 307 is formed in a shape different from that of the external terminal 306 in order to prevent the calibration terminal 307 from hindering connection between the external terminal 306 and external devices after the calibration value setting process. In this manner, using the thermal flow meter 300, it is possible to reduce a variation of each thermal flow meter 300 before shipping and improve measurement accuracy.

3. Entire Structure of Housing 302 and its Effects 3.1 Structures and Effects of Bypass Passage and Air Flow Sensing Portion FIGS. 5(A), 5(B), 6(A), and 6(B) illustrate a state of the housing 302 when the front and rear covers 303 and 304 are removed from the thermal flow meter 300. FIG. 5(A) is a left side view illustrating the housing 302, FIG. 5(B) is a front view illustrating the housing 302, FIG. 6(A) is a right side view illustrating the housing 302, and FIG. 6(B) is a rear view illustrating the housing 302. In the housing 302, the measuring portion 310 extends from the flange 312 to the center direction of the main passage 124, and a bypass passage trench for forming the bypass passage is provided in its leading end side. In this embodiment, the bypass passage trench is provided on both frontside and backside of the housing 302. FIG. 5(B) illustrates a bypass passage trench on frontside 332, and FIG. 6(B) illustrates a bypass passage trench on backside 334. Since an inlet trench 351 for forming the inlet port 350 of the bypass passage and an outlet trench 353 for forming the outlet port 352 are provided in the leading end of the housing 302, the gas distant from the inner wall surface of the main passage 124, that is, the gas flow through the vicinity of the center of the main passage 124 can be received as the measurement target gas 30 from the inlet port 350. The gas flowing through the vicinity of the inner wall surface of the main passage 124 is influenced by the temperature of the wall surface of the main passage 124 and has a temperature different from the average temperature of the gas flowing through the main passage 124 such as the intake air which is the measurement target gas 30 in many cases. In addition, the gas flowing through the vicinity of the inner wall surface of the main passage 124 has a flow velocity lower than the average flow velocity of the gas flowing through the main passage 124 in many cases. Since the thermal flow meter 300 according to the embodiment is resistant to such influence, it is possible to suppress a decrease of the measurement accuracy.

The bypass passage formed by the bypass passage trench on frontside 332 or the bypass passage trench on backside 334 described above is connector to the thermal insulation 315 through the outer wall hollow portion 366, the upstream-side outer wall 335, or the downstream-side outer wall 336. In addition, the upstream-side outer wall 335 is provided with the upstream-side protrusion 317, and the downstream-side outer wall 336 is provided with the downstream-side protrusion 318. In this structure, since the thermal flow meter 300 is fixed to the main passage 124 using the flange 312, the measuring portion 310 having the circuit package 400 is fixed to the main passage 124 with high reliability.

In this embodiment, the housing 302 is provided with the bypass passage trench for forming the bypass passage, and the covers are installed on the frontside and backside of the housing 302, so that the bypass passage is formed by the bypass passage trench and the covers. In this structure, it is possible to form overall bypass passage trenches as a part of the housing 302 in the resin molding process of the housing 302. In addition, since the dies are provided in both surfaces of the housing 302 during formation of the housing 302, it is possible to form both the bypass passage trench on frontside 332 and bypass passage trench on backside 334 as a part of the housing 302 by using the dies for both the surfaces. Since the front and rear covers 303 and 304 are provided in both the surfaces of the housing 302, it is possible to obtain the bypass passages in both surfaces of the housing 302. Since the front and bypass passage trench on frontside 332 and bypass passage trenches on backside 334 are formed on both the surfaces of the housing 302 using the dies, it is possible to form the bypass passage with high accuracy and obtain high productivity.

A part of the measurement target gas 30 flowing in the main passage 124 in FIG. 6(B) is taken into the bypass passage trench on backside 334 from 351 forming an inlet port 350, and flows within the bypass passage trench on backside 334. The bypass passage trench on backside 334 is formed into a shape which is deeper forward, and the measurement target gas 30 moves little by little in a front side direction as flowing along the trench. Particularly, the bypass passage trench on backside 334 is provided with a steep slope portion 347 which becomes rapidly deep in front of the hole 342, and a part of air having small mass moves along the steep slope portion 347, and flows in the measurement surface 430 described in FIG. 5(B) from the hole 342. On the other hand, since the foreign material having great mass is hard to rapidly alter the course, the foreign material moves in the backside of measurement surface 431 shown in FIG. 6(B). Thereafter, the foreign material passes through the hole 341 and flows in the measurement surface 430 described in FIG. 5(B).

In the bypass passage trench on frontside 332 of FIG. 5(B), the air as a measurement target gas 30 moving from the hole 342 to the bypass passage trench on frontside 332 side flows along the measurement surface 430, and heat transfer is performed with the air flow sensing portion 602 for measuring a flow rate using the heat transfer surface exposing portion 436 provided in the measurement surface 430 in order to measure a flow rate. Both the measurement target gas 30 passing through the measurement surface 430 or the air flowing from the hole 341 to the bypass passage trench on frontside 332 flow along the bypass passage trench on frontside 332 and are discharged from the outlet trench 353 for forming the outlet port 352 to the main passage 124.

A substance having a heavy mass such as a contaminant mixed in the measurement target gas 30 has a high inertial force and has difficulty in steeply changing its path to the deep side of the trench along the surface of the steep slope portion 347 of FIG. 6(B) where a depth of the trench steeply deepens. For this reason, since a foreign object having a heavy mass moves through the side of the backside of measurement surface 431, it is possible to suppress the foreign object from passing through the vicinity of the heat transfer surface exposing portion 436. In this embodiment, since most of foreign objects having a heavy mass other than the gas pass through the backside of measurement surface 431 which is a rear surface of the measurement surface 430, it is possible to reduce influence of contamination caused by a foreign object such as an oil component, carbon, or a contaminant and suppress degradation of the measurement accuracy. That is, since the path of the measurement target gas 30 steeply changes along an axis across the flow axis of the main passage 124, it is possible to reduce influence of a foreign object mixed in the measurement target gas 30.

In this embodiment, the flow path including the bypass passage trench on backside 334 is directed to the flange from the leading end of the housing 302 along a curved line, and the gas flowing through the bypass passage in the side closest to the flange flows reversely to the flow of the main passage 124, so that the bypass passage in the rear surface side as one side of this reverse flow is connected to the bypass passage formed in the front surface side as the other side. As a result, it is possible to easily fix the heat transfer surface exposing portion 436 of the circuit package 400 to the bypass passage and easily receive the measurement target gas 30 in the position close to the center of the main passage 124.

In this embodiment, a hole 342 and a hole 341 which pass through the bypass passage trench on backside 334 and the bypass passage trench on frontside 332 are provided in back and forth in a flowing direction of the measurement surface 430 for measuring the air flow. The bypass passage is formed into a shape that the measurement target gas 30 moves from the bypass passage trench on backside 334 formed in one surface of the housing 302 and provided with the penetrating holes 342 and 341 to the bypass passage trench on frontside 332 formed in the other surface of the housing 302. As a result, it is possible to form the bypass passage trench in both surfaces of the housing 302 by one resin molding process, and it is possible to form a structure connecting both the surfaces in addition.

Further, since the hole 342 and the hole 341 are provided in both sides of the measurement surface 430 formed in the circuit package 400, it is possible to prevent the resin from flowing into heat transfer surface exposing portion 436 which is formed in the measurement surface 430, by utilizing a die which forms the hole 342 and the hole 341 therein. Further, in the case that the circuit package 400 is fixed to the housing 302 according to the resin molding by utilizing the formation of the hole 342 and the hole 341 in an upstream side and a downstream side of the measurement surface 430, it is possible to arrange the die by utilizing the holes, and position and fix the circuit package 400 to the die.

In this embodiment, two holes 342 and 341 are provided as the holes which pass through the bypass passage trench on backside 334 and the bypass passage trench on frontside 332. However, it is possible to form the bypass passage shape connecting the bypass passage trench on backside 334 and the bypass passage trench on frontside 332 according to one resin molding process by any one hole, without provision of two holes constituted by the hole 342 and the hole 341.

An inside wall of bypass passage on backside 391 and an outside wall of bypass passage on backside 392 are provided in both sides of the bypass passage trench on backside 334, and the inner side surface of the rear cover 304 abuts on the leading end portions of the height direction of each of the inside wall of bypass passage on backside 391 and the outside wall of bypass passage on backside 392, so that the bypass passage on backside is formed in the housing 302. In addition, an inside wall of bypass passage on frontside 393 and an outside wall of bypass passage on frontside 394 are provided in both sides of the bypass passage trench on frontside 332, and the inner side surface of the rear cover 304 abuts on the leading end portions of the height direction of the inside wall of bypass passage on frontside 393 and the outside wall of bypass passage on frontside 394, so that the bypass passage on frontside is formed in the housing 302.

In this embodiment, the measurement target gas 30 dividingly flows through the measurement surface 430 and its rear surface, and the heat transfer surface exposing portion 436 for measuring the flow rate is provided in one of them. However, the measurement target gas 30 may pass through only the front surface side of the measurement surface 430 instead of dividing the measurement target gas 30 into two passages. By curving the bypass passage to follow a second axis across a first axis of the flow direction of the main passage 124, it is possible to gather a foreign object mixed in the measurement target gas 30 to the side where the curve of the second axis is insignificant. By providing the measurement surface 430 and the heat transfer surface exposing portion 436 in the side where the curve of the second axis is significant, it is possible to reduce influence of a foreign object.

In this embodiment, the measurement surface 430 and the heat transfer surface exposing portion 436 are provided in a link portion between the bypass passage trench on frontside 332 and the bypass passage trench on backside 334. However, the measurement surface 430 and the heat transfer surface exposing portion 436 may be provided in the bypass passage trench on frontside 332 or the bypass passage trench on backside 334 instead of the link portion between the bypass passage trench on frontside 332 and the bypass passage trench on backside 334.

An orifice shape is formed in a part of the heat transfer surface exposing portion 436 provided in the measurement surface 430 to measure a flow rate, so that the flow velocity increases due to the orifice effect, and the measurement accuracy is improved. In addition, even if a vortex is generated in a flow of the gas in the upstream side of the heat transfer surface exposing portion 436, it is possible to eliminate or reduce the vortex using the orifice and improve measurement accuracy.

Referring to FIGS. 5(A), 5(B), 6(A), and 6(B), an outer wall hollow portion 366 is provided, where the upstream-side outer wall 335 has a hollow shape hollowed to the downstream side in a neck portion of the temperature detecting portion 452. Due to this outer wall hollow portion 366, a distance between the temperature detecting portion 452 and the outer wall hollow portion 366 increases, so that it is possible to reduce influence of the heat transferred via the upstream-side outer wall 335.

Although the circuit package 400 is enveloped by the fixing portion 372 for fixation of the circuit package 400, it is possible to increase a force for fixing the circuit package 400 by further fixing the circuit package 400 using the outer wall hollow portion 366. The fixing portion 372 envelopes the circuit package 400 along a flow axis of the measurement target gas 30. Meanwhile, the outer wall hollow portion 366 envelops the circuit package 400 across the flow axis of the measurement target gas 30. That is, the circuit package 400 is enveloped such that the enveloping direction is different with respect to the fixing portion 372. Since the circuit package 400 is enveloped along the two different directions, the fixing force is increased. Although the outer wall hollow portion 366 is a part of the upstream-side outer wall 335, the circuit package 400 may be enveloped in a direction different from that of the fixing portion 372 using the downstream-side outer wall 336 instead of the upstream-side outer wall 335 in order to increase the fixing force. For example, a plate portion of the circuit package 400 may be enveloped by the downstream-side outer wall 336, or the circuit package 400 may be enveloped using a hollow hollowed in the upstream direction or a protrusion protruding to the upstream direction provided in the downstream-side outer wall 336. Since the outer wall hollow portion 366 is provided in the upstream-side outer wall 335 to envelop the circuit package 400, it is possible to provide an effect of increasing a thermal resistance between the temperature detecting portion 452 and the upstream-side outer wall 335 in addition to fixation of the circuit package 400.

Since the outer wall hollow portion 366 is provided in a neck portion of the temperature detecting portion 452, it is possible to reduce influence of the heat transferred from the flange 312 or the thermal insulation 315 through the upstream-side outer wall 335. Furthermore, a temperature measurement hollow 368 formed by a notch between the upstream-side protrusion 317 and the temperature detecting portion 452 is provided. Using the temperature measurement hollow 368, it is possible to reduce heat transfer to the temperature detecting portion 452 through the upstream-side protrusion 317. As a result, it is possible to improve detection accuracy of the temperature detecting portion 452. In particular, since the upstream-side protrusion 317 has a large cross section, it easily transfers heat, and a functionality of the temperature measurement hollow 368 that suppress heat transfer becomes important.

3.2 Structure and Effects of Air Flow Sensing Portion of Bypass Passage

FIGS. 7(A) and 7(B) are partially enlarged views illustrating a state that the flow path 430 of the circuit package 400 is arranged inside the bypass passage trench as a cross-sectional view taken along the line A-A of FIGS. 6(A) and 6(B). It is noted that FIGS. 7(A) and 7(B) are a conceptual diagram omitted and simplified compared to the specific configuration of FIGS. 5(A), 5(B), 6(A), and 6(B), and details may be slightly modified. The left side of FIGS. 7(A) and 7(B) is a terminated end portion of the bypass passage trench on backside 334, and the right side is a starting end portion of the bypass passage trench on frontside 332. Although not illustrated clearly in FIGS. 7(A) and 7(B), the hole 342 and the hole 341 are provided in both the left and right sides of the circuit package 400 having the measurement surface 430, and the bypass passage trench on backside 334 and the bypass passage trench on frontside 332 are connected to the left and right sides of the circuit package 400 having the measurement surface 430.

The measurement target gas 30 that is received from the inlet port 350 and flows through the bypass passage on backside including the bypass passage trench on backside 334 is guided from the left side of FIGS. 7(A) and 7(B). A part of the measurement target gas 30 flows to a flow path 386 including the front side of the measurement surface 430 of the circuit package 400 and the protrusion 356 provided in the front cover 303 through the hole 342. The other measurement target gas 30 flows to a flow path 387 formed by the backside of measurement surface 431 and the rear cover 304. Then, the measurement target gas 30 flowing through the flow path 387 moves to the bypass passage trench on frontside 332 through the hole 341 and is combined with the measurement target gas 30 flowing through the flow path 386, so that it flows through the bypass passage trench on frontside 332 and is discharged from the outlet port 352 to the main passage 124. It is noted that the protrusion 358 provided in the rear cover 304 is protruding to the backside of measurement surface 431 in the flow path 387.

Because the bypass passage trench is formed such that the flow path of the measurement target gas 30 guided to the flow path 386 through the hole 342 from the bypass passage trench on backside 334 is curved wider than the flow path guided to the flow path 387, a substance having a heavy mass such as a contaminant contained in the measurement target gas 30 is gathered in the flow path 387 being less curved. For this reason, there is nearly no flow of a foreign object into the flow path 386.

The flow path 386 is structured to form an orifice such that the front cover 303 is provided successively to the leading end portion of the bypass passage trench on frontside 332, and the protrusion 356 smoothly protrudes to the measurement surface 430 side. The measurement surface 430 is arranged in one side of the orifice portion of the flow path 386 and is provided with the heat transfer surface exposing portion 436 for performing heat transfer between air flow sensing portion 602 and the measurement target gas 30. In order to perform measurement of the air flow sensing portion 602 with high accuracy, the measurement target gas 30 in the heat transfer surface exposing portion 436 preferably makes a laminar flow having a little vortex. In addition, with the flow velocity being faster, the measurement accuracy is more improved. For this reason, the orifice is formed such that the protrusion 356 provided in the front cover 303 to face the measurement surface 430 smoothly protrudes to the measurement surface 430. This orifice reduces a vortex in the measurement target gas 30 to approximate the flow to a laminar flow. Furthermore, since the flow velocity increases in the orifice portion, and the heat transfer surface exposing portion 436 for measuring the flow rate is arranged in the orifice portion, the measurement accuracy of the flow rate is improved.

Since the orifice is formed such that the protrusion 356 protrudes to the inside of the bypass passage trench to face the heat transfer surface exposing portion 436 provided on the flow path 430, it is possible to improve measurement accuracy. The protrusion 356 for forming the orifice is provided on the cover facing the heat transfer surface exposing portion 436 provided on the flow path 430. In FIGS. 7(A) and 7(B), since the cover facing the heat transfer surface exposing portion 436 provided on the flow path 430 is the front cover 303, the heat transfer surface exposing portion 436 is provided in the front cover 303. Alternatively, the heat transfer surface exposing portion 436 may also be provided in the cover facing the heat transfer surface exposing portion 436 provided on the flow path 430 of the front or rear cover 303 or 304. Depending on which of the surfaces the flow path 430 and the heat transfer surface exposing portion 436 in the circuit package 400 are provided, the cover that faces the heat transfer surface exposing portion 436 is changed.

A distribution of the measurement target gas 30 between the flow paths 386 and 387 also relates to the high accuracy measurement. A distribution of the measurement target gas 30 between the flow paths 386 and 387 is adjusted by causing the protrusion 358 provided in the rear cover 304 to protrude to the flow path 387. In addition, since the orifice portion is provided in the flow path 387, it is possible to increase the flow velocity and guide a foreign object such as a contaminant to the flow path 387. In the Embodiment, the orifice formed by the protrusion 358 is used as one of means for adjustment between the flow paths 386 and 387. Alternatively, the aforementioned distribution of the flow rate between the flow paths 386 and 387 may be adjusted by adjusting a width between the backside of measurement surface 431 and the rear cover 304 and the like. In this case, the protrusion 358 provided in the rear cover 304 is not necessary.

Referring to FIGS. 5(A), 5(B), 6(A), and 6(B), a press imprint 442 of the die used in the resin molding process for the circuit package 400 remains on the backside of measurement surface 431 as a rear surface of the heat transfer surface exposing portion 436 provided on the measurement surface 430. The press imprint 442 does not particularly hinder the measurement of the flow rate and does not make any problem even when the press imprint 442 remains. In addition, as described below, it is important to protect a semiconductor diaphragm of the air flow sensing portion 602 when the circuit package 400 is formed through resin molding. For this reason, pressing of the rear surface of the heat transfer surface exposing portion 436 is important. Furthermore, it is important to prevent resin that covers the circuit package 400 from flowing to the heat transfer surface exposing portion 436. For this viewpoint, the inflow of the resin is suppressed by enveloping the measurement surface 430 including the heat transfer surface exposing portion 436 using a die and pressing the rear surface of the heat transfer surface exposing portion 436 using another die. Since the circuit package 400 is made through transfer molding, a pressure of the resin is high, and pressing from the rear surface of the heat transfer surface exposing portion 436 is important. In addition, since a semiconductor diaphragm is used in the air flow sensing portion 602, a ventilation passage for a gap created by the semiconductor diaphragm is preferably formed. In order to hold and fix a plate and the like for forming the ventilation passage, pressing from the rear surface of the heat transfer surface exposing portion 436 is important.

3.3 Shapes and Effects of Front and Rear Covers 303 and 304

FIGS. 8(A) to 8(C) are a diagram illustrating an appearance of the front cover 303, in which FIG. 8(A) is a left side view, FIG. 8(B) is a front view, and FIG. 8(C) is a plan view. FIGS. 9(A) and 9(B) are diagrams illustrating an appearance of the rear cover 304, in which FIG. 9(A) is a left side view, FIG. 9(B) is a front view, and FIG. 9(C) is a plan view. In FIGS. 8(A), 8(B), 8(C), 9(A), 9(B), and 9(C), the front or rear cover 303 or 304 is used to form the bypass passage by covering the bypass passage trench of the housing 302. In addition, the front or rear cover 303 or 304 is used to form an orifice in association with the protrusion 356. For this reason, it is preferable to increase formation accuracy. Since the front or rear cover 303 or 304 is formed through a resin molding process by injecting a thermoplastic resin into a die, it is possible to form the front or rear cover 303 or 304 with high formation accuracy.

The front protection portion 322 or the rear protection portion 325 is formed in the front or rear cover 303 or 304 illustrated in FIG. 8(A) to 8(C) or 9(A) to 9(C). As illustrated in FIG. 2(A), 2(B), 3(A), or 3(B), the front protection portion 322 provided in the front cover 303 is arranged on the front side surface of the inlet port 343, and the rear protection portion 325 provided in the rear cover 304 is arranged in the rear side surface of the inlet port 343. The temperature detecting portion 452 arranged inside the inlet port 343 is protected by the front protection portion 322 and the rear protection portion 325, so that it is possible to prevent a mechanical damage of the temperature detecting portion 452 caused when the temperature detecting portion 452 collides with something during production or loading on a vehicle.

Figure 7:
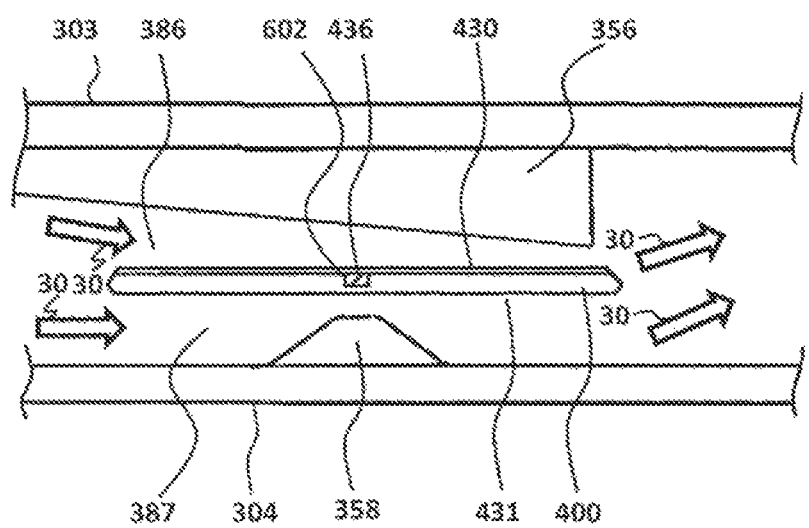
FIG. 7 is a partially enlarged view illustrating a state of a flow path surface arranged in the bypass passage.

The inner side surface of the front cover 303 is provided with the protrusion 356. As illustrated in FIG. 7, the protrusion 356 is arranged to face the measurement surface 430 and has a shape extending along an axis of the flow path of the bypass passage. An orifice is formed in the flow path 386 described above using the measurement surface 430 and the protrusion 356 so as to reduce a vortex generated in the measurement target gas 30 and generate a laminar flow. In this embodiment, the bypass passage having the orifice portion is divided into a trench portion and a lid portion that covers the trench to form a flow path having an orifice, and the trench portion is formed through a second resin molding process for forming the housing 302. Then, the front cover 303 having the protrusion 356 is formed through another resin molding process, and the trench is covered by using the front cover 303 as a lid of the trench to form the bypass passage. In the second resin molding process for forming the housing 302, the circuit package 400 having the measurement surface 430 is also fixed to the housing 302. Since formation of the trench having such a complicated shape is performed through a resin molding process, and a protrusion 356 for the orifice is provided in the front cover 303, it is possible to form the flow path 386 of FIGS. 7(A) and 7(B) with high accuracy. In addition, since an arrangement relationship between the trench and the measurement surface 430 or the heat transfer surface exposing portion 436 can be maintained with high accuracy, it is possible to reduce a variation of the product and as a result obtain a high measurement result. Therefore, it is possible to improve productivity.

The flow path 387 is formed in the same manner by the rear cover 304 and the backside of measurement surface 431. The flow path 387 is formed by separating into a trench portion and a lid portion of the flow path 386, preparing the trench portion according to a second resin molding process which forms the housing 302, and next covering the trench with the rear cover 304 having the protrusion 358. Since the flow path 387 is prepared as mentioned above, it is possible to prepare the flow path 386 at a high precision, and a productivity is improved. In this embodiment, the orifice is provided in the flow path 387, however, it is possible to use a flow path 387 with no orifice without using any protrusion 358.

In FIG. 8(B), a notch 323 for forming the outlet port 352 is provided in a leading end side of the front cover 303. As shown in FIG. 2(B), not only the outlet port 352 is expanded to a right surface of the housing 302, but also the outlet port 352 is expanded to a front surface side of the housing 302 by the notch 323. As a result, fluid resistance of a whole of the bypass passage is reduced, and the measurement target gas 30 derived from the inlet port 350 into the bypass passage is increased. As a result, the measurement precision of the air flow is improved.

3.4 Structure and Effect of Terminal Connector 320

Figure 5:
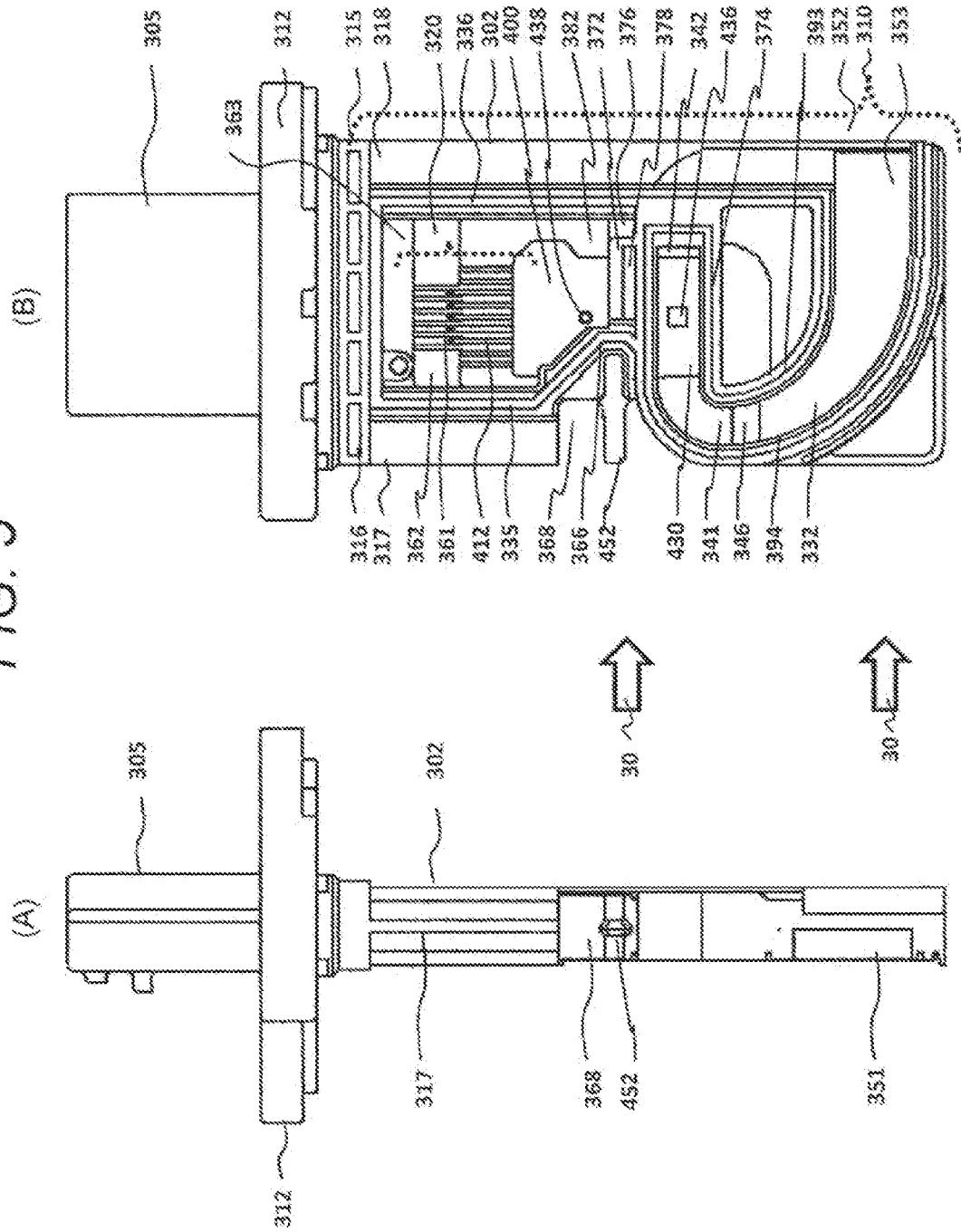
Figure 6:
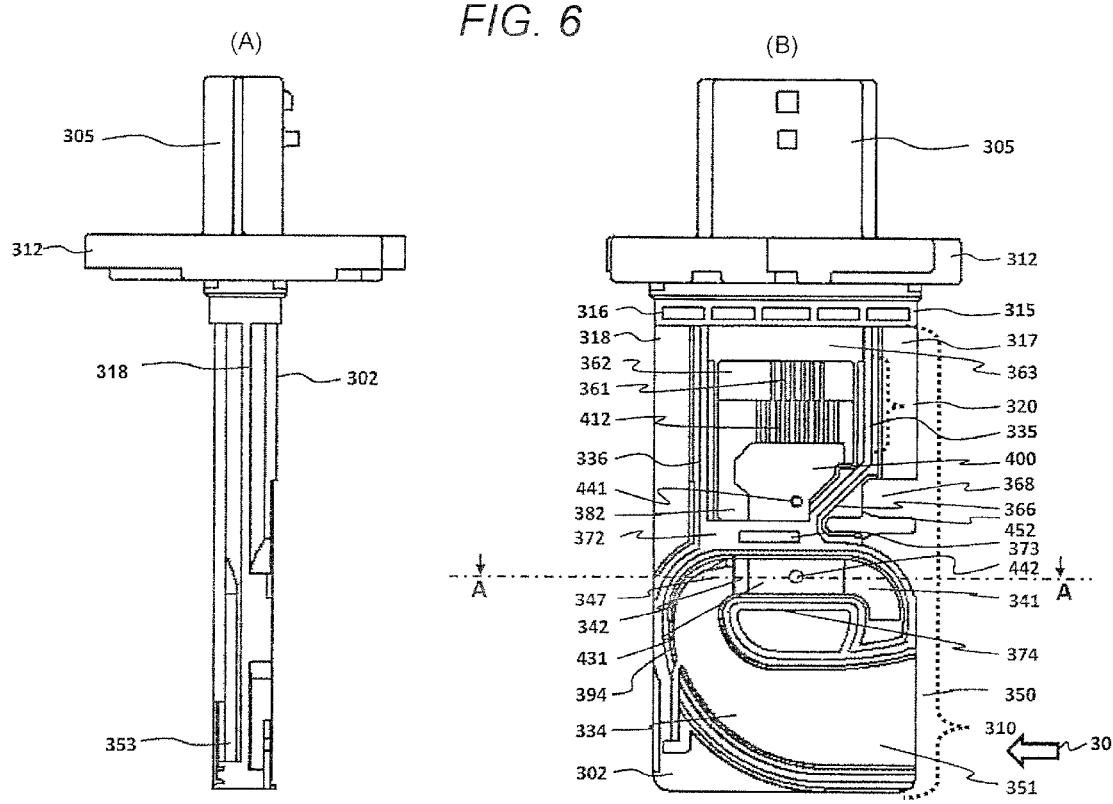
Figure 10:
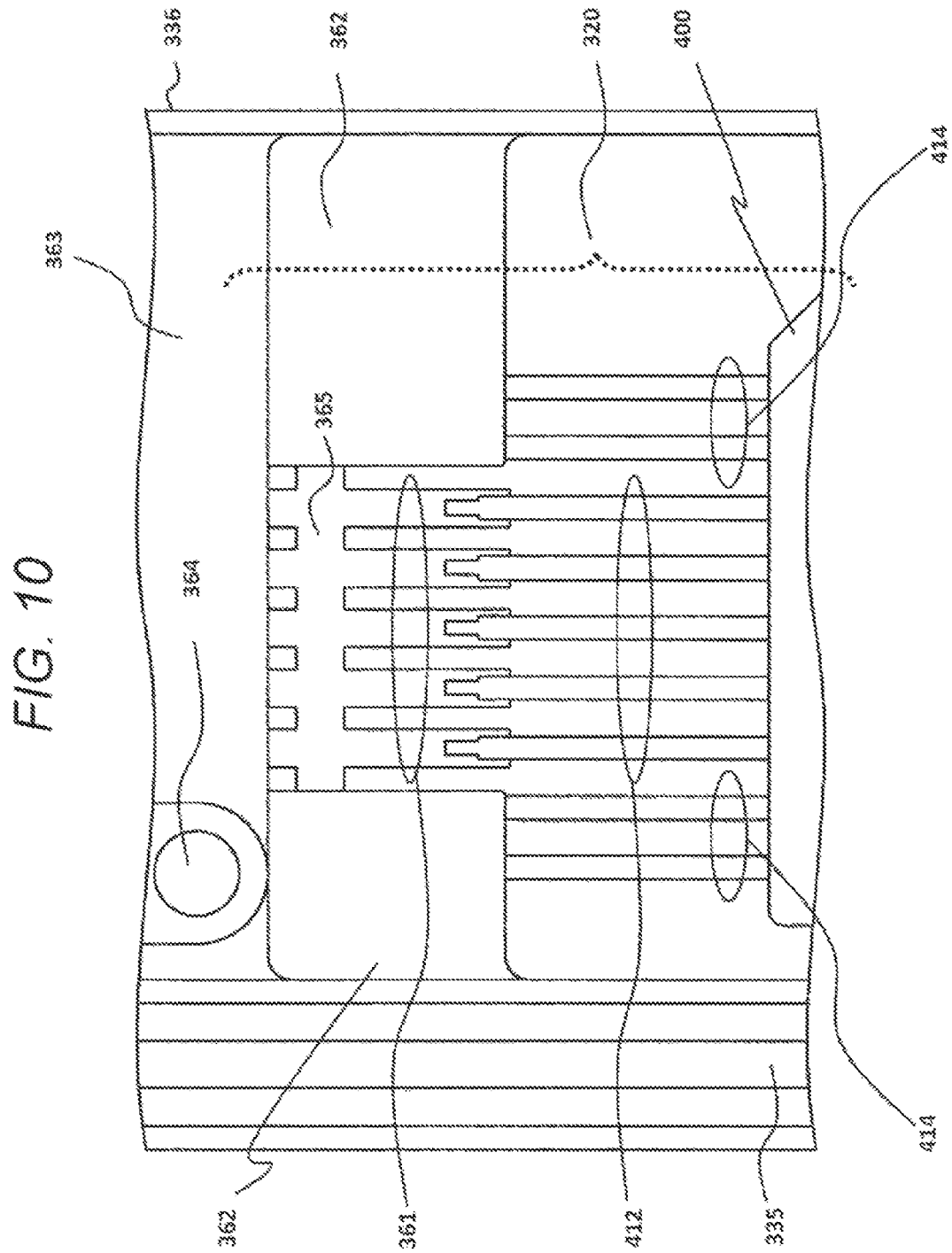
FIG. 10 is a partly enlarged view of a terminal connector.

FIG. 10 is an enlarged view of the terminal connector 320 of the housing 302 shown in FIGS. 5 and 6. However, they are somewhat different in the following points. As the different points from the description in FIGS. 5 and 6, each of the inner sockets of external terminals 361 is separated in FIGS. 5 and 6, however, FIG. 10 shows a state in which each of the inner sockets of external terminal 361 is separated, and each of the inner sockets of external terminal 361 is joined by a joint portion 365. Each of the external terminals 306 is fixed to the housing 302 according to the resin molding in a second molding process in such a manner that the inner sockets of external terminal 361 protruding to the circuit package 400 side of the external terminal 306 respectively lap over the corresponding connection terminals 412, or come to the vicinity of the corresponding connection terminals 412. In order to prevent deformation and displacement in arrangement of each of the external terminal 306, according to an embodiment, the external terminal 306 is fixed to the housing 302 according to a resin molding process (a second resin molding process) for forming the housing 302 in a state in which the inner sockets of external terminal 361 are joined by the joint portion 365. The connection terminal 412 and the inner socket of external terminal 361 may be previously fixed, and the external terminal 306 may be thereafter fixed to the housing 302 according to the second molding process.

3.5 Test of Finished Product According to First Resin Molding Process

In an embodiment shown in FIG. 10, the number of the terminals included in the circuit package 400 is larger than the number of the inner sockets of external terminal 361. The connection terminals 412 among the terminals included in the circuit package 400 are respectively connected to the inner sockets of external terminal 361, and the terminals 414 are not connected to the inner sockets of external terminal 361. In other words, the terminals 414 are the terminals which are provided in the circuit package 400, however, are not connected to the inner sockets of external terminal 361.

In FIG. 10, there are provided the terminals 414 which are not connected to the inner sockets of external terminal 361, in addition to the connection terminals 412 which are connected to the inner sockets of external terminal 361. After the circuit package 400 is produced in the first resin molding process, it is tested whether or not the circuit package 400 is correctly actuated, and whether or not any abnormality is generated in the electric connection in the first resin molding process. The high reliability about each of the circuit packages 400 can be maintained by doing so. The terminals 414 which are not connected to the inner sockets of external terminal 361 are used for the test of the circuit package 400. Since the terminals 414 are not used after the testing work, the unused terminals 414 may be disconnected at the root of the circuit package 400 after the test, or may be buried in an inner portion of the resin corresponding to the terminal side fixing portion 362 as shown in FIG. 10. Since the terminals 414 which are not connected to the inner sockets of external terminal 361 are provided as mentioned above, it is possible to test whether or not any abnormality is generated in the circuit package 400 which is produced in the first resin molding process, and the high reliability can be maintained.

3.6 Communication Structure Between Gap in Inner Portion of Housing 302 and External Portion of Thermal Flow Meter 300 and Effect As shown in a partial enlarged view in FIG. 10, a hole 364 is provided in the housing 302. The hole 364 is connected to an opening 309 which is provided in an inner portion of the external connector 305 shown in FIG. 4(A). In the embodiment, both surfaces of the housing 302 are hermetically sealed by the front cover 303 and the rear cover 304. If the hole 364 is not provided, difference is created between the air pressure within the gap and the outside air pressure due to temperature change of the air within the gap including the terminal connector 320. The pressure difference is desirably as small as possible. As a result, the vent hole 364 connecting with the opening 309 provided within the external connector 305 is provided within the gap of the housing 302. The external connector 305 is structured such that the external connector 305 is not adversely affected by the water for improving reliability of an electric connection, and it is possible to prevent the water intrusion from the opening 309 and further prevent the intrusion of the foreign materials such as the foreign particles and the dusts, by setting the opening 309 within the external connector 305.

4. Fixing Structure of Circuit Package 400 by Housing 302

4.1 Fixing Structure of Circuit Package 400 by Fixing Portion of Housing 302

Next, fixation of the circuit package 400 to the housing 302 through a resin molding process will be described again with reference to FIGS. 5(A), 5(B), 6(A), and 6(B). The circuit package 400 is arranged in and fixed to the housing 302 such that the measurement surface 430 formed on the front surface of the circuit package 400 is arranged in a predetermined position of the bypass passage trench for forming the bypass passage, for example, a link portion between the bypass passage trench on frontside 332 and the bypass passage trench on backside 334 in the embodiment of FIGS. 5(A), 5(B), 6(A), and 6(B). A portion for burying and fixing the circuit package 400 into the housing 302 through a resin molding is provided as a fixing portion 372 for burying and fixing the circuit package 400 into the housing 302 in the side slightly closer to the flange 312 from the bypass passage trench. The fixing portion 372 is buried so as to cover the outer circumference of the circuit package 400 formed through the first resin molding process.

As shown in FIG. 5(B), a hollow 376 and a hollow 378 are provided in a front surface of the fixing portion 372. Further, as shown in FIG. 6(B), a hollow 373 is formed in a back surface of the fixing portion 372. It is possible to reduce deflation when the resin temperature comes down in the case of forming the fixing portion 372, on the basis of the hollows, and it is possible to reduce concentration of stress applied to the circuit package 400. Further, the lowering speed of the resin temperature can be reduced by restricting the resin flow by the die for forming the hollows mentioned above, and the resin constructing the fixing portion 372 can easily enter deeply into the concavities and convexities provided in the front face of the circuit package 400.

The entire surface of the circuit package 400 is not covered by a resin used to form the housing 302, but a portion where the outer wall of the circuit package 400 is exposed is provided in the flange 312 side of the fixing portion 372. In the embodiment of FIGS. 5(A), 5(B), 6(A), and 6(B), the area of a portion exposed from the resin of the housing 302 but not enveloped by the housing 302 is larger than the area of a portion enveloped by the resin of the housing 302 out of the outer circumferential surface of the circuit package 400. Furthermore, a portion of the measurement surface 430 of the circuit package 400 is also exposed from the resin of the housing 302.

An excessive stress concentration due to volume deflation is reduced in a process of hardening the fixing portion 372 so as to contain the periphery of the circuit package 400, in a second resin molding process for forming the housing 302, by forming the hollows respectively in the front face and the rear face of the fixing portion 372 which covers an outer wall of the circuit package 400 like a band over a whole circumference. The excessive stress concentration has a chance of adversely affecting the circuit package 400.

4.2 Improvement of Degree of Adhesion Between Housing 302 and Circuit Package 400

In order to more robustly fix the circuit package 400 with a small area by reducing the area of a portion enveloped by the resin of the housing 302 of the outer circumferential surface of the circuit package 400, it is preferable to increase adherence of the circuit package 400 to the outer wall in the fixing portion 372. When a thermoplastic resin is used to form the housing 302, it is preferable that the thermoplastic resin be penetrated into fine unevennesses on the outer wall of the circuit package 400 while it has low viscosity, and the thermoplastic resin be solidified while it is penetrated into the fine unevennesses of the outer wall. In the resin molding process for forming the housing 302, it is preferable that the inlet port of the thermoplastic resin be provided in the fixing portion 372 and in the vicinity thereof. The viscosity of the thermoplastic resin increases as the temperature decreases, so that it is solidified. Therefore, by flowing the thermoplastic resin having a high temperature into the fixing portion 372 or from the vicinity thereof, it is possible to solidify the thermoplastic resin having low viscosity while it abuts on the outer wall of the circuit package 400. Further, since the hollow 376 and the hollow 378, and the hollow 373 are formed in the fixing portion 372, a barrier portion restricting the flow of the thermoplastic resin is formed by the die for forming the hollows, and a moving speed of the thermoplastic resin in the fixing portion 372 is lowered. As a result, the temperature reduction of the thermoplastic resin is suppressed, a low-viscosity state is elongated, and an adherence between the circuit package 400 and the fixing portion 372 is improved.

By roughening the outer wall surface of the circuit package 400, it is possible to improve adherence between the circuit package 400 and the fixing portion 372. As a method of roughening the outer wall surface of the circuit package 400, there is known a roughening method for forming fine unevennesses on the surface of the circuit package 400, such as a satin-finish treatment, after forming the circuit package 400 through the first resin molding process. As the roughening method for forming fine unevennesses on the surface of the circuit package 400, for example, the roughening may be achieved using sand blasting. Furthermore, the roughening may be achieved through a laser machining.

As another roughening method, an uneven sheet is attached on an inner surface of the die used in the first resin molding process, and the resin is pressed to the die having the sheet on the surface. Even using this method, it is possible to form and roughen fine unevennesses on a surface of the circuit package 400. Alternatively, unevennesses may be attached on an inner side of the die for forming the circuit package 400 to roughen the surface of the circuit package 400. The surface portion of the circuit package 400 for such roughening is at least a portion where the fixing portion 372 is provided. In addition, the adherence is further strengthened by roughening a surface portion of the circuit package 400 where the outer wall hollow portion 366 is provided.

When the unevenness machining is performed for the surface of the circuit package 400 using the aforementioned sheet, the depth of the trench depends on the thickness of the sheet. If the thickness of the sheet increases, the molding of the first resin molding process becomes difficult, so that the thickness of the sheet has a limitation. If the thickness of the sheet decreases, the depth of the unevenness provided on the sheet in advance has a limitation. For this reason, when the aforementioned sheet is used, it is preferable that the depth of the unevenness between the bottom and the top of the unevenness be set to 10 µm or larger and 20 µm or smaller. In the depth smaller than 10 µm, the adherence effect is degraded. The depth larger than 20 µm is difficult to obtain from the aforementioned thickness of the sheet.

In roughening methods other than the aforementioned method of using the sheet, it is preferable to set a thickness of the resin in the first resin molding process for forming the circuit package 400 to 2 mm or smaller. For this reason, it is difficult to increase the depth of the unevenness between the bottom and the top of the unevenness to 1 mm or larger. Conceptually, it is anticipated that adherence between the resin that covers the circuit package 400 and the resin used to form the housing 302 increases as the depth of the unevenness between the bottom and the top of the unevenness on the surface of the circuit package 400 increases. However, for the reason described above, the depth of the unevenness between the bottom and the top of the unevenness is preferably set to 1 mm or smaller. That is, if the unevenness having a thickness of 10 µm or larger and 1 mm or smaller is provided on the surface of the circuit package 400, it is preferable to increase adherence between the resin that covers the circuit package 400 and the resin used to form the housing 302.

A thermal expansion coefficient is different between the thermosetting resin used to form the circuit package 400 and the thermoplastic resin used to form the housing 302 having the fixing portion 372. It is preferable to prevent an excessive stress generated from this difference of the thermal expansion coefficient from being applied to the circuit package 400. It is possible to reduce the stress applied to the circuit package 400 by setting the hollow 373 and the hollow 378, and the hollow 376 mentioned above.

By forming the fixing portion 372 that envelops the outer circumference of the circuit package 400 in a band shape and narrowing the width of the band, it is possible to alleviate a stress caused by a difference of the thermal expansion coefficient applied to the circuit package 400. A width of the band of the fixing portion 372 is set to 10 mm or smaller, and preferably 8 mm or smaller. In this embodiment, since the outer wall hollow portion 366 as a part of the upstream-side outer wall 335 of the housing 302 as well as the fixing portion 372 envelops the circuit package 400 to fix the circuit package 400, it is possible to further reduce the width of the band of the fixing portion 372. The circuit package 400 can be fixed, for example, if the width is set to 3 mm or larger.

In order to reduce a stress caused by the difference of the thermal expansion coefficient, a portion covered by the resin used to form the housing 302 and an exposed portion without covering are provided on the surface of the circuit package 400. A plurality of portions where the surface of the circuit package 400 is exposed from the resin of the housing 302 are provided, and one of them is to the measurement surface 430 having the heat transfer surface exposing portion 436 described above. In addition, a portion exposed to a part of the flange 312 side relative to the fixing portion 372 is provided. Furthermore, the outer wall hollow portion 366 is formed to expose a portion of the upstream side relative to the outer wall hollow portion 366, and this exposed portion serves as a support portion that supports the temperature detecting portion 452. A gap is formed such that a portion of the outer surface of the circuit package 400 in the flange 312 side relative to the fixing portion 372 surrounds the circuit package 400 across its outer circumference, particularly, the side facing the flange 312 from the downstream side of the circuit package 400 and further across the upstream side of the portion close to the terminal of the circuit package 400. Since the gap is formed around the portion where the surface of the circuit package 400 is exposed, it is possible to reduce the heat amount transferred to the circuit package 400 through the flange 312 from the main passage 124 and suppress degradation of measurement accuracy caused by the heat.

A gap is formed between the circuit package 400 and the flange 312, and this gap serves as a terminal connector 320. The connection terminal 412 of the circuit package 400 and the inner socket of external terminal 361 positioned in the housing 302 side of the external terminal 306 are electrically connected to each other using this terminal connector 320 through spot welding, laser welding, and the like. The gap of the terminal connector 320 can suppress heat transfer from the housing 302 to the circuit package 400 as described above and is provided as a space that can be used to perform a connection work between the connection terminal 412 of the circuit package 400 and the inner socket of external terminal 361 of the external terminal 306.

4.3 Formation of Housing 302 Through Second Resin Molding Process and Improvement of the Measurement Precision In the housing 302 illustrated in FIGS. 5(A), 5(B), 6(A), and 6(B) described above, the circuit package 400 having the air flow sensing portion 602 or the processing unit 604 is manufactured through the first resin molding process. Then, the housing 302 having, for example, the bypass passage trench on frontside 332 or the bypass passage trench on backside 334 for forming the bypass passage where the measurement target gas 30 flows are manufactured through the second resin molding process. Through this second resin molding process, the circuit package 400 is embedded into the resin of the housing 302 and is fixed to the inside of the housing 302 through resin molding. As a result, the air flow sensing portion 602 performs heat transfer with the measurement target gas 30, so that a configuration relationship such as a positional relationship or a directional relationship between the heat transfer surface exposing portion 436 for measuring the flow rate and the bypass passage including, for example, the bypass passage trench on frontside 332 or the bypass passage trench on backside 334 can be maintained with remarkably high accuracy. In addition, it is possible to suppress an error or deviation generated in each circuit package 400 to a very small value. As a result, it is possible to remarkably improve measurement accuracy of the circuit package 400. For example, compared to a conventional method in which fixation is performed using an adhesive, it is possible to improve measurement accuracy twice or more. Since the thermal flow meter 300 is typically manufactured in large quantities, the method of using an adhesive along with strict measurement has a limitation in improvement of measurement accuracy. However, if the circuit package 400 is manufactured through the first resin molding process as in this embodiment, and the bypass passage is then formed in the second resin molding process for forming the bypass passage where the measurement target gas 30 flows while the circuit package 400 and the bypass passage are fixed, it is possible to remarkably reduce a variation of the measurement accuracy and remarkably improve the measurement accuracy of each thermal flow meter 300. This similarly applies to the embodiment of FIG. 7 as well as the embodiment of FIG. 5(A), 5(B), 6(A), or 6(B).

Further referring to the embodiment of, for example, FIG. 5(A), 5(B), 6(A), or 6(B), it is possible to fix the circuit package 400 to the housing 302 such that a relationship between the bypass passage trench on frontside 332, the bypass passage trench on backside 334, and the heat transfer surface exposing portion 436 is set to a specific relationship. As a result, in each of the thermal flow meters 300 produced in large quantities, a positional relationship or a configuration relationship between the heat transfer surface exposing portion 436 of each circuit package 400 and the bypass passage can be regularly obtained with remarkably high accuracy. Since the bypass passage trench where the heat transfer surface exposing portion 436 of the circuit package 400 is fixed, for example, the bypass passage trench on frontside 332 and the bypass passage trench on backside 334 can be formed with remarkably high accuracy, a work of forming the bypass passage in this bypass passage trench is a work for covering both sides of the housing 302 using the front or rear cover 303 or 304. This work is very simple and is a work process having a few factors of degrading the measurement accuracy. In addition, the front or rear cover 303 or 304 is produced through a resin molding process having high formation accuracy. Therefore, it is possible to form the bypass passage provided in a specific relationship with the heat transfer surface exposing portion 436 of the circuit package 400 with high accuracy. In this manner, it is possible to obtain high productivity in addition to improvement of measurement accuracy.

In comparison, in the related art, the thermal flow meter was produced by fabricating the bypass passage and then bonding the measuring portion to the bypass passage using an adhesive. Such a method of using an adhesive is disadvantageous because a thickness of the adhesive is irregular, and a position or angle of the adhesive is different in each product. For this reason, there was a limitation in improvement of the measurement accuracy. If this work is performed in mass production, it is further difficult to improve the measurement accuracy.

In the embodiment according to the invention, first, the circuit package 400 having the air flow sensing portion 602 is produced through a first resin molding process, and the circuit package 400 is then fixed through resin molding while the bypass passage trench for forming the bypass passage through resin molding is formed through a second resin molding process. As a result, it is possible to form the shape of the bypass passage trench and fix the air flow sensing portion 602 to the bypass passage trench with significantly high accuracy.

A portion relating to the measurement of the flow rate, such as the heat transfer surface exposing portion 436 of the air flow sensing portion 602 or the measurement surface 430 installed in the heat transfer surface exposing portion 436, is formed on the surface of the circuit package 400. Then, the measurement surface 430 and the heat transfer surface exposing portion 436 are exposed from the resin used to form the housing 302. That is, the heat transfer surface exposing portion 436 and the measurement surface 430 around the heat transfer surface exposing portion 436 are not covered by the resin used to form the housing 302. The measurement surface 430 formed through the resin molding of the circuit package 400, the heat transfer surface exposing portion 436, or the temperature detecting portion 452 is directly used even after the resin molding of the housing 302 to measure a flow rate of the thermal flow meter 300 or a temperature. As a result, the measurement accuracy is improved.

In the embodiment according to the invention, the circuit package 400 is integratedly formed with the housing 302 to fix the circuit package 400 to the housing 302 having the bypass passage. Therefore, it is possible to fix the circuit package 400 to the housing 302 with a small fixation area. That is, it is possible to increase the surface area of the circuit package 400 that does not make contact with the housing 302. The surface of the circuit package 400 that does not make contact with the housing 302 is exposed to, for example, a gap. The heat of the intake pipe is transferred to the housing 302 and is then transferred from the housing 302 to the circuit package 400. Even if the contact area between the housing 302 and the circuit package 400 is reduced instead of enveloping the entire surface or most of the surface of the circuit package 400 with the housing 302, it is possible to maintain high reliability with high accuracy and fix the circuit package 400 to the housing 302. For this reason, it is possible to suppress heat transfer from the housing 302 to the circuit package 400 and suppress a decrease of the measurement accuracy.

In the embodiment illustrated in FIG. 5(A), 5(B), 6(A), or 6(B), the area A of the exposed surface of the circuit package 400 can be set to be equal to or larger than the area B covered by a molding material used to form the housing 302. In the embodiment, the area A is larger than the area B. As a result, it is possible to suppress heat transfer from the housing 302 to the circuit package 400. In addition, it is possible to reduce a stress generated by a difference between a thermal expansion coefficient of the thermosetting resin used to form the circuit package 400 and a thermal expansion coefficient of the thermoplastic resin used to form the housing 302.

4.4 Fixing of Circuit Package 400 by Second Resin Molding Process and Effect Thereof A hatched portion in FIGS. 11(A) to 11(C) indicate a fixation surface 432 and a fixation surface 434 for covering the circuit package 400 with the thermoplastic resin which is used in the second resin molding process for fixing the circuit package 400 to the housing 302 in the second resin molding process. As described by using FIGS. 5 and 6, it is important to maintain at a high precision so that the relationship between the measurement surface 430 and the heat transfer surface exposing portion 436 provided in the measurement surface 430, and the shape of the bypass passage comes to a prescribed relationship. Since the circuit package 400 is fixed to the housing 302 forming the bypass passage at the same time of forming the bypass passage in the second resin molding process, it is possible to maintain the relationship between the bypass passage, and the measurement surface 430 and the heat transfer surface exposing portion 436 at an extremely high precision. In other words, since the circuit package 400 is fixed to the housing 302 in the second resin molding process, it is possible to position and fix the circuit package 400 within the die for forming the housing 302 having the bypass passage at a high precision, and the circuit package 400 is fixed to the bypass passage after being molded at a high precision by injecting the high-temperature thermoplastic resin into the die.

In this embodiment, the entire surface of the circuit package 400 is not a fixation surface 432 covered by the resin used to form the housing 302, but the front surface is exposed to the connection terminal 412 side of the circuit package 400. That is, a portion not covered by the resin used to form the housing 302 is provided. In the embodiment illustrated in FIGS. 11(A) to 11(C), out of the front surface of the circuit package 400, the area that is not enveloped by the resin used to form the housing 302 but is exposed from the resin used to form the housing 302 is larger than the area of the fixation surface 432 and the fixation surface 434 enveloped by the resin used to form the housing 302.

A thermal expansion coefficient is different between the thermosetting resin used to form the circuit package 400 and the thermoplastic resin used to form the housing 302 having the fixing portion 372. It is preferable to prevent a stress caused by this difference of the thermal expansion coefficient from being applied to the circuit package 400 as long as possible. By reducing the front surface of the circuit package 400 and the fixation surface 432, it is possible to reduce influence based on the difference of the thermal expansion coefficient. For example, it is possible to reduce the fixation surface 432 on the front surface of the circuit package 400 by providing a band shape having a width L.

It is possible to increase a mechanical strength of the protrusion 424 by providing the fixation surface 432 in the base of the protrusion 424. It is possible to more robustly fix the circuit package 400 and the housing 302 to each other by providing, on the front surface of the circuit package 400, a band-shaped fixation surface along a flow axis of the measurement target gas 30 and a fixation surface across the flow axis of the measurement target gas 30. On the fixation surface 432, a portion surrounding the circuit package 400 in a band shape having a width L along the measurement surface 430 is the fixation surface along the flow axis of the measurement target gas 30 described above, and a portion that covers the base of the protrusion 424 is the fixation surface across the flow axis of the measurement target gas 30.

In FIGS. 11(A) to 11(C), the circuit package 400 is formed in the first resin molding process as mentioned above. The hatched portion described in the outer appearance of the circuit package 400 indicates the fixation surface 432 and the fixation surface 434 in which the circuit package 400 is covered with the resin used in the second resin molding process when the housing 302 is formed in the second resin molding process after manufacturing the circuit package 400 in the first resin molding process. FIG. 11(A) is a left side elevational view of the circuit package 400, FIG. 11(B) is a front elevational view of the circuit package 400, and FIG. 11(C) is a back elevational view of the circuit package 400. The circuit package 400 has an air flow sensing portion 602 and a processing unit 604 mentioned later built-in, and they are molded by a thermosetting resin and are integrally formed. The measurement surface 430 acting as a surface for flowing the measurement target gas 30 is formed in a front face of the circuit package 400 shown in FIG. 11(B) with a shape elongating in the flow direction of the measurement target gas 30. In the embodiment, the measurement surface 430 is formed into a rectangular shape elongating in the flow direction of the measurement target gas 30. The measurement surface 430 is formed thinner than the other portions as shown in FIG. 11(A), and the heat transfer surface exposing portion 436 is provided in a part thereof. The built-in air flow sensing portion 602 carries out the heat transfer with the measurement target gas 30 via the heat transfer surface exposing portion 436, measures a state of the measurement target gas 30, for example, a flow speed of the measurement target gas 30, and outputs an electric signal expressing the air flow flowing in the main passage 124.

In order to make the built-in air flow sensing portion 602 (refer to FIG. 19) measure the state of the measurement target gas 30 at a high precision, it is desirable that the gas flowing in the vicinity of the heat transfer surface exposing portion 436 is a laminar flow and has a small turbulence. As a result, it is preferable that any step between the flow path side surface of the heat transfer surface exposing portion 436 and the surface of the measurement surface 430 guiding the gas is not provided. According to the structure, it is possible to inhibit any uneven stress and strain from acting on the air flow sensing portion 602 while keeping the air flow measurement precision at a high precision. The step may be provided as long as the step does not affect the air flow measurement precision.

A press imprint 442 of a die press supporting an internal substrate or a plate at the resin molding time of the circuit package 400 is left in a rear face of the measurement surface 430 having the heat transfer surface exposing portion 436, as shown in FIG. 11(C). The heat transfer surface exposing portion 436 is a place which is used for exchanging heat with the measurement target gas 30, and it is desirable that the heat transfer between the air flow sensing portion 602 and the measurement target gas 30 is well carried out for accurately measuring the state of the measurement target gas 30. As a result, it is necessary to avoid the matter that the portion of the heat transfer surface exposing portion 436 is covered with the resin in the first resin molding process. The die is applied to both surfaces of the heat transfer surface exposing portion 436 and the backside of measurement surface 431 which is the rear face of the heat transfer surface exposing portion, and the resin inflow into the heat transfer surface exposing portion 436 is prevented by the die. The press imprint 442 having a concave shape is formed in the rear face of the heat transfer surface exposing portion 436. The elements constructing the air flow sensing portion 602 are arranged near the portion, and it is desirable to radiate the heat generation of the elements to the external portion as much as possible. The formed concave portion is less affected by the resin and achieves an easily radiating effect.

A semiconductor diaphragm constructing the air flow sensing portion 602 is arranged in the inner portion of the heat transfer surface exposing portion 436, and a gap is formed in a rear face of the semiconductor diaphragm. In the case that the gap is hermetically sealed, the semiconductor diaphragm is deformed by the change of the pressure within the gap due to the temperature change, and the precision of measurement is lowered. As a result, in the embodiment, an opening 438 communicating with the gap of the rear face of the semiconductor diaphragm is provided in a front face of the circuit package 400, and a link channel passage joining the gap in the rear face of the semiconductor diaphragm and the opening 438 is provided in the inner portion of the circuit package 400. The opening 438 is provided in a portion where the hatched portion shown in FIGS. 11(A) to 11(C) is not described, in such a manner that the opening 438 is not occluded by the resin in the second resin molding process.

It is necessary to form the opening 438 in the first resin molding process, the inflow of the resin to the portion of the opening 438 is blocked by applying the die to the portion of the opening 438 and the rear face thereof and pressing both the front and rear faces by the die, and the opening 438 is formed. The formation of the opening 438 and the link channel passage joining the gap in the rear face of the semiconductor diaphragm and the opening 438 will be mentioned later.

In the circuit package 400, the press imprint 442 is left in the rear face of the circuit package 400 in which the heat transfer surface exposing portion 436 is formed. In the first resin molding process, the die, for example, an insert is applied to the portion of the heat transfer surface exposing portion 436 for preventing the resin from flowing into the heat transfer surface exposing portion 436, the die is further applied to the portion of the press imprint 442 in an opposite surface thereto, and the resin flow into the heat transfer surface exposing portion 436 is blocked by both the dies. As a result, it is possible to measure the air flow of the measurement target gas 30 at an extremely high precision by forming the portion of the heat transfer surface exposing portion 436. Further, since the portion of the press imprint 442 has no resin or hardly has the resin in the second resin molding process, a heat radiating effect is great. In the case that a lead is used as the second plate 536, there is an effect that the heat generation in the adjacent circuit can be radiated via the lead.

5. Mounting of Circuit Parts to Circuit Package 5.1 Frame of Circuit Package and Mounting of Circuit Parts FIG. 12 illustrates a frame 512 of the circuit package 400 and a mounting state of a chip as a circuit component 516 mounted on the frame 512. It is noted that the dotted line 508 indicates a portion covered by the die used to mold the circuit package 400. A lead 514 is mechanically connected to the frame 512, and a plate 532 is mounted in the center of the frame 512. A chip-like air flow sensing portion 602 and a processing unit 604 as a larger scale integrated (LSI) circuit are mounted on the plate 532. A diaphragm 672 is provided in the air flow sensing portion 602, and each terminal of the air flow sensing portion 602 described below and the processing unit 604 are connected using a wire 542. Moreover, each terminal of the processing unit 604 and a corresponding lead 514 are connected using a wire 543. In addition, the lead 514 positioned between a portion corresponding to the connection terminal of the circuit package 400 and the plate 532 is connected to the chip-like circuit component 516 therebetween.

The air flow sensing portion 602 having the diaphragm 672 is arranged in the most leading end side when the circuit package 400 is obtained in this manner. The processing unit 604 is arranged in the side corresponding to the connection terminal for the air flow sensing portion 602 in an LSI state.

In addition, a connection wire 543 is arranged in the terminal side of the processing unit 604. By sequentially arranging the air flow sensing portion 602, the processing unit 604, the wire 543, the circuit component 516, and the connection lead 514 in this order from the leading end side of the circuit package 400 to the connection terminal, the entire circuit package 400 becomes simple and concise.

A thick lead is provided to support the plate 532, and this lead is fixed to the frame 512 using the lead 556 or 558. It is noted that a lead surface having the same area as that of the plate 532 connected to the thick lead is provided on the lower surface of the plate 532, and the plate 532 is mounted on the lead surface. This lead surface is grounded. As a result, it is possible to suppress noise by commonly grounding the circuit of the air flow sensing portion 602 or the processing unit 604 using the lead surface, so that measurement accuracy of the measurement target gas 30 is improved. In addition, a lead 544 is provided in the upstream side of the flow path from the plate 532, that is, so as to protrude along an axis directed across the axis of the air flow sensing portion 602, the processing unit 604, or the circuit component 516 described above. A temperature detection element 518, for example, a chip-like thermistor is connected to this lead 544. In addition, a lead 548 is provided in the vicinity of the processing unit 604 which is a base of the protrusion, and the leads 544 and 548 are electrically connected using a thin connection line 546. As the leads 548 and 544 are directly connected, the heat is transferred to the temperature detection element 518 through the leads 548 and 544, so that it may be difficult to accurately measure a temperature of the measurement target gas 30. For this reason, by connecting a wire having a small cross-sectional area and a large thermal resistance, it is possible to increase a thermal resistance between the leads 548 and 544. As a result, it is possible to improve temperature measurement accuracy of the measurement target gas 30 so as to prevent influence of the heat from reaching the temperature detection element 518.

The lead 548 is fixed to the frame 512 through the lead 552 or 554. A connection portion between the lead 552 or 554 and the frame 512 is fixed to the frame 512 while it is inclined against the protruding direction of the protruding temperature detection element 518, and the die is also inclined in this area. As the molding resin flows along in this inclination in the first resin molding process, the molding resin of the first resin molding process smoothly flows to the leading end portion where the temperature detection element 518 is provided, so that reliability is improved.

In FIG. 12, an arrow 592 indicates a resin injection direction. The lead frame where a circuit component is mounted is covered by the die, and a pressed fitting hole 590 for resin injection to the die is provided in a circled position, so that a thermosetting resin is injected into the die along the direction of the arrow 592. The circuit component 516 or the temperature detection element 518 and the lead 544 for holding the temperature detection element 518 are provided along the direction of the arrow 592 from the pressed fitting hole 590. In addition, the plate 532, the processing unit 604, and the air flow sensing portion 602 are arranged in a direction close to the arrow 592. In this arrangement, the resin smoothly flows in the first resin molding process. In the first resin molding process, a thermosetting resin is used, so that it is important to widen the resin before solidification. For this reason, arrangement of a circuit component of the lead 514 or a wire and a relationship between the pressed fitting hole 590 and the injection direction become important.

5.2 Structure for Connecting Gap on Rear Surface of Diaphragm and Opening

FIG. 13 is a diagram illustrating a part of the cross section taken along a line C-C of FIG. 12 for describing a communication hole 676 that connects a gap 674 provided in and inside the diaphragm 672 and the hole 520.

As described below, the air flow sensing portion 602 for measuring the flow rate of the measurement target gas 30 is provided with a diaphragm 672, and a gap 674 is provided on the rear surface of the diaphragm 672. Although not illustrated, the diaphragm 672 is provided with an element for exchanging heat with the measurement target gas 30 and measuring the flow rate thereby. If the heat is transferred to the elements formed in the diaphragm 672 through the diaphragm 672 separately from the heat exchange with the measurement target gas 30, it is difficult to accurately measure the flow rate. For this reason, it is necessary to increase a thermal resistance of the diaphragm 672 and form the diaphragm 672 as thin as possible.

The diaphragm 672 is fixed while being buried with the first resin of the circuit package 400 which is formed in the first resin molding process, a front face of the diaphragm 672 is provided with the element (not shown), and the element carries out heat transfer with the measurement target gas 30 (not shown) via the heat transfer surface 437 in the front face of the element in the heat transfer surface exposing portion 436. The heat transfer surface 437 may be constructed by the front face of each of the elements, or may be provided with a thin protection film thereon. It is desirable that the heat transfer between the element and the measurement target gas 30 is smoothly carried out, and a direct heat transfer between the elements is as small as possible.

A portion of the diaphragm 672 where the elements are provided is arranged in the heat transfer surface exposing portion 436 of the measurement surface 430, and the heat transfer surface 437 is exposed from the resin used to form the measurement surface 430. The outer circumference of the diaphragm 672 is covered by the thermosetting resin used in the first resin molding process for forming the measurement surface 430. If only the side face of the diaphragm 672 is covered by the thermosetting resin, and the surface side of the outer circumference of the diaphragm 672 is not covered by the thermosetting resin, a stress generated in the resin used to form the measurement surface 430 is received only by the side face of the diaphragm 672, so that a distortion may generated in the diaphragm 672, and characteristics may be deteriorated. The distortion of the diaphragm 672 is reduced by covering the outer circumference portion of the diaphragm 672 with the thermosetting resin as illustrated in FIG. 13. Meanwhile, if a height difference between the heat transfer surface 437 and the measurement surface 430 where the measurement target gas 30 flows is large, the flow of the measurement target gas 30 is disturbed, so that measurement accuracy is degraded. Therefore, it is preferable that a height difference W between the heat transfer surface 437 and the measurement surface 430 where the measurement target gas 30 flows be small.

The diaphragm 672 is formed thin in order to suppress heat transfer between each element, and a gap 674 is formed in the rear surface of the diaphragm 672. If this gap 674 is sealed, a pressure of the gap 674 formed on the rear surface of the diaphragm 672 changes depending on a temperature change. As a pressure difference between the gap 674 and the surface of the diaphragm 672 increases, the diaphragm 672 receives the pressure, and a distortion is generated, so that high accuracy measurement becomes difficult. For this reason, a hole 520 connected to the opening 438 opened to the outside is provided in the plate 532, and a communication hole 676 that connects this hole 520 and the diaphragm 672 is provided. This communication hole 676 consists of, for example, a pair of plates including first and second plates 534 and 536. The first plate 534 is provided with holes 520 and 521 and a trench for forming the communication hole 676. The communication hole 676 is formed by covering the trench and the holes 520 and 521 with the second plate 536. Using the communication hole 676 and the hole 520, the pressures applied to the front and rear surfaces of the diaphragm 672 becomes approximately equal, so that the measurement accuracy is improved.

As described above, the communication hole 676 can be formed by covering the trench and the holes 520 and 521 with the second plate 536. Alternatively, the lead frame may be used as second plate 536. As described in relation to FIG. 12, the diaphragm 672 and the LSI circuit serving as the processing unit 604 are provided on the plate 532. A lead frame for supporting the plate 532 where the diaphragm 672 and the processing unit 604 are mounted is provided thereunder. Therefore, using the lead frame, the structure becomes simpler. In addition, the lead frame may be used as a ground electrode. If the lead frame serves as the second plate 536, and the communication hole 676 is formed by covering the holes 520 and 521 formed in the first plate 534 using the lead frame and covering the trench formed in the first plate 534 using the lead frame in this manner, it is possible to simplify the entire structure. In addition, it is possible to reduce influence of noise from the outside of the diaphragm 672 and the processing unit 604 because the lead frame serves as a ground electrode.

In the circuit package 400, the press imprint 442 remains on the rear surface of the circuit package 400 where the heat transfer surface exposing portion 436 is formed. In the first resin molding process, in order to prevent an inflow of the resin to the heat transfer surface exposing portion 436, a die such as an insertion die is installed in a portion of the heat transfer surface exposing portion 436, and a die is installed in a portion of the press imprint 442 opposite thereto, so that an inflow of the resin to the heat transfer surface exposing portion 436 is suppressed. By forming a portion of the heat transfer surface exposing portion 436 in this manner, it is possible to measure the flow rate of the measurement target gas 30 with significantly high accuracy.

Figure 14:
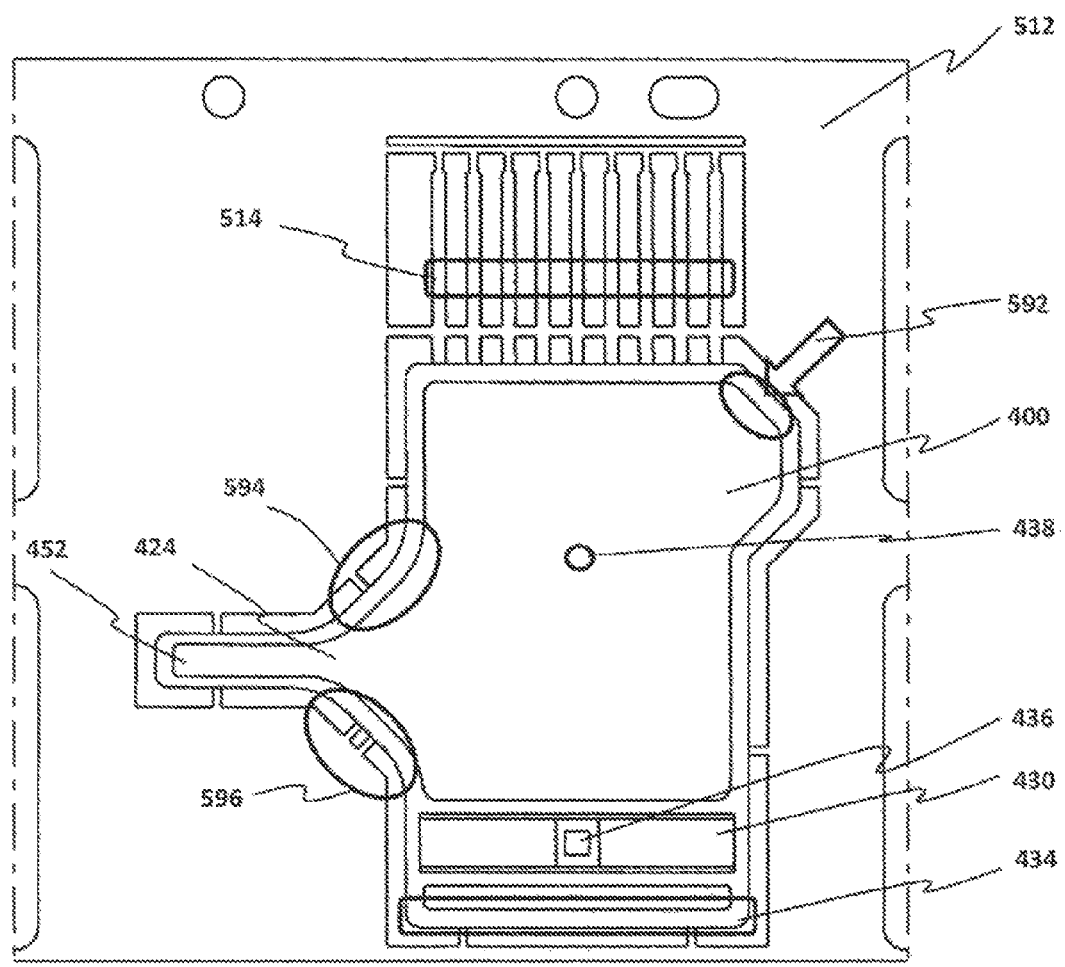
FIG. 14 is a diagram illustrating a condition of the circuit package after a first resin molding process.

FIG. 14 shows a state in which the frame shown in FIG. 12 is molded by the thermosetting resin in the first resin molding process and is covered with the thermosetting resin. According to the molding, the measurement surface 430 is formed in the front face of the circuit package 400, and the heat transfer surface exposing portion 436 is provided in the measurement surface 430. Further, the gap 674 in the rear face of the diaphragm 672 arranged in the inner portion of the heat transfer surface exposing portion 436 is structured such as to be connected to the opening 438. A temperature detecting portion 452 for measuring the temperature of the measurement target gas 30 is provided in a leading end portion of the protrusion 424, and a temperature detection element 518 is embedded in an inner portion thereof. A lead for taking out an electric signal of the temperature detection element 518 is segmentalized in the inner portion of the protrusion 424 for suppressing the heat transfer, and a connection line 546 having great heat resistance is arranged. As a result, the heat transfer from a root of the protrusion 424 to the temperature detecting portion 452 is suppressed, and the thermal influence is suppressed.

A slope portion 594 or 596 is formed in the base of the protrusion 424. A flow of the resin in the first resin molding process becomes smooth. In addition, the measurement target gas 30 measured by the temperature detecting portion 452 smoothly flows from the protrusion 424 to its base using the slope portion 594 or 596 while the temperature detecting portion 452 is installed and operated in a vehicle, so as to cool the base of the protrusion 424. Therefore, it is possible to reduce influence of the heat to the temperature detecting portion 452. After the state of FIG. 14, the lead 514 is separated from each terminal so as to be the connection terminal 412 or the terminal 414.

In the first resin molding process, it is necessary to prevent an inflow of the resin to the heat transfer surface exposing portion 436 or the opening 438. For this reason, in the first resin molding process, an inflow of the resin is suppressed in a position of the heat transfer surface exposing portion 436 or the opening 438. For example, an insertion die larger than the diaphragm 672 is installed, and a press is installed in the rear surface thereof, so that it is pressed from both surfaces. In FIG. 11(C), the press imprint 442 or 441 remains on the rear surface corresponding to the heat transfer surface exposing portion 436 or the opening 438 of FIG. 14 or the heat transfer surface exposing portion 436 or the opening 438 of FIG. 11(B).

Since the cut surface of the lead separated from the frame 512 in FIG. 14 is exposed from the resin surface, there is a risk that the water content intrudes into the inner portion from the cut surface of the lead during use. It is important in the light of improvement of durability and improvement of reliability to prevent the risk. For example, the portion of the fixation surface 434 in FIG. 14 is covered with the resin in the second resin molding process, and the cut surface is not exposed. Further, the lead cut portions of the slope portion 594 and the slope portion 596 are covered with the resin in the second resin molding process, and the cut surfaces of the lead 552 and the lead 554 from the frame 512 shown in FIG. 12 are covered with the resin. As a result, corrosion of the cut surfaces of the lead 552 and the lead 554 and water intrusion from the cut portions are prevented. The cut surfaces of the lead 552 and the lead 554 are close to the important lead portion which transmits the electric signal of the temperature detecting portion 452. Therefore, the cut surfaces are desirably covered in the second resin molding process.

5.3 Another Embodiment of Circuit Package 400

Figure 15:
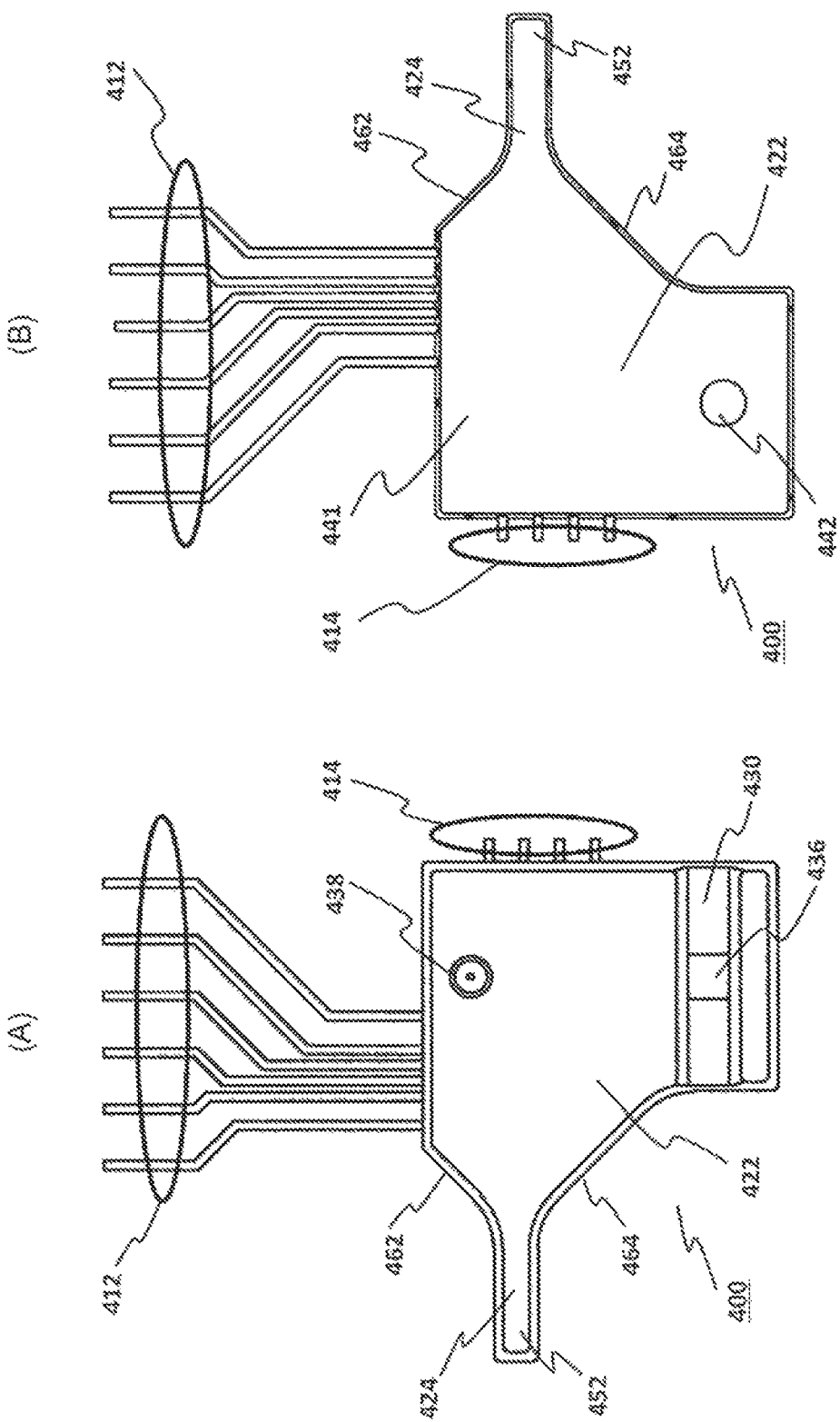
FIGS. 15(A) and 15(B) are views showing the other embodiment of the circuit package shown in FIGS. 11(A) to 11(C)

FIG. 15 illustrate another embodiment of the circuit package 400. Like reference numerals denote like elements as in other drawings. In the embodiment described above in relation to FIG. 11, the connection terminal 412 and the terminal 414 of the circuit package 400 are provided in the same side of the circuit package 400. In comparison, in the embodiment of FIG. 15, the connection terminal 412 and the terminal 414 are provided in different sides. The terminal 414 is a terminal not connected to the connection terminal connected to the outside in the thermal flow meter 300. If the connection terminal 412 connected to the outside in the thermal flow meter 300 and the terminal 414 not connected to the outside are provided in different directions in this manner, it is possible to widen a distance between the connection terminal 412 and the terminal and improve workability. In addition, if the terminal 414 extends to a direction different from that of the connection terminal 412, it is possible to prevent the lead inside the frame 512 from being concentrated on a part and facilitate arrangement of the lead inside the frame 512. In particular, a chip capacitor as the circuit component 516 is connected to a portion of the lead corresponding to the connection terminal 412. A slightly large space is necessary to provide such a circuit component 516. In the embodiment of FIG. 15, it is possible to easily obtain a space for the lead corresponding to the connection terminal 412.

In the circuit package 400 shown in FIGS. 15(A) and 15(B), the slope portion 462 and the slope portion 464 having gently changing thicknesses are formed in the neck portion of the protrusion 424 protruding out of the package main body 422, in the same manner as the circuit package 400 shown in FIGS. 11(A) to 11(C). The same effect as described in FIGS. 11(A) to 11(C) are obtained. In other words, as shown in FIGS. 15(A) and 15(B), the protrusion 424 protrudes out of the side surface of the package main body 422 with a shape extending in an upstream direction of the measurement target gas 30. The temperature detecting portion 452 is provided in the leading end portion of the protrusion 424, and the temperature detection element 518 is buried in the inner portion of the temperature detecting portion 452. The slope portions 462 and 464 are provided in a joint portion between the protrusion 424 and the package main body 422. The shape which makes the root of the protrusion 424 thick and becomes narrower little by little toward a leading end direction is formed in the neck portion of the protrusion 424 by the slope portion 462 or the slope portion 464. In other words, the neck portion of the protrusion 424 is provided with a shape in which a cross sectional area intersecting an axis in the protruding direction is reduced little by little in the case that the protruding direction is set to the axis.

Since the shape mentioned above is provided, it is possible to use a method of flowing the resin while applying a sheet to the inner portion of the die for the purpose of protecting the elements in the case that the circuit package 400 is formed by the resin molding, the adhesion between the sheet and the inner surface of the die is improved, and the reliability is improved. Further, the protrusion 424 is weak in a mechanical strength and tends to be bended in the root. The stress concentration to the root can be reduced by the shape which makes the root of the protrusion 424 thicker and becomes narrower little by little toward the leading end direction, and an excellent mechanical strength can be obtained. Further, in the case that the protrusion 424 is formed by the resin molding, warpage tends to be created in consequence of volume change when the resin is solidified. It is possible to reduce the influence. It is desirable to make the protruding length longer for sensing the temperature of the measurement target gas 30 as accurate as possible. It becomes easy to reduce the heat transfer from the package main body 422 to the temperature detection element 518 which is provided in the temperature detecting portion 452 by making the protruding length of the protrusion 424 longer.

As shown in FIGS. 11(B) and 11(C), the root of the protrusion 424 is made thicker, and the circuit package 400 is fixed to the housing 302 in such a manner as to surround the root of the protrusion 424 with the housing 302. It is possible to prevent the protrusion 424 from being broken due to a mechanical shock by covering the root of the protrusion 424 with the resin of the housing 302 as mentioned above. In addition, the various effects described in FIGS. 11(A) to 11(C) are achieved.

Descriptions for the opening 438, the heat transfer surface exposing portion 436, the measurement surface 430, the press imprint 441, and the press imprint 442 in FIG. 15 are similar to those described above, and they have the same functional effects. Detailed descriptions will not be repeated for simplicity purposes.

6. Production Process of Thermal Flow Meter 300

6.1 Production Process of Circuit Package 400

Figure 16:
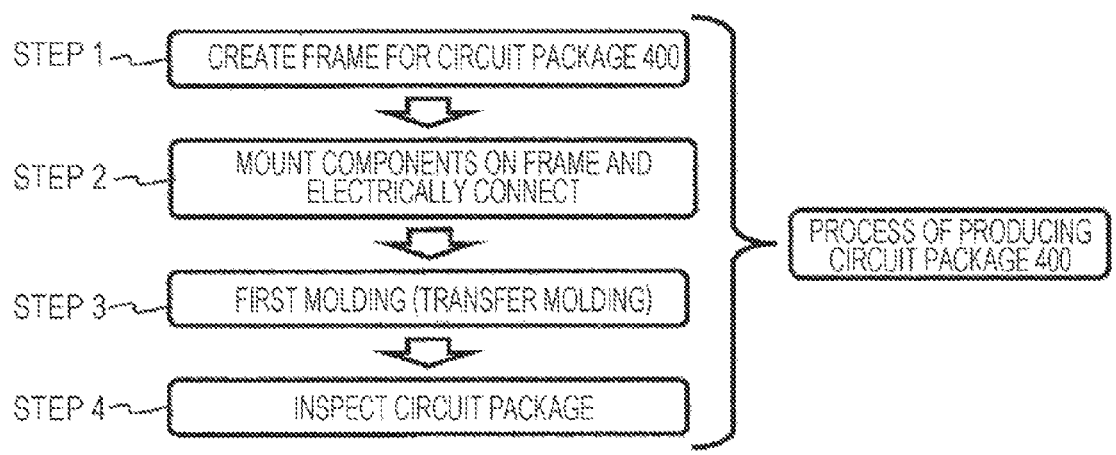
FIG. 16 is a view showing a production process of the circuit package.
Figure 17:
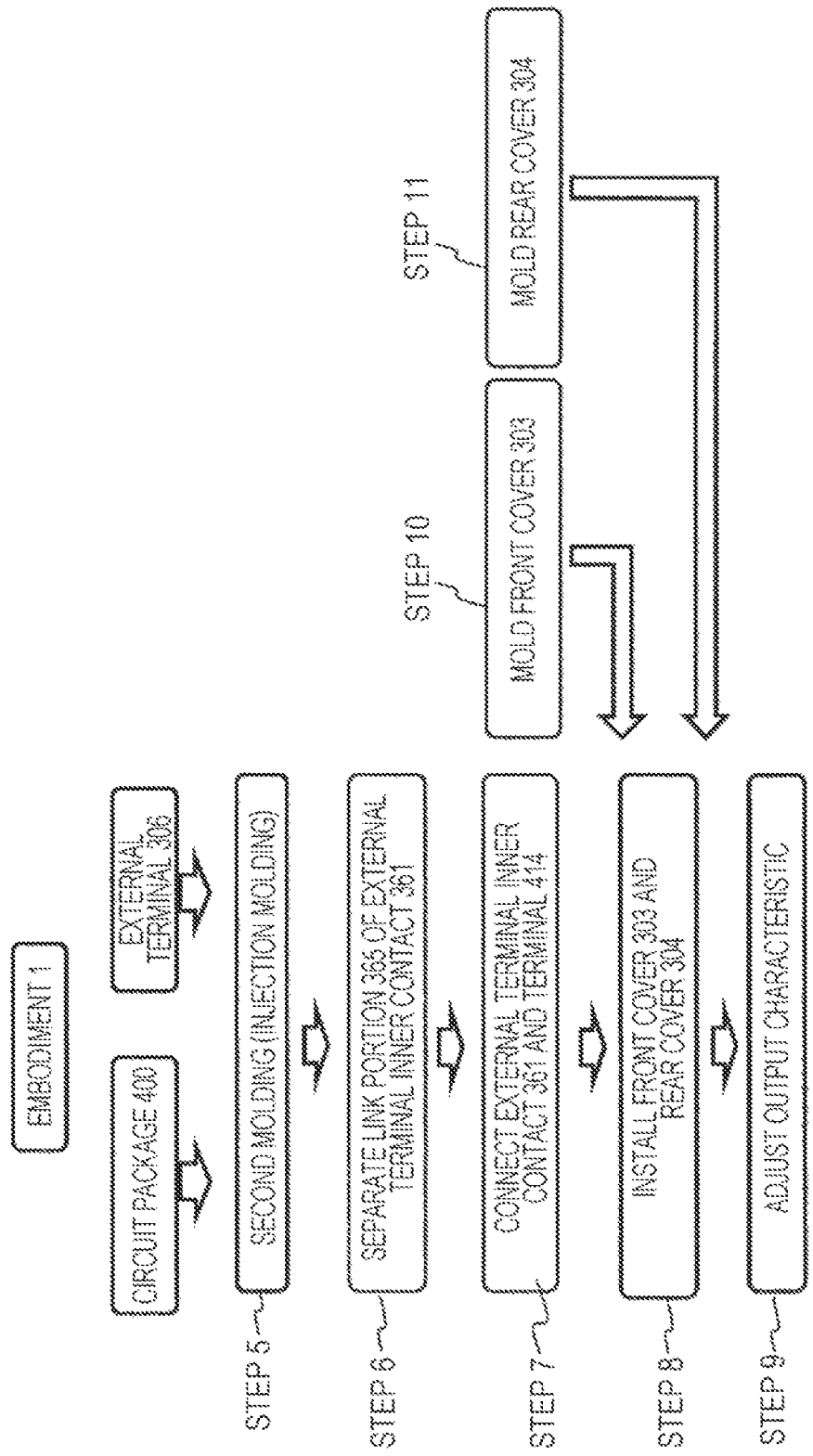
FIG. 17 is a view showing a production process of the thermal flow meter.
Figure 18:
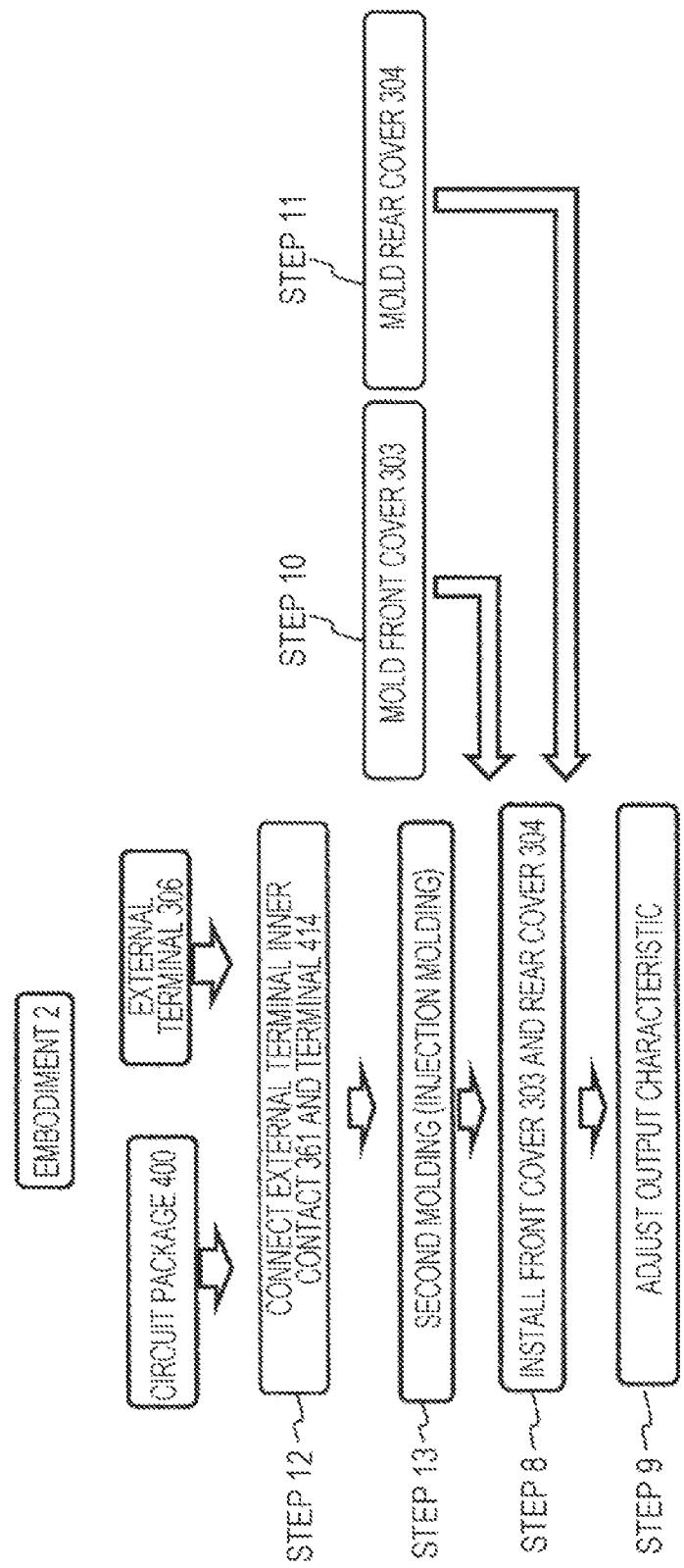
FIG. 18 is a view showing the other embodiment of the production process of the thermal flow meter.

FIG. 16 shows a production process of the circuit package 400 among the production process of the thermal flow meter 300. FIG. 17 shows a production process of the thermal flow meter, and FIG. 18 shows the other embodiment of the production process of the thermal flow meter. In FIG. 16, a step 1 indicates a process of producing the frame shown in FIG. 12. The frame is formed, for example, by a press molding. In a step 2, the plate 532 is first of all mounted to the frame formed in the step 1, the air flow sensing portion 602 and the processing unit 604 are further mounted to the plate 532, and the circuit parts such as the temperature detection element 518 and the chip capacitors are further mounted. Further, in the step 2, an electric wiring is carried out between the circuit parts, between the circuit parts and the lead, and between the leads. In the step 2, the lead 544 and the lead 548 are connected therebetween by a connection line 546 for enlarging the thermal resistance. In the step 2, the circuit parts shown in FIG. 12 are mounted to the frame 512, and the electrically connected electric circuit is further formed.

Figure 11:
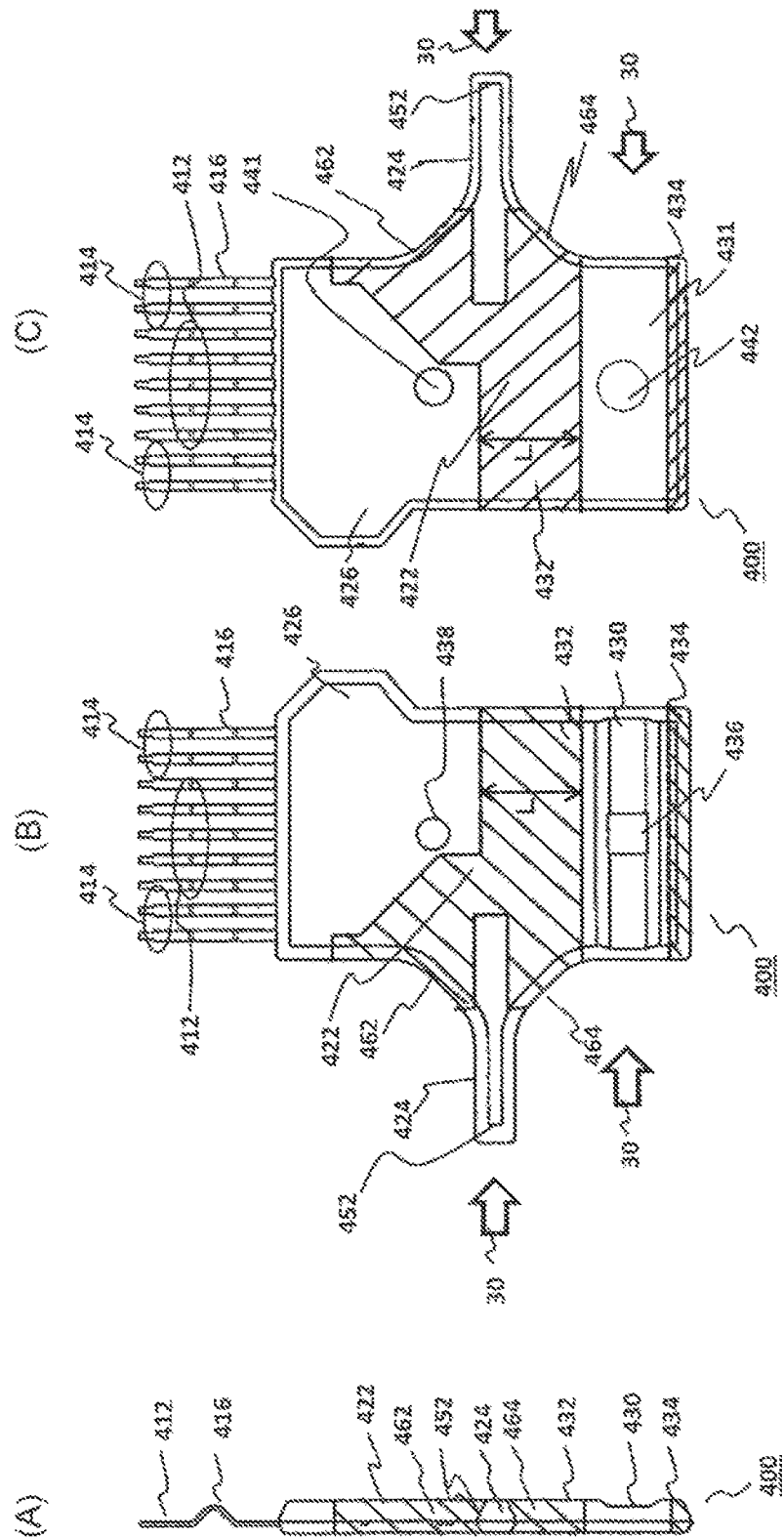

Next, in a step 3, there is molded with the thermosetting resin by the first resin molding process. The circuit package 400 in the molded state is shown in FIG. 14. Further, in the step 3, each of the connected leads is separated from the frame 512, the leads are separated therebetween, and the circuit package 400 shown in FIGS. 11 and 15 is finished. In 400, the measurement surface 430 and the heat transfer surface exposing portion 436 are formed as shown in FIGS. 11 and 15.

In a step 4, an outer appearance test and a motion test of the finished circuit package 400 are carried out. In the first resin molding process in the step 3, a transfer molding is carried out. Since the electric circuit formed by the step 2 is fixed within the die, and the high-temperature resin is injected into the die at a high pressure, it is desirable to test whether or not any abnormality is generated in the electric parts and the electric wirings. For the test, the terminal 414 is used in addition to the connection terminal 412 shown in FIGS. 11 and 15. Since the terminal 414 is not used thereafter, the terminal 414 may be cut from the root after the test. For example, the used terminal 414 is cut at the root in FIGS. 15(A) and 15(B).

6.2 Production Process of Thermal Flow Meter 300 and Adjustment of Measurement Property In FIG. 17, there are used the circuit package 400 which has been already produced according to FIG. 16, and the external terminal 306 which has been already produced according to a method (not shown). In a step 5, the housing 302 is formed by the second resin molding process. In the housing 302, the resin bypass passage trench, the flange 312 and the external connector 305 are formed, the hatched portion of the circuit package 400 shown in FIGS. 11(A) to 11(C) are covered with the resin in the second resin molding process, and the circuit package 400 is fixed to the housing 302. The air flow sensing precision is widely improved on the basis of combination of the production (the step 3) of the circuit package 400 by the first resin molding process, and the formation of the housing 302 of the thermal flow meter 300 by the second resin molding process. In a step 6, separation of each of the inner sockets of external terminal 361 shown in FIG. 10 is carried out, and the connection between the connection terminal 412 and the inner socket of external terminal 361 is carried out by a step 7.

When the housing 302 is finished by the step 7, the front cover 303 and the rear cover 304 are next attached to the housing 302 in a step 8, the inner portion of the housing 302 is hermetically sealed by the front cover 303 and the rear cover 304, the bypass passage for flowing the measurement target gas 30 is finished, and the thermal flow meter 300 is finished. Further, the throttle structure described in FIG. 7 is formed by the protrusion 356 which is provided in the front cover 303 or the rear cover 304. The front cover 303 is formed by the molding in a step 10, and the rear cover 304 is formed by the molding in a step 11. Further, the front cover 303 and the rear cover 304 are respectively formed by separate processes, and are respectively formed by the different dies.

In a step 9, the gas is actually conducted to the bypass passage, and the test of property is carried out. As mentioned above, since the relationship between the bypass passage and the air flow sensing portion is maintained at the high precision, a very high measurement precision can be obtained by carrying out calibration of the property according to the test of property. Further, since the positioning and the shape relational formation affecting the relationship between the bypass passage and the air flow sensing portion are carried out in the first resin molding process and the second resin molding process, the property less changed even after a long-term use, and it is possible to secure a high reliability in addition to a high precision.

6.3 Other Embodiment of Production Process of Thermal Flow Meter 300

In FIG. 18, the circuit package 400 which has been already produced according to FIG. 16 and the external terminal 306 which has been already produced according to a method (not shown) are used, and the connection between the connection terminal 412 of the circuit package 400 and the inner socket of external terminal 361 is carried out in a step 12 before the second resin molding process. Separation of each of the inner sockets of external terminal 361 shown in FIG. 10 is carried out at this time or in a process before the step 12. In a step 13, the housing 302 is formed by the second resin molding process. In the housing 302, the resin bypass passage trench, the flange 312 and the external connector 305 are formed, the hatched portion of the circuit package 400 shown in FIGS. 11(A) to 11(C) are covered with the resin in the second resin molding process, and the circuit package 400 is fixed to the housing 302. The air flow sensing precision is widely improved by the combination of the production (the step 3) of the circuit package 400 according to the first resin molding process and the formation of the housing 302 of the thermal flow meter 300 according to the second resin molding process.

The housing 302 is obtained in step 13. Then, in step 8, the front and rear covers 303 and 304 are installed in the housing 302, so that the inside of the housing 302 is sealed with the front and rear covers 303 and 304, and the bypass passage for flowing the measurement target gas 30 is obtained. In addition, an orifice structure described in relation to FIG. 7 is formed by the protrusion 356 provided in the front or rear cover 303 or 304. It is noted that the front cover 303 is formed through the molding of step 10, and the rear cover 304 is formed through the molding of step 11. In addition, the front and rear covers 303 and 304 are formed through separate processes using different dies.

In step 9, a characteristic test is performed by guiding the air to the bypass passage in practice. Since a relationship between the bypass passage and the air flow sensing portion is maintained with high accuracy as described above, significantly high measurement accuracy is obtained by performing a characteristic calibration through a characteristic test. In addition, since the molding is performed with a positioning or configuration relationship between the bypass passage and the air flow sensing portion is determined through the first resin molding process and the second resin molding process, the characteristic does not change much even in a long time use, and high reliability is obtained in addition to the high accuracy.

7. Circuit Configuration of Thermal Flow Meter 300

7.1 Entire Circuit Configuration of Thermal Flow Meter 300

Figure 19:
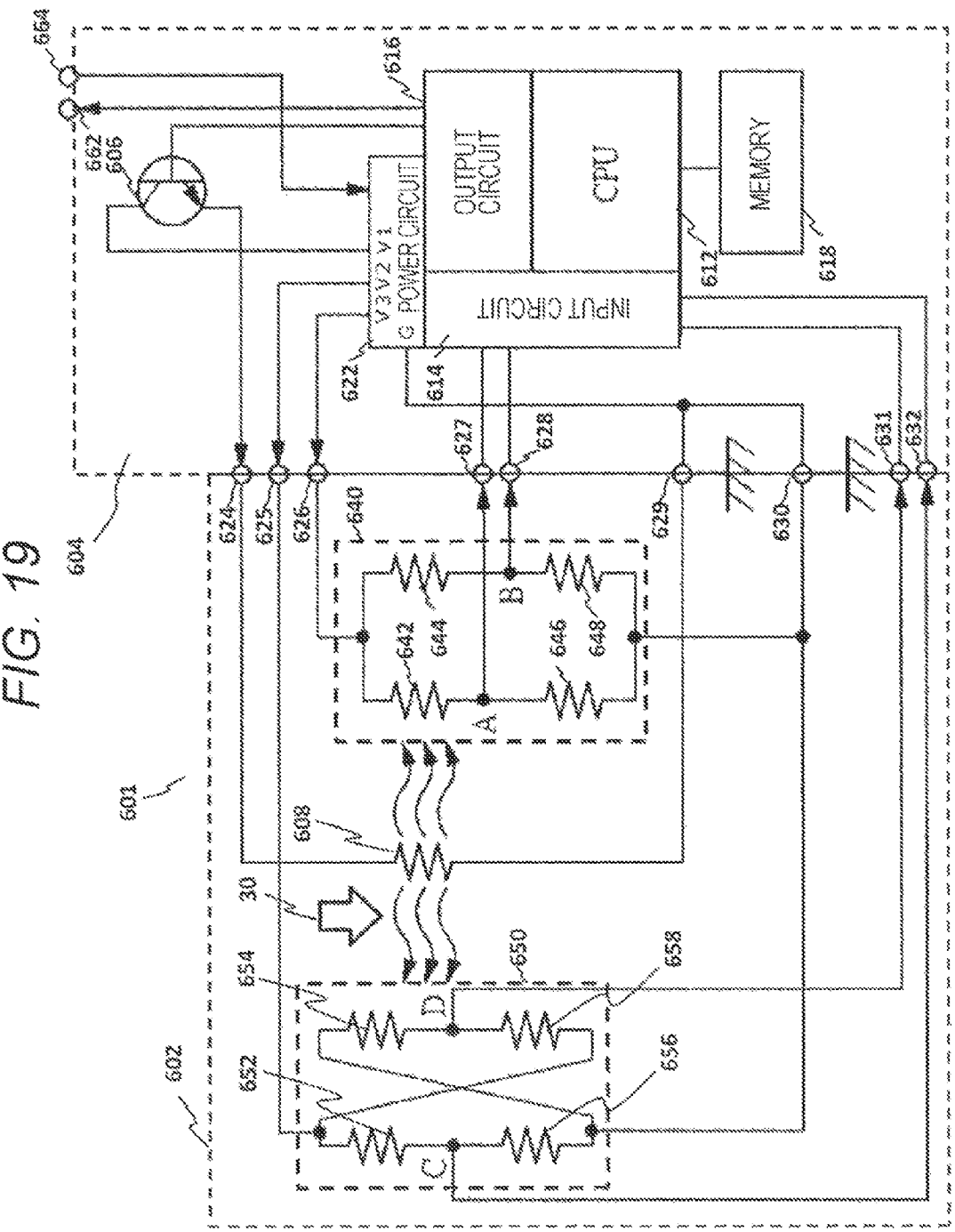
FIG. 19 is a circuit diagram showing an air flow sensing circuit of the thermal flow meter.

FIG. 19 is a circuit diagram illustrating the flow rate detection circuit 601 of the thermal flow meter 300. It is noted that the measurement circuit relating to the temperature detecting portion 452 described in the aforementioned embodiment is also provided in the thermal flow meter 300, but is not illustrated intentionally in FIG. 19. The flow rate detection circuit 601 of the thermal flow meter 300 includes the air flow sensing portion 602 having the heat generator 608 and the processing unit 604. The processing unit 604 control a heat amount of the heat generator 608 of the air flow sensing portion 602 and outputs a signal representing the flow rate through the terminal 662 based on the output of the air flow sensing portion 602. For this processing, the processing unit 604 includes a central processing unit (hereinafter, referred to as "CPU") 612, an input circuit 614, an output circuit 616, a memory 618 for storing data representing a relationship between the calibration value or the measurement value and the flow rate, and a power circuit 622 for supplying a certain voltage to each necessary circuit. The power circuit 622 is supplied with DC power from an external power supply such as a vehicle-mount battery through a terminal 664 and a ground terminal (not illustrated).

The air flow sensing portion 602 is provided with a heat generator 608 for heating the measurement target air 30. A voltage V1 is supplied from the power circuit 622 to a collector of a transistor 606 included in a current supply circuit of the heat generator 608, and a control signal is applied from the CPU 612 to a base of the transistor 606 through the output circuit 616. Based on this control signal, a current is supplied from the transistor 606 to the heat generator 608 through the terminal 624. The current amount supplied to the heat generator 608 is controlled by a control signal applied from the CPU 612 to the transistor 606 of the current supply circuit of the heat generator 608 through the output circuit 616. The processing unit 604 controls the heat amount of the heat generator 608 such that a temperature of the measurement target air 30 increases by a predetermined temperature, for example, 100° C. from an initial temperature by heating using the heat generator 608.

The air flow sensing portion 602 includes a heating control bridge 640 for controlling a heat amount of the heat generator 608 and a bridge circuit of air flow sensing 650 for measuring a flow rate. A predetermined voltage V3 is supplied to one end of the heating control bridge 640 from the power circuit 622 through the terminal 626, and the other end of the heating control bridge 640 is connected to the ground terminal 630. In addition, a predetermined voltage V2 is applied to one end of the bridge circuit of air flow sensing 650 from the power circuit 622 through the terminal 625, and the other end of the bridge circuit of air flow sensing 650 is connected to the ground terminal 630.

The heating control bridge 640 has a resistor 642 which is a resistance temperature detector having a resistance value changing depending on the temperature of the heated measurement target air 30, and the resistors 642, 644, 646, and 648 constitute a bridge circuit. A potential difference between a node A between the resistors 642 and 646 and a node B between the resistors 644 and 648 is input to the input circuit 614 through the terminals 627 and 628, and the CPU 612 controls the current supplied from the transistor 606 to control the heat amount of the heat generator 608 such that the potential difference between the nodes A and B is set to a predetermined value, for example, zero voltage in this embodiment. The flow rate detection circuit 601 illustrated in FIG. 19 heats the measurement target air 30 using the heat generator 608 such that a temperature increases by a predetermined temperature, for example, 100° C. from an initial temperature of the measurement target air 30 at all times. In order to perform this heating control with high accuracy, resistance values of each resistor of the heating control bridge 640 are set such that the potential difference between the nodes A and B becomes zero when the temperature of the measurement target air 30 heated by the heat generator 608 increases by a predetermined temperature, for example, 100° C. from an initial temperature at all times. Therefore, in the flow rate detection circuit 601 of FIG. 19, the CPU 612 controls the electric current supplied to the heat generator 608 such that the potential difference between the nodes A and B becomes zero.

The bridge circuit of air flow sensing 650 includes four resistance temperature detectors of resistors 652, 654, 656, and 658. The four resistance temperature detectors are arranged along the flow of the measurement target air 30 such that the resistors 652 and 654 are arranged in the upstream side in the flow path of the measurement target air 30 with respect to the heat generator 608, and the resistors 656 and 658 are arranged in the downstream side in the flow path of the measurement target air 30 with respect to the heat generator 608. In addition, in order to increase the measurement accuracy, the resistors 652 and 654 are arranged such that distances to the heat generator 608 are approximately equal, and the resistors 656 and 658 are arranged such that distances to the heat generator 608 are approximately equal.

A potential difference between a node C between the resistors 652 and 656 and a node D between the resistors 654 and 658 is input to the input circuit 614 through the terminals 631 and 632. In order to increase the measurement accuracy, each resistance of the bridge circuit of air flow sensing 650 is set, for example, such that a positional difference between the nodes C and D is set to zero while the flow of the measurement target air 30 is set to zero. Therefore, while the potential difference between the nodes C and D is set to, for example, zero, the CPU 612 outputs, from the terminal 662, an electric signal indicating that the flow rate of the main passage 124 is zero based on the measurement result that the flow rate of the measurement target air 30 is zero.

When the measurement target air 30 flows along the arrow direction in FIG. 19, the resistor 652 or 654 arranged in the upstream side is cooled by the measurement target air 30, and the resistors 656 and 658 arranged in the downstream side of the measurement target air 30 are heated by the measurement target air 30 heated by the heat generator 608, so that the temperature of the resistors 656 and 658 increases. For this reason, a potential difference is generated between the nodes C and D of the bridge circuit of air flow sensing 650, and this potential difference is input to the input circuit 614 through the terminals 631 and 632. The CPU 612 searches data indicating a relationship between the flow rate of the main passage 124 and the aforementioned potential difference stored in the memory 618 based on the potential difference between the nodes C and D of the bridge circuit of air flow sensing 650 to obtain the flow rate of the main passage 124. An electric signal indicating the flow rate of the main passage 124 obtained in this manner is output through the terminal 662. It is noted that, although the terminals 664 and 662 illustrated in FIG. 19 are denoted by new reference numerals, they are included in the connection terminal 412 of FIG. 5(A), 5(B), 6(A), 6(B), or 10 described above.

The memory 618 stores the data indicating a relationship between the potential difference between the nodes C and D and the flow rate of the main passage 124 and calibration data for reducing a measurement error such as a variation, obtained based on the actual measurement value of the gas after production of the circuit package 400. It is noted that the actual measurement value of the gas after production of the circuit package 400 and the calibration value based thereon are stored in the memory 618 using the external terminal 306 or the calibration terminal 307 illustrated in FIGS. 4(A) and 4(B). In this embodiment, the circuit package 400 is produced while an arrangement relationship between the bypass passage for flowing the measurement target gas 30 and the measurement surface 430 or an arrangement relationship between the bypass passage for flowing the measurement target gas 30 and the heat transfer surface exposing portion 436 is maintained with high accuracy and a little variation. Therefore, it is possible to obtain a measurement result with remarkably high accuracy through calibration using the calibration value.

7.2 Configuration of Flow Rate Detection Circuit 601

Figure 20:
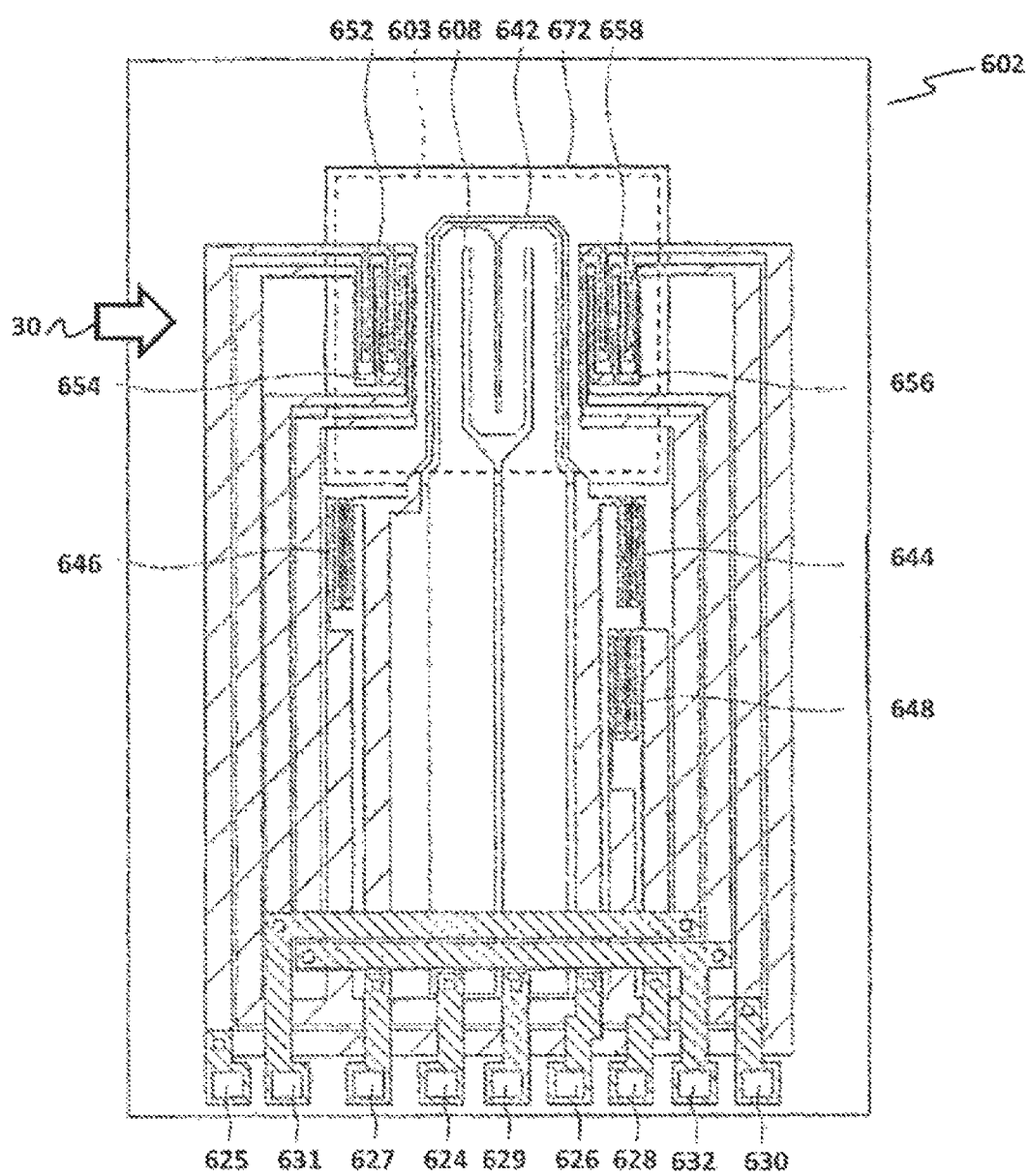
FIG. 20 is an explanatory view describing an air flow sensing portion of the air flow sensing circuit.

FIG. 20 is a circuit configuration diagram illustrating a circuit arrangement of the flow rate detection circuit 601 of FIG. 19 described above. The flow rate detection circuit 601 is manufactured from a semiconductor chip having a rectangular shape. The measurement target air 30 flows along the arrow direction from the left side to the right side of the flow rate detection circuit 601 illustrated in FIG. 20.

A rectangular diaphragm 672 is formed in the air flow sensing portion 602, and the diaphragm 672 is provided with a thin area 603 obtained by reducing a thickness of the semiconductor chip and shown by a broken line. The thin area 603 is formed a gap in its rear face side, the gap communicates with the opening 438 shown in FIGS. 11 and 5, and the air pressure within the gap depends on the air pressure conducted from the opening 438.

The thin area 603 of the diaphragm 672 is reduced its thermal conductivity low by reducing the thickness, and is suppressed its heat transfer via the diaphragm 672 to the resistor 652 and the resistor 654 provided in the thin area 603, the resistor 658 and the resistor 656, and the temperatures of the resistors are approximately defined by the heat transfer with the measurement target gas 30.

The heat generator 608 is provided in the center of the thin area 603 of the diaphragm 672, and the resistor 642 of the heating control bridge 640 is provided around the heat generator 608. In addition, the resistors 644, 646, and 648 of the heating control bridge 640 are provided in the outer side of the thin area 603. The resistors 642, 644, 646, and 648 formed in this manner constitute the heating control bridge 640.

In addition, the resistors 652 and 654 as upstream resistance temperature detectors and the resistors 656 and 658 as downstream resistance temperature detectors are arranged to interpose the heat generator 608. The resistors 652 and 654 as upstream resistance temperature detectors are arranged in the upstream side in the arrow direction where the measurement target air 30 flows with respect to the heat generator 608. The resistors 656 and 658 as downstream resistance temperature detectors are arranged in the downstream side in the arrow direction where the measurement target gas 30 flows with respect to the heat generator 608. In this manner, the bridge circuit of air flow sensing 650 is formed by the resistors 652, 654, 656, and 658 arranged in the thin area 603.

Both ends of the heat generator 608 are connected to each of the terminals 624 and 629 illustrated in the lower half of FIG. 20. Here, as illustrated in FIG. 19, the current supplied from the transistor 606 to the heat generator 608 is applied to the terminal 624, and the terminal 629 is grounded.

The resistors 642, 644, 646, and 648 of the heating control bridge 640 are connected to each other and are connected to the terminals 626 and 630. As illustrated in FIG. 19, the terminal 626 is supplied with a predetermined voltage V3 from the power circuit 622, and the terminal 630 is grounded. In addition, the node between the resistors 642 and 646 and the node between the resistors 646 and 648 are connected to the terminals 627 and 628, respectively. As illustrated in FIG. 20, the terminal 627 outputs an electric potential of the node A between the resistors 642 and 646, and the terminal 627 outputs an electric potential of the node B between the resistors 644 and 648. As illustrated in FIG. 19, the terminal 625 is supplied with a predetermined voltage V2 from the power circuit 622, and the terminal 630 is grounded as a ground terminal. In addition, a node between the resistors 654 and 658 is connected to the terminal 631, and the terminal 631 outputs an electric potential of the node B of FIG. 19. The node between the resistors 652 and 656 is connected to the terminal 632, and the terminal 632 outputs an electric potential of the node C illustrated in FIG. 19.

As illustrated in FIG. 20, since the resistor 642 of the heating control bridge 640 is formed in the vicinity of the heat generator 608, it is possible to measure the temperature of the gas heated by the heat from the heat generator 608 with high accuracy. Meanwhile, since the resistors 644, 646, and 648 of the heating control bridge 640 are arranged distant from the heat generator 608, they are not easily influenced by the heat generated from the heat generator 608. The resistor 642 is configured to respond sensitively to the temperature of the gas heated by the heat generator 608, and the resistors 644, 646, and 648 are configured not to be influenced by the heat generator 608. For this reason, the detection accuracy of the measurement target gas 30 using the heating control bridge 640 is high, and the control for heating the measurement target gas 30 by only a predetermined temperature from its initial temperature can be performed with high accuracy.

In this embodiment, a gap is formed in the rear surface side of the diaphragm 672 and communicates with the opening 438 illustrated in FIG. 11(A) to 11(C) or 5(A) and 5(B), so that a difference between the pressure of the gap in the rear side of the diaphragm 672 and the pressure in the front side of the diaphragm 672 does not increase. It is possible to suppress a distortion of the diaphragm 672 caused by this pressure difference. This contributes to improvement of the flow rate measurement accuracy.

As mentioned above, the diaphragm 672 forms the thin area 603, and makes the thickness of the thin area 603 very thin, and the heat conduction via the diaphragm 672 is suppressed as much as possible. Therefore, the bridge circuit of air flow sensing 650 and the heating control bridge 640 are suppressed influence of the thermal conduction via the diaphragm 672, and more strongly tend to actuate depending on the temperature of the measurement target gas 30, and the measuring motion is improved. As a result, the high measurement precision can be obtained.

8. Measurement of Gas Temperature in Thermal Flow Meter 300

8.1 Structure of Temperature Detecting Portion 452 in Thermal Flow Meter 300

Figure 2:
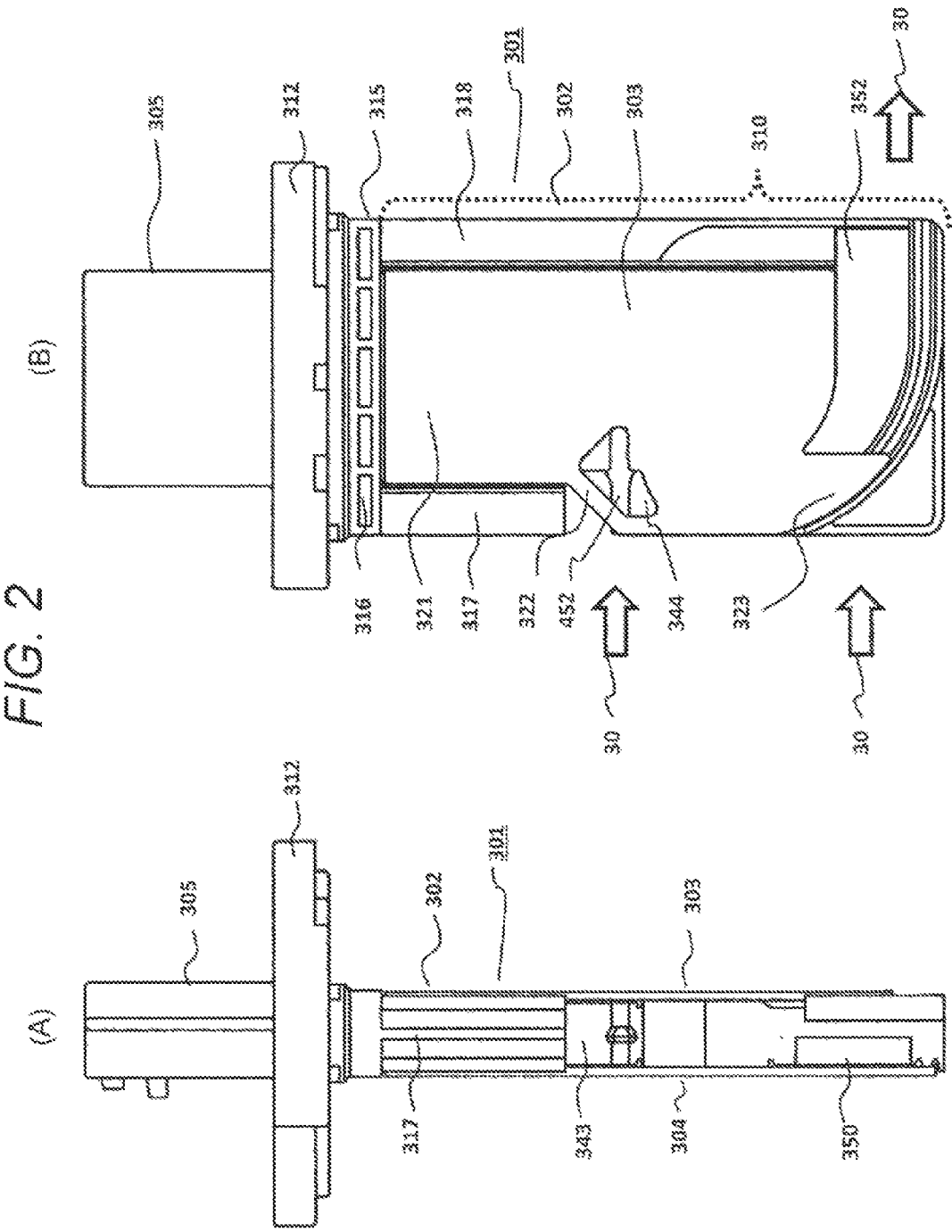
Figure 3:
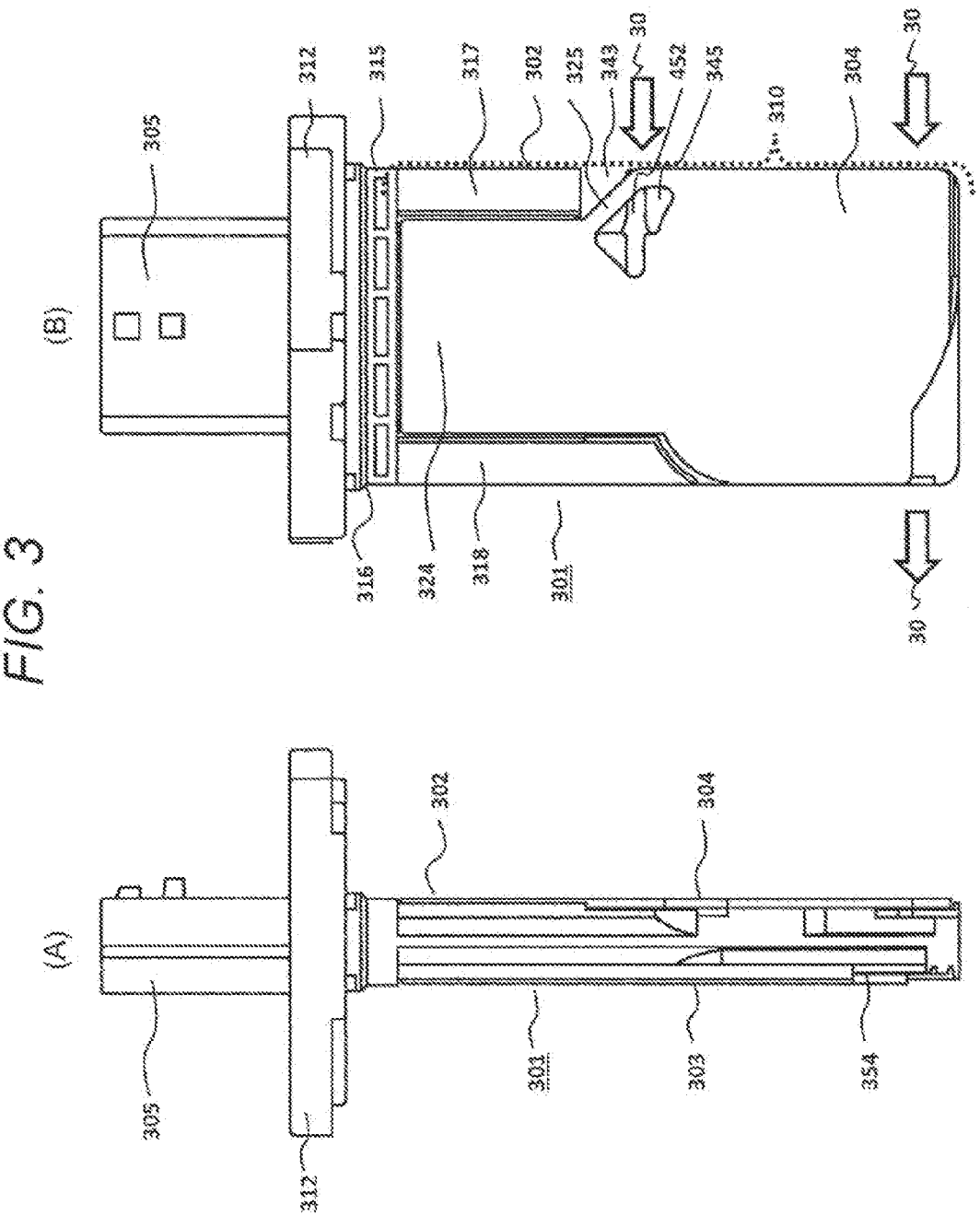

In FIGS. 2 and 3, the bypass passage is provided in the center side of the main passage 124, in the leading end side of the measuring portion 310. An inlet port 343 which is open toward an upstream side of the flow of the measurement target gas 30 is formed closer to the flange 312 side than the bypass passage as shown in FIG. 2(A). A temperature detecting portion 452 for measuring the temperature of the measurement target gas 30 is arranged in an inner portion of the inlet port 343 so as to protrude out of the inner portion of the housing 302. In the center portion of the measuring portion 310 provided with the inlet port 343, an upstream side outer wall of the measuring portion 310 constructing the housing 302 is depressed toward a downstream side, that is, toward the inner side of the housing 302, and the temperature detecting portion 452 is formed into a shape that the temperature detecting portion protrudes outward from the housing 302 toward the upstream side from the upstream side outer wall of the hollow shape. Further, the front cover 303 and the rear cover 304 are provided in both side portions of the outer wall of the hollow shape, and are formed into a shape that the upstream side end portions of the front cover 303 and the rear cover 304 protrude toward the upstream side from the outer wall of the hollow shape. As a result, the inlet port 343 for taking in the measurement target gas 30 is formed by the outer wall of the hollow shape and the front cover 303 and the rear cover 304 in both sides thereof. The measurement target gas 30 taken from the inlet port 343 is measured its temperature by the temperature detecting portion 452 on the basis of the contact with the temperature detecting portion 452 which is provided in the inner portion of the inlet port 343. Further, the measurement target gas 30 flows along the portion which supports the temperature detecting portion 452 protruding to the upstream side from the outer wall of the housing 302 formed into the hollow shape, and the front outlet 344 and the rear outlet 345 provided in the front cover 303 and the rear cover 304 are discharged to the main passage 124.

8.2 Operations and Effects of Temperature Detecting Portion 452

As shown in FIGS. 2 and 3, since the temperature detecting portion 452 is structured such as to protrude outward from the housing 302 and directly come into contact with the measurement target gas 30, the sensing precision is improved. Further, the temperature of the gas flowing into the inlet port 343 from the upstream side in the direction along the flow of the measurement target gas 30 is measured by the temperature detecting portion 452, and the gas flows toward the neck portion of the temperature detecting portion 452 which is the portion supporting the temperature detecting portion 452, thereby acting so as to cool the temperature of the portion supporting the temperature detecting portion 452 closer to the temperature of the measurement target gas 30. There is a risk that the temperature of the intake pipe corresponding to the main passage 124 becomes normally high, and the heat is transmitted to the portion supporting the temperature detecting portion 452 through the upstream side outer wall within the measuring portion 310 from the flange 312 or the thermal insulation 315, thereby affecting the measurement precision of the temperature. As mentioned above, since the measurement target gas 30 is measured by the temperature detecting portion 452 and thereafter flows along the portion supporting the temperature detecting portion 452, the supporting portion is cooled. Therefore, it is possible to inhibit the heat from being transmitted to the portion supporting the temperature detecting portion 452 through the upstream side outer wall within the measuring portion 310 from the flange 312 or the thermal insulation 315.

Particularly, since the upstream side outer wall within the measuring portion 310 is formed into the shape that the upstream side outer wall is concaved toward the downstream side, in the support portion of the temperature detecting portion 452, it is possible to elongate the distance between the upstream side outer wall within the measuring portion 310 and the temperature detecting portion 452. The heat transfer distance becomes longer and the distance of the cooling portion by the measurement target gas 30 becomes longer. Therefore, it is possible to reduce the thermal influence derived from the flange 312 or the thermal insulation 315. According to these matters, the measurement precision is improved.

Since the upstream side outer wall is formed into the shape that the upstream side outer wall is concaved toward the downstream side, that is, toward the inner portion of the housing 302, it is possible to fix with the upstream-side outer wall 335 of the housing 302, and it is easy to fix the circuit package 400. Further, it is possible to reinforce the protrusion 424 (refer to FIGS. 11(A) to 11(C)) which has the temperature detecting portion 452.

As is previously described by FIGS. 2 and 3, the inlet port 343 is provided in the upstream side of the measurement target gas 30 in the case 301, and the measurement target gas 30 conducted from the inlet port 343 is guided to the main passage 124 from the front outlet 344 and the rear outlet 345 through the periphery of the temperature detecting portion 452. The temperature of the measurement target gas 30 is measured by the temperature detecting portion 452, and the electric signal indicating the measured temperature is output from the external terminal 306 included in the external connector 305. The case 301 included in the thermal flow meter 300 is provided with the front cover 303 and the rear cover 304, and the housing 302, the housing 302 has the hollow for forming the inlet port 343, and the hollow is formed by the outer wall hollow portion 366 (refer to FIGS. 5 and 6). Further, the front outlet 344 and the rear outlet 345 are formed by the holes provided in the front cover 303 and the rear cover 304. As described next, the temperature detecting portion 452 is provided in the leading end portion of the protrusion 424, and is mechanically weak. The front cover 303 and the rear cover 304 serves to protect the protrusion 424 from the mechanical shock.

Figure 8:
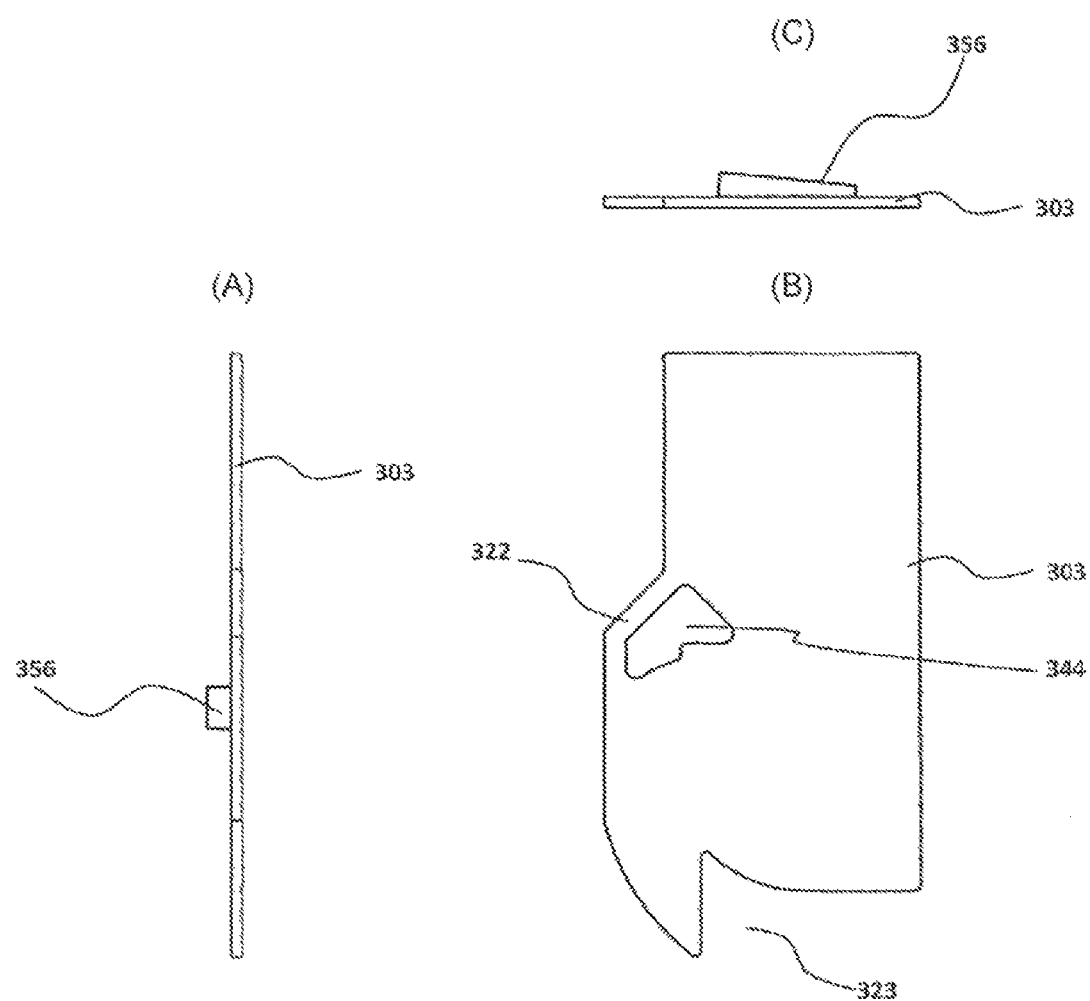
Figure 9:
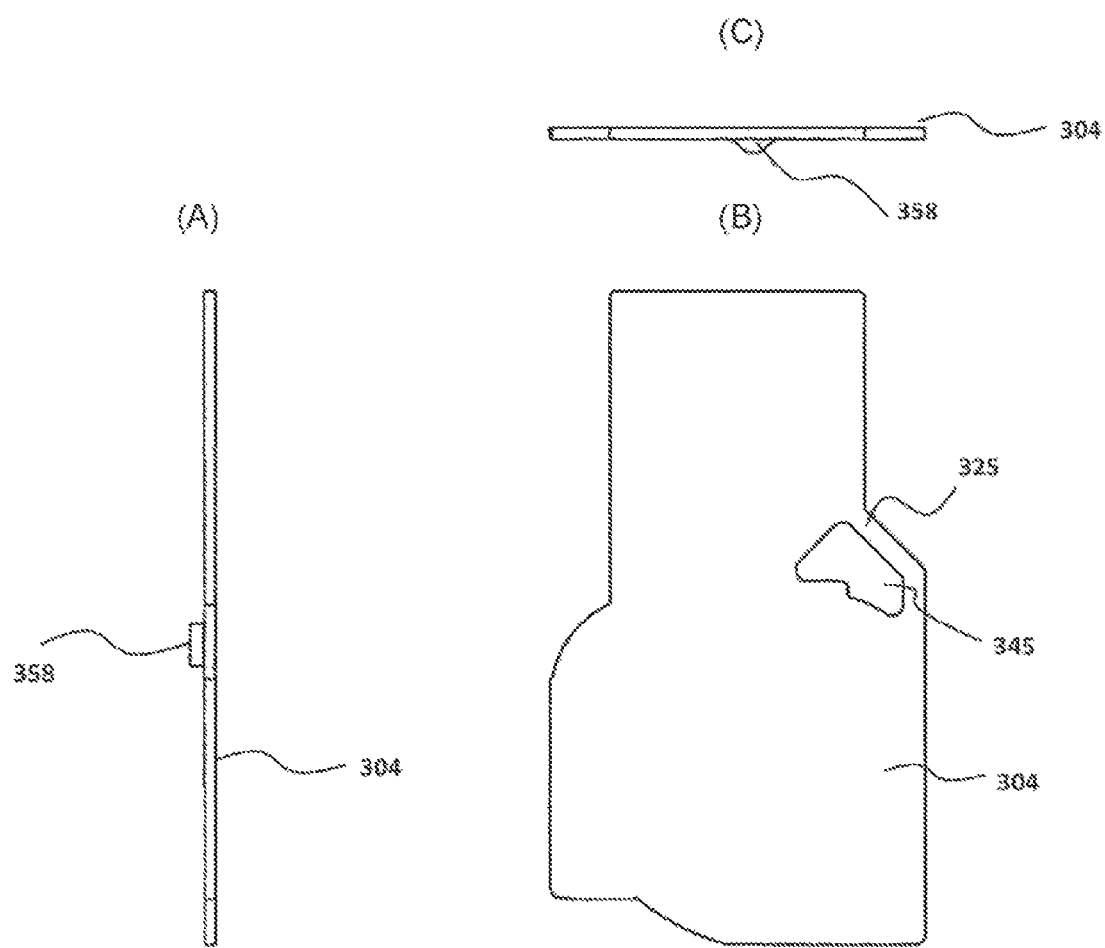

Further, a front protection portion 322 and a rear protection portion 325 are formed in the front cover 303 and 304 shown in FIGS. 8 and 9. As shown in FIGS. 2 and 3, the front protection portion 322 provided in the front cover 303 is arranged in a front side surface of the inlet port 343, and a rear protection portion 325 provided in the rear cover 304 is arranged in a rear side surface of the inlet port 343. The temperature detecting portion 452 arranged in the inner portion of the inlet port 343 is protected by the front protection portion 322 and the rear protection portion 325, and it is possible to prevent the mechanical damage of the temperature detecting portion 452 due to collision of the temperature detecting portion 452 with something during the production and the mounting time to the vehicle.

Further, as shown in FIGS. 11 and 15, since the neck portion of the protrusion 424 supporting the temperature detecting portion 452 is thicker little by little in its neck portion in relation to the leading end, and the measurement target gas 30 entering from the inlet port 343 flows along the neck portion which is thicker little by little, a cooling effect is increased. The neck portion of the protrusion 424 is near the air flow sensing circuit, and tends to be affected by the heat generation of the air flow sensing circuit. Further, the lead 548 for connecting the temperature detection element 518 provided in the temperature detecting portion 452 is buried in the neck portion of the protrusion 424. As a result, there is a possibility that the heat is transmitted via the lead 548. The cooling effect can be increased by making the neck portion of the protrusion 424 thicker so as to increase the contact area with the measurement target gas 30.

8.3 Formation and Effect of Temperature Detecting Portion 452 and Protrusion 424

The circuit package 400 has the circuit package main body 422 which has the air flow sensing portion 602 and the processing unit 604 provided for measuring the air flow and mentioned later built-in, and the protrusion 424. As shown in FIGS. 2(A) and 2(B), the protrusion 424 protrudes out of the side surface of the circuit package main body 422 in a shape of extending in an upstream direction of the measurement target gas 30. The temperature detecting portion 452 is provided in the leading end portion of the protrusion 424, and the temperature detection element 518 is buried in the inner portion of the temperature detecting portion 452 as shown in FIG. 12. The slope portions 462 and 464 are provided in the joint portion between the protrusion 424 and the circuit package main body 422, as shown in FIGS. 11 and 15. The root of the protrusion 424 is made thicker by the slope portion 462 or the slope portion 464, and the shape which becomes thinner little by little toward the leading end direction is formed in the neck portion of the protrusion 424. A cross sectional area intersecting the axis in relation to the axis in the protruding direction has a shape that it reduced toward the leading end direction in the neck portion of the protrusion 424. As mentioned above, in the shape in which the circuit package 400 partly protrudes, since the protrusion 424 is weak in its mechanical strength, the stress concentration to the root can be reduced and the mechanical strength can be improved by making the root of the protrusion 424 thick and forming into the shape which becomes narrower little by little toward the leading end direction. Further, in the case that the protrusion 424 is formed by the resin molding, the warpage tends to be created due to the influence of the volume change when the resin is solidified. It is possible to reduce the influence in relation to the problem mentioned above by making the root thicker. Further, it is desirable to make the protruding length longer for sensing the temperature of the measurement target gas 30 as accurately as possible, it is possible to make the protruding length of the protrusion 424 longer by making the root thicker, and the sensing precision of the temperature detection element 518 provided in the temperature detecting portion 452 is improved.

The circuit package 400 is fixed to the housing 302 in such a manner as to make the root of the protrusion 424 thicker and surround the root of the protrusion 424 by the resin of the housing 302 as shown in FIGS. 11(B) and 11(C). It is possible to prevent the protrusion 424 from being broken by the mechanical shock by covering the root of the protrusion 424 with the resin of the housing 302 as mentioned above.

In order to sense the temperature of the measurement target gas 30 at a high precision, it is desirable to structure such as to suppress the heat conduction which is transmitted from the main passage 124 to which the thermal flow meter 300 is attached via the housing 302 or the circuit package 400 as much as possible. The protrusion 424 supporting the temperature detecting portion 452 is formed into the shape that the leading end portion is narrower than the root, and is provided with the temperature detecting portion 452 in its leading end portion. According to the shape mentioned above, the thermal influence applied from the neck portion of the protrusion 424 to the temperature detecting portion 452 can be reduced.

Further, after the temperature of the measurement target gas 30 is sensed by the temperature detecting portion 452, the measurement target gas 30 flows along the protrusion 424, and serves to make the temperature of the protrusion 424 closer to the temperature of the measurement target gas 30. As a result, the influence which the temperature of the neck portion of the protrusion 424 applies to the temperature detecting portion 452 is suppressed. Particularly, in the embodiment, the vicinity of the protrusion 424 having the temperature detecting portion 452 is narrow, and the protrusion 424 becomes thicker toward the root. As a result, the measurement target gas 30 flows along the shape of the protrusion 424, and efficiently cools the protrusion 424.

In FIGS. 11(A) to 11(C), the hatched portion in the neck portion of the protrusion 424 is the fixation surface 432 which is covered with the resin forming the housing 302 in the second resin molding process. The hollow is provided in the hatched portion of the neck portion of the protrusion 424. This means that there is provided the hollow shaped portion which is not covered with the resin of the housing 302. The protrusion 424 is further easily cooled by the measurement target gas 30, by forming the hollow shaped portion which is not covered with the resin of the housing 302 in the neck portion of the protrusion 424. In FIGS. 15(A) and 15(B), the display of the hatched portion is omitted, however, it is the same as FIGS. 11(A) to 11(C).

The connection terminal 412 is provided in the circuit package 400 for supplying the electric power for actuating the built-in air flow sensing portion 602 and processing unit 604, and outputting the measured value of the air flow and the measured value of the temperature. Further, the terminal 414 is provided for testing whether or not the circuit package 400 is correctly activated, and whether or not any abnormality is generated in the circuit parts and their connection. In the embodiment, the circuit package 400 is formed by transfer molding the air flow sensing portion 602 and the processing unit 604 in the first resin molding process while using the thermosetting resin. It is possible to improve the dimensional precision of the circuit package 400 by transfer molding, however, since the pressurized high-temperature resin is pressed into the inner portion of the hermetically sealed die which has the air flow sensing portion 602 and the processing unit 604 built-in, in the transfer molding process, it is desirable to test whether or not any damage is done in the air flow sensing portion 602 and the processing unit 604, and their wiring relationship, in relation to the finished circuit package 400. In the embodiment, the terminal 414 for testing is provided, and the test is executed about each of the produced circuit packages 400. Since the terminal 414 for testing is not used for measuring, the terminal 414 is not connected to the inner socket of external terminal 361 as mentioned above. A curved portion 416 is provided in each of the connection terminals 412 for increasing a mechanically elastic force. It is possible to absorb the stress which is generated by the difference of coefficient of thermal expansion between the resin according to the first resin molding process and the resin according to the second resin molding process, by applying the mechanically elastic force to each of the connection terminals 412. In other words, each of the connection terminals 412 is affected by the thermal expansion according to the first resin molding process, and the inner socket of external terminal 361 connected to each of the connection terminals 412 is affected by the resin according to the second resin molding. It is possible to absorb the stress generation caused by the difference between these resins.

8.4 Operation and Effect of Slope Portions 462 and 464 Formed in Neck Portion of Protrusion 424

As described in FIGS. 11 and 15, the slope portions 462 and 464 are provided in the neck portion of the protrusion 424. The shape which makes the root of the protrusion 424 thicker by the slope portion 462 or the slope portion 464 and becomes narrower little by little toward the leading end direction is formed in the neck portion of the protrusion 424. In other words, the shape in which the cross sectional area intersecting the axis in the protruding direction in the case that the protruding portion is set to the axis is reduced little by little is provided in the neck portion of the protrusion 424.

Since the protrusion 424 is weak in the mechanical strength, it is possible to improve the mechanical strength as well as reducing the stress concentration into the root, by making the root of the protrusion 424 thicker, and forming the shape which becomes narrower little by little toward the leading end direction. Further, the warpage tends to be created due to the volume change when the resin is solidified, in the case that the protrusion 424 is formed by the resin molding. It is possible to reduce the influence in relation to the problem, by making the root thicker. Further, it is desirable to make the protruding length longer for sensing the temperature of the measurement target gas 30 as accurately as possible, it is possible to make the protruding length of the protrusion 424 longer by making the root thicker, and the sensing precision of the temperature detection element 518 provided in the temperature detecting portion 452 is improved.

The circuit package 400 is fixed to the housing 302 in such a manner as to make the root of the protrusion 424 thicker as shown in FIGS. 11(B) and 11(C), and surround the root of the protrusion 424 by the housing 302. As mentioned above, it is possible to prevent the protrusion 424 from being broken due to the mechanical shock, by covering the root of the protrusion 424 with the resin of the housing 302.

8.5 Other Embodiment of Protrusion 424

Figure 21:
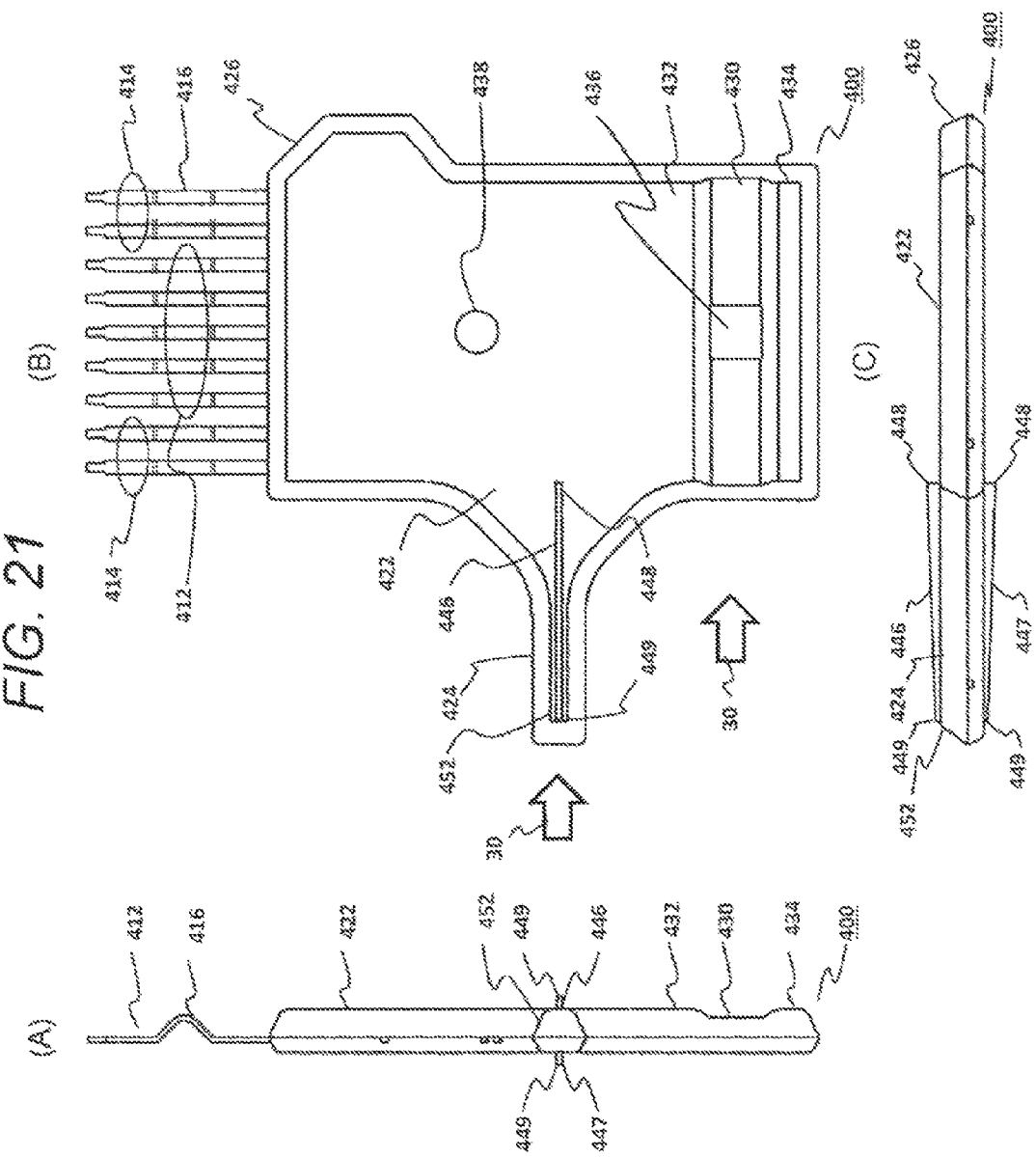
FIGS. 21(A) to 21(C) are the other embodiment showing an outer appearance shape of a circuit package 400.

FIGS. 21(A) to 21(C) are the other embodiment of the protrusion 424 of the circuit package 400, and the same reference numerals as those in the previously described drawings denote the same structures and do the same operations and effects. Therefore, a description thereof will be omitted. The protrusion 424 protruding out of the circuit package main body 422 has a projection 446 and a projection 447 in a plain face side and a rear face side. The projection 446 and the projection 447 have an effect even if only one is provided. Further, in the embodiment, the projection is formed one by one in the plain face side and the rear face side, however, a plurality of projections may be provided. Each of the projections has a neck portion 448 and a leading end portion 449, and is lower toward the leading end portion 449 from the neck portion 448. As shown in FIGS. 11(A) to 11(C), the neck portion of the protrusion 424 is covered with the resin forming the housing 302. As a result, the neck portions 448 of the projection 446 and the projection 447 are covered with the resin together with the neck portion of the protrusion 424 according to the second resin molding process.

The mechanical strength of the protrusion 424 is increased by the provision of the projection 447 and the neck portion 448. Further, since an area being in contact with the measurement target gas 30 is increase, the cooling effect is enlarged. Further, the adherence with the resin of the housing 302 fixing the circuit package 400 is improved, and the circuit package 400 is more strongly fixed to the housing 302. As a result, the reliability is increased.

8.6 Further Other Embodiment of Protrusion 424

FIGS. 22(A) and 22(B) are partially enlarged views of the protrusion 424 which protrudes out of the package main body 422, FIG. 22(A) is a partially enlarged view of the front elevational view described in FIGS. 11(B) and 15(A), and FIG. 22(B) is a plan view. An slope portion 462 and an slope portion 464 shown in FIG. 22(A) further curve in relation to the slope portion 462 and the slope portion 464 shown in FIGS. 11(B) and 15(A). In other words, the slope portion 462 and the slope portion 464 shown in FIGS. 11(B) and 15(A) may be straight lines or curved lines. However, approximately the same effect can be obtained in either case.

Further, in FIG. 22(B), a leading end portion of the protrusion 424 is formed into a narrower shape in relation to a thickness direction of the package main body 422. The same effect as the description mentioned above about the slope portion 462 and the slope portion 464 can be achieved more by the provision of the slope portions 466 and 468 in the case that the difference exists between the thickness of the package main body 422 and the width of the temperature detecting portion 452 and the shape which becomes narrower little by little in the thickness direction as mentioned above.

The structure in FIGS. 21(A) to 21(C) can be added to FIGS. 22(A) and 22(B). According to this structure, the effect described in FIGS. 21(A) to 21(C) can be achieved in the embodiment in FIGS. 22(A) and 22(B).

8.7 Further Other Embodiments of Protrusion 424

Figure 23:
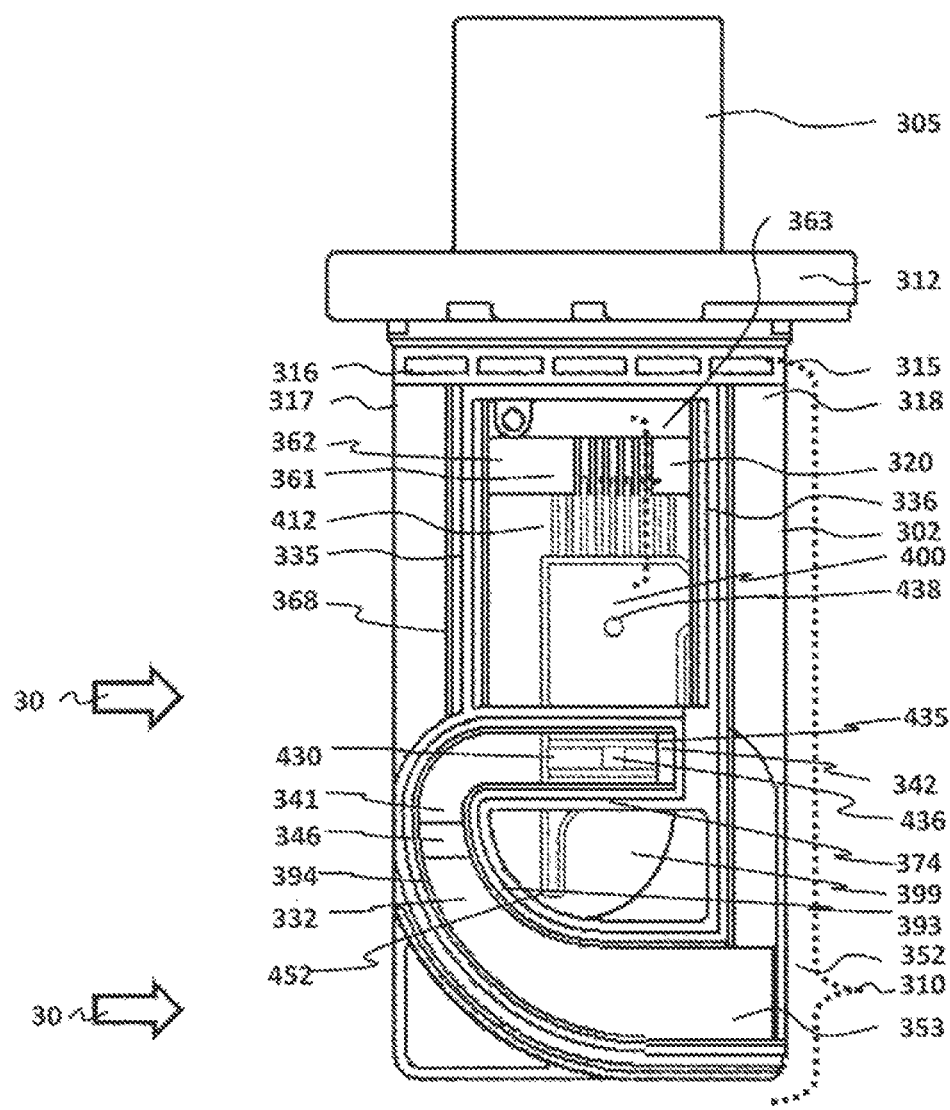
FIG. 23 is a view showing a housing of a thermal flow meter according to the other embodiment.
Figure 24:
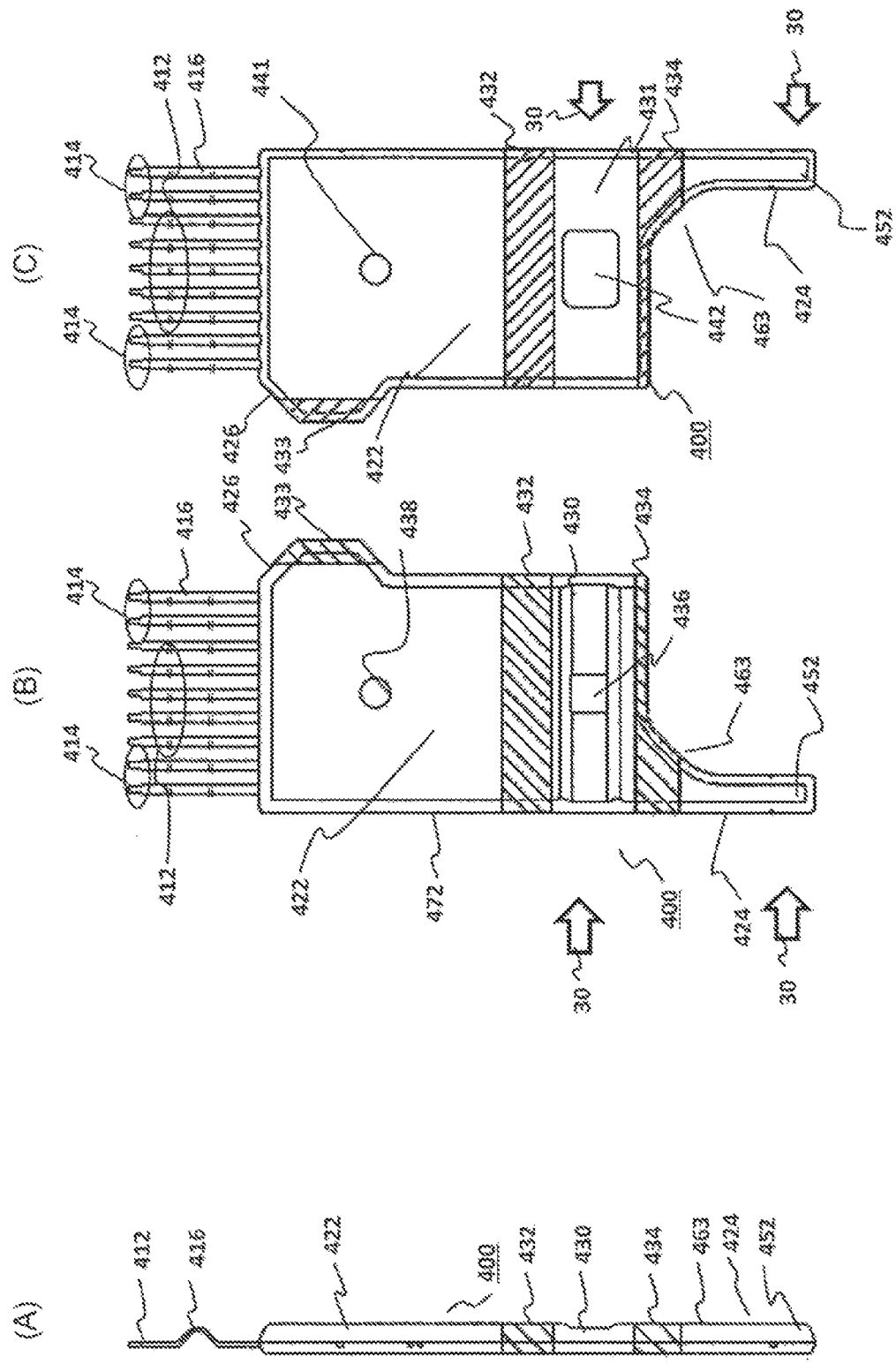
FIGS. 24(A) to 24(C) are the other embodiment showing the outer appearance shape of the circuit package 400.

FIGS. 23 to 25 show further the other embodiments. FIG. 23 is a view in which a circuit package 400 corresponding to the other embodiment is fixed by the housing 302, and is an alternative idea of the embodiment described in FIG. 5(A), 5(B), 6(A), or 6(B). Further, FIGS. 24(A) to 24(C) are the other embodiment of the embodiment described in FIGS. 11 and 15. FIG. 25 is the other embodiment of FIG. 12, and is a view showing a state in which the circuit parts are mounted to a frame of a circuit package 400 according to the other embodiment shown in FIG. 24. In the embodiments in FIGS. 23 to 25, the protrusion 424 protrudes toward the center direction of the main passage 124 from the package main body 422 of the circuit package 400. The inlet and the outlet of the bypass passage are formed in the center side of the main passage 124 which is the leading end side of the measuring portion 310 of the housing 302. In FIG. 23, the inlet is the rear face side and does not appear in the drawing. An outlet trench 353 for forming the outlet is provided in the leading end side of the measuring portion 310. The measurement target gas 30 is taken in from the inlet formed in the rear face side in FIG. 23, a bypass passage (hereinafter, described as a bypass passage measurement portion 435) joining the inlet and the outlet is formed in a wall surface direction of the main passage 124, and the bypass passage measurement portion 435 is provided with a measurement surface 430 for measuring an air flow.

A hole 399 which is open to the main passage 124 is provided between the bypass passage measurement portion 435 and the inlet and outlet sides, and a temperature detecting portion 452 is arranged in the hole 399. As mentioned above, since the hole 399 is open to the main passage 124, and the measurement target gas 30 flowing in the main passage 124 passes through the hole 399, the temperature detecting portion 452 provided in the circuit package 400 is always exposed to the measurement target gas 30 passing through the hole 399, and can measure the temperature of the measurement target gas 30 flowing in the main passage 124. The hole 399 is different in its shape between its front side and rear side, the pressure difference of the measurement target gas 30 is generated due to the shape difference between the front side and the rear side of the hole 399, and the gas always flows in one way or another in the hole 399 due to the pressure difference.

FIG. 24 shows an outer appearance shape of the circuit package 400 shown in FIG. 23. A different point from FIGS. 11(A) to 11(C) is a point that the protruding direction of the protrusion 424 from the package main body 422 is different. FIG. 24(A) is a left side elevational view, FIG. 24(B) is a front elevational view, and FIG. 24(C) is a back elevational view. A side 472 of the package main body 422 extends as it is so as to form the protrusion 424, and a temperature detection element 518 is retained in an inner portion of a leading end portion of the protrusion 424. On the other hand, a gentle inclined slope portion 463 is formed in the root of the other side of the protrusion 424.

The root of the protrusion 424 can be made thicker by the provision of the slope portion 463 in the root of the protrusion 424 as mentioned above, and the shape which becomes narrower little by little toward the leading end direction can be provided in the neck portion of the protrusion 424. Since the protrusion 424 is weak in its mechanical strength, it is possible to reduce the stress concentration into the root and it is possible to improve the mechanical strength by making the root of the protrusion 424 thicker and forming the shape which becomes narrower little by little toward the leading end direction. Further, in the case that the protrusion 424 is formed by the resin molding, the warpage tends to be created due to the influence of the volume change when the resin is solidified. It is possible to reduce the influence in relation to the problem, by making the root thicker. Further, it is desirable to make the protruding length longer for sensing the temperature of the measurement target gas 30 as accurately as possible, it is possible to make the protruding length of the protrusion 424 longer by making the root thicker, and the sensing precision of the temperature detection element 518 provided in the temperature detecting portion 452 is improved.

In FIG. 23, the protrusion 424 becomes stronger against the mechanical shock by making the root of the protrusion 424 thicker, and covering the root of the protrusion 424 with the resin of the housing 302 forming the bypass passage so as to surround with the housing 302, and it is possible to prevent the protrusion 424 from being broken. The hatched portion described on the outer appearance of the circuit package 400 indicates the fixation surface 432, the fixation surface 433 and the fixation surface 434 in which the circuit package 400 is covered with the resin used in the second resin molding process when the housing 302 is formed by the second resin molding process after the circuit package 400 is manufactured by the first resin molding process. In other words, the mechanical strength of the circuit package 400 is increased by these fixation surfaces, and it is possible to improve the mechanical strength of the root of the protrusion 424 particularly by the fixation surface 432. In addition, the various effects described in FIGS. 11(A) to 11(C) are achieved.

The hatched portion in FIG. 24 is a portion which is covered with the resin forming the housing 302 in the second resin molding process, as described in FIGS. 11(A) to 11(C). A mechanical reinforcement is obtained by covering the neck portion of the protrusion 424. Further, since the portion of the fixation surface 432 is covered with the resin forming the housing 302, and the measurement surface 430 is covered in its both sides while being sandwiched, the bypass passage, the measurement surface 430 and the heat transfer surface exposing portion 436 are firmly fixed with the high precision. Further, since the fixation portion 433 is formed in the portion of the protrusion 426, it is possible to firmly fix the circuit package 400. Since the fixation portion 433 exists at a position which is away from the fixation surface 432 and the fixation surface 434, and the direction of the length of the fixing portion is set to the direction in which the axes in the length directions intersect, it is easy to fix. On the contrary, it is possible to reduce the area with which the housing 302 covers the circuit package 400, and it is possible to reduce the stress due to the difference in thermal expansion.

INDUSTRIAL AVAILABILITY

The present invention is applicable to a measurement apparatus for measuring a gas flow rate as described above.

REFERENCE SIGNS LIST 300 thermal flow meter
302 housing
303 front cover
304 rear cover
305 external connector
306 external terminal
307 calibration terminal
310 measuring portion
320 terminal connector
332 bypass passage trench on frontside
334 bypass passage trench on backside
356, 358 protrusion
359 resin portion
361 inner socket of external terminal
365 link portion
372, 374 fixing portion
400 circuit package
412 connection terminal
414 terminal
422 package main body
424 protrusion
430 measurement surface
432, 434 fixation surface
436 heat transfer surface exposing portion
438 opening
452 temperature detecting portion
590 pressed fitting hole
594, 596 slope portion
601 flow rate detection circuit
602 air flow sensing portion
604 processing unit
608 heat generator
640 heating control bridge
650 bridge circuit of air flow sensing
672 diaphragm

The invention claimed is:
1. A thermal flow meter comprising:
a bypass passage for taking in and flowing measurement target gas flowing in a main passage;
a circuit package having an air flow measurement circuit for measuring an air flow by carrying out heat transfer in relation to the measurement target gas flowing in the bypass passage, and a temperature detecting portion which senses a temperature of the measurement target gas by a temperature detection element; and
a case which is provided with an external terminal outputting an electric signal indicating the air flow and an electric signal indicating the temperature of the measurement target gas and supports the circuit package, wherein
the circuit package is structured such that the air flow measurement circuit and the temperature detecting portion are contained by resin, the circuit package has a protrusion which protrudes out of a circuit package main body, and the temperature detection element is buried in the protrusion, and
the protrusion is formed into a shape which is thicker in its root than in its leading end portion and its neck portion is narrower little by little toward the leading end.

2. The thermal flow meter according to claim 1, wherein the root of the protrusion is larger than its leading end portion in a vertical cross section to a protruding direction, and has a shape that the cross section becomes smaller little by little toward the leading end of the protrusion.

3. The thermal flow meter according to claim 1, wherein a projection heading to an outer periphery of the protrusion is formed, and
the projection extends toward the leading end of the protrusion from the root of the protrusion.

4. The thermal flow meter according to claim 3, wherein the projection is covered with a resin of a housing in the neck portion of the protrusion.

5. The thermal flow meter according to claim 1, wherein the circuit package main body has two flat faces, and side faces which are formed in outer peripheries of the two faces and join the two faces, and is formed into a shape that the protrusion protrudes out of the side faces, and a joint portions between the side faces and the protrusion construct the neck portion, and are formed into a shape which becomes narrower little by little toward the leading end between the facing joint portions.

6. The thermal flow meter according to claim 1, wherein the circuit package main body has two flat faces, and side faces which are formed in outer peripheries of the two faces and join the two faces, is formed into a shape that the protrusion protrudes out of the side faces, and is formed into a shape that a thickness between the two flat faces is thicker than the temperature detecting portion of the protrusion, and
the thickness has a shape which becomes narrower little by little toward the leading end.

7. The thermal flow meter according to claim 1, wherein the protrusion protruding out of the circuit package main body protrudes toward an upstream direction of the flow of the measurement target gas flowing in the main passage.

8. The thermal flow meter according to claim 7, further comprising:
a housing which retains the circuit package and has an external terminal for outputting an electric signal indicating an air flow and an electric signal indicating a gas temperature which are measured by the circuit package, wherein
the circuit package main body of the circuit package is provided in the inner portion of the housing, and the protrusion provided in the circuit package protrudes out of the housing.

9. The thermal flow meter according to claim 7, wherein the circuit package main body has, in its inner portion, a diaphragm for measuring an air flow and a processing unit outputting the air flow, and the protrusion protrudes out of the circuit package main body in a direction intersecting a line connecting a position of the diaphragm and a position of the processing unit.

10. The thermal flow meter according to claim 1, wherein the protrusion protruding out of the circuit package main body protrudes toward a direction of the bypass passage.

11. The thermal flow meter according claim 10, wherein the bypass passage has an inlet and an outlet in the center side of the main passage, and has a passage joining the inlet and the outlet closer to a wall surface side of the main passage than the inlet and the outlet, a hole which is open to the main passage is provided between the inlet and the outlet, and the passage joining the inlet and the outlet, and the protrusion protruding out of the circuit package main body is protruded toward the same direction of the bypass passage, and the temperature detecting portion provided in the leading end of the protrusion is arranged in the hole which is open to the main passage.

12. The thermal flow meter according to claim 10, wherein
the circuit package main body has, in its inner portion, a diaphragm for measuring an air flow and a processing unit outputting the air flow, and the protrusion protrudes out of the circuit package main body in a direction along a line connecting a position of the diaphragm and a position of the processing unit.

13. The thermal flow meter according to claim 1, wherein the protrusion protruding out of the circuit package main body is provided with a lead in its inner portion, and the temperature detection element is electrically connected to a leading end portion of the lead.

14. The thermal flow meter according to claim 13, wherein
the protrusion has in its inner portion a first lead to which the temperature detection element is connected, a second lead which is connected to an electric circuit in the inner portion of the circuit package main body, and a connection wire which is provided between the first lead and the second lead and provided for electrically connecting the first lead and the second lead.

* * * * *